US006940516B1

(12) United States Patent
Dotson

(10) Patent No.: US 6,940,516 B1
(45) Date of Patent: Sep. 6, 2005

(54) METHOD AND APPARATUS FOR VIDEO UNDERFLOW DETECTION IN A RASTER ENGINE

(75) Inventor: Gary Dan Dotson, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 501 days.

(21) Appl. No.: 09/837,043

(22) Filed: Apr. 18, 2001

Related U.S. Application Data

(63) Continuation-in-part of application No. 09/672,632, filed on Sep. 28, 2000, now Pat. No. 6,831,647.

(51) Int. Cl.[7] .............................................. G06F 13/00

(52) U.S. Cl. ...................... 345/537; 345/503; 345/531; 345/545; 345/558

(58) Field of Search ............................... 345/501–506, 345/519–520, 522, 530–574

(56) References Cited

U.S. PATENT DOCUMENTS

| | | | | |
|---|---|---|---|---|
| 3,603,725 A | * | 9/1971 | Cutler | 178/6 |
| 5,214,607 A | * | 5/1993 | Duzan | 365/221 |
| 5,226,012 A | * | 7/1993 | Amano et al. | 365/189.05 |
| 5,315,587 A | * | 5/1994 | Kullander | 370/60 |
| 5,619,341 A | | 4/1997 | Auyeung et al. | |
| 5,677,969 A | | 10/1997 | Auyeung et al. | |
| 5,734,432 A | | 3/1998 | Netravali et al. | |
| 5,767,862 A | | 6/1998 | Krishnamurthy et al. | |
| 5,850,572 A | * | 12/1998 | Dierke | 345/559 |
| 5,862,150 A | | 1/1999 | Lavelle et al. | |
| 5,872,902 A | * | 2/1999 | Kuchkuda et al. | 395/130 |
| 5,900,886 A | * | 5/1999 | Shay | 345/520 |
| 5,931,922 A | | 8/1999 | Hough | |
| 5,949,442 A | * | 9/1999 | Nishiyama | 345/511 |
| 5,949,490 A | | 9/1999 | Borgwardt et al. | |
| 5,953,020 A | * | 9/1999 | Wang et al. | 345/513 |
| 5,959,640 A | * | 9/1999 | Rudin et al. | 345/521 |
| 5,982,397 A | * | 11/1999 | Walsh | 345/531 |
| 5,986,712 A | | 11/1999 | Peterson et al. | |
| 6,028,896 A | | 2/2000 | Jang et al. | |
| 6,035,096 A | | 3/2000 | Kusakabe | |
| 6,160,847 A | | 12/2000 | Wu et al. | |
| 6,195,079 B1 | * | 2/2001 | Reddy | 345/121 |
| 6,249,756 B1 | * | 6/2001 | Bunton et al. | 703/25 |
| 6,460,125 B2 | * | 10/2002 | Lee et al. | 711/167 |
| 6,661,422 B1 | * | 12/2003 | Valmiki et al. | 345/530 |
| 6,693,641 B1 | * | 2/2004 | Mehta et al. | 345/558 |

* cited by examiner

*Primary Examiner*—Ulka J. Chauhan
(74) *Attorney, Agent, or Firm*—Amin & Turocy LLP; Alexander M. Gerasimow

(57) ABSTRACT

An improved raster engine adapted to render video data from a frame buffer to one of a plurality of disparate displays is disclosed which comprises apparatus for detecting one or more video underflow conditions. The raster engine includes a first in first out (FIFO) memory, which obtains video data from a frame buffer and provides video data to a video pipeline, along with input and output counters associated with the FIFO memory. A control logic system is associated with the FIFO memory and adapted to provide an underflow indication according to the input and output counter values. A method for detecting video underflow in a video controller raster engine is also disclosed. The method includes obtaining an input counter value indicative of video data obtained from the frame buffer and an output counter value indicative of video data provided from a memory to a video pipeline in the raster engine, performing a comparison of the input and output counter values, and selectively providing an underflow indication according to the input and output counter value comparison.

30 Claims, 47 Drawing Sheets

132

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| EN | RSVD | SPCLK | BRIGHT | CLKEN | BLANK | HSYNC | VSYNC | PEN | PEN | PEN | PEN | PEN | PEN | PEN | PEN |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| PEN | PEN | PEN | PEN | PEN | PEN | PEN | PEN | PEN | PEN | PEN | PEN | PEN | PEN | PEN | PEN |

SIGCTL

FIG. 6B

134

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | STOP 10 | STOP 9 | STOP 8 | STOP 7 | STOP 6 | STOP 5 | STOP 4 | STOP 3 | STOP 2 | STOP 1 | STOP 0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | START 10 | START 9 | START 8 | START 7 | START 6 | START 5 | START 4 | START 3 | START 2 | START 1 | START 0 |

VSIGSTRTSTOP

FIG. 6C

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | STOP 10 | STOP 9 | STOP 8 | STOP 7 | STOP 6 | STOP 5 | STOP 4 | STOP 3 | STOP 2 | STOP 1 | STOP 0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | START 10 | START 9 | START 8 | START 7 | START 6 | START 5 | START 4 | START 3 | START 2 | START 1 | START 0 |

HSIGSTRTSTOP

136

FIG. 6D

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | VCLR 10 | VCLR 9 | VCLR 8 | VCLR 7 | VCLR 6 | VCLR 5 | VCLR 4 | VCLR 3 | VCLR 2 | VCLR 1 | VCLR 0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | HCLR 10 | HCLR 9 | HCLR 8 | HCLR 7 | HCLR 6 | HCLR 5 | HCLR 4 | HCLR 3 | HCLR 2 | HCLR 1 | HCLR 0 |

SIGCLR

138

FIG. 6E

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| DLNS5 | DLNS4 | DLNS3 | DLNS2 | DLNS1 | DLNS0 | CSTEP 1 | CSTEP 0 | CLINS5 | CLINS4 | CLINS3 | CLINS2 | CLINS1 | CLINS0 | CWID1 | CWID0 |

CURSORSIZE

204

FIG. 11C

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | COLO R | COLO R | COLO R | COLO R | COLO R | COLO R | COLO R | COLO R |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| COLO R | COLO R | COLO R | COLO R | COLO R | COLO R | COLO R | COLO R | COLO R | COLO R | COLO R | COLO R | COLO R | COLO R | COLO R | COLO R |

CURSORCOLOR1
CURSORCOLOR2
CURSORBLINK1
CURSORBLINK2

206

FIG. 11D

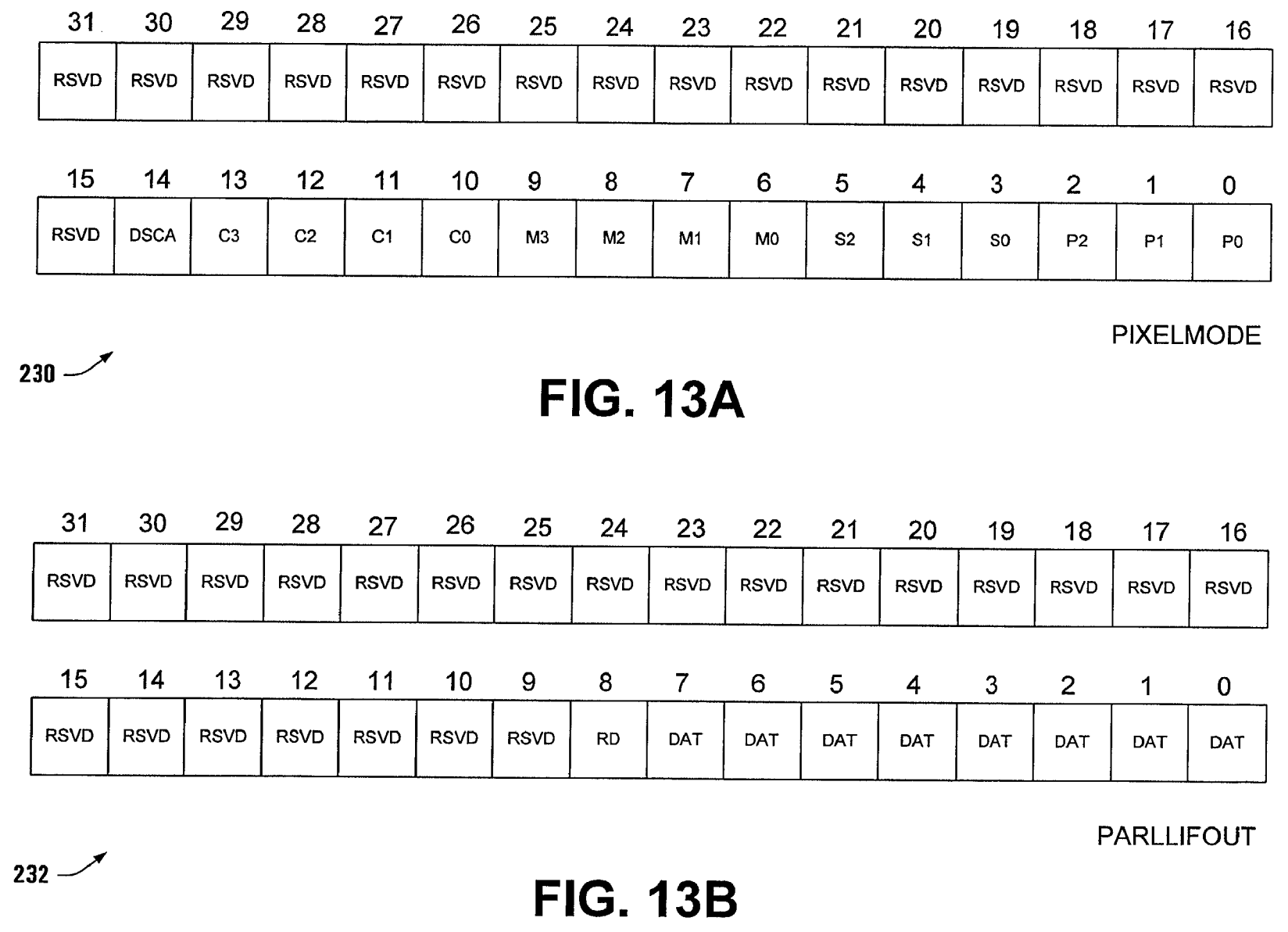

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | DSCA | C3 | C2 | C1 | C0 | M3 | M2 | M1 | M0 | S2 | S1 | S0 | P2 | P1 | P0 |

PIXELMODE

230

FIG. 13A

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | RSVD | RSVD | RD | DAT | DAT | DAT | DAT | DAT | DAT | DAT | DAT |

PARLLIFOUT

232

FIG. 13B

| shift mode | color mode | output mode | P(23) *** | P(22) *** | P(21) *** | P(20) *** | P(19) *** | P(18) *** | P(17) | P(16) | P(15) | P(14) | P(13) **** | P(12) | P(11) | P(10) | P(9) **** | P(8) | P(7) | P(6) | P(5) **** | P(4) | P(3) | P(2) | P(1) **** | P(0) |
|---|---|---|---|---|---|---|---|---|---|---|---|---|---|---|---|---|---|---|---|---|---|---|---|---|---|---|
| 0x0 | 0x0 0x4 0x8 | single pixel per clock up to 24 bits wide | R(1) | R(0) | G(1) | G(0) | B(1) | B(0) | R(7) | R(6) | R(5) | R(4) | R(3) | R(2) | G(7) | G(6) | G(5) | G(4) | G(3) | G(2) | B(7) | B(6) | B(5) | B(4) | B(3) | B(2) |
| 0x0 | 0x5 | single 16-bit 565 pixel per clock | R(3) | R(2) | G(5) | G(4) | B(3) | B(2) | R(4) | R(3) | R(2) | R(1) | R(0) | R(4) | G(5) | G(4) | G(3) | G(2) | G(1) | G(0) | B(4) | B(3) | B(2) | B(1) | B(0) | B(4) |
| 0x0 | 0x6 | single 16-bit 555 pixel per clock | R(3) | R(2) | G(3) | G(2) | B(3) | P(2) | R(4) | R(3) | R(2) | R(1) | R(0) | R(4) | G(4) | G(3) | G(2) | G(1) | G(0) | G(4) | B(4) | B(3) | B(2) | B(1) | B(0) | B(4) |
| 0x1 | 0x0 0x4 0x8 | single 24 bit pixel mapped to 18 bits each clk | X | X | X | X | X | X | R(7) | R(6) | R(5) | R(4) | R(3) | R(2) * | G(7) | G(6) | G(5) | G(4) | G(3) | G(2) * | B(7) | B(6) | B(5) | B(4) | B(3) | B(2) * |
| 0x1 | 0x5 | single 16-bit 565 pixel mapped to 18 bits each clk | X | X | X | X | X | X | R(4) | R(3) | R(2) | R(1) | R(0) | R(4) * | G(5) | G(4) | G(3) | G(2) | G(1) | G(0) * | B(4) | B(3) | B(2) | B(1) | B(0) | B(4) * |
| 0x1 | 0x6 | single 16-bit 555 pixel mapped to 18 bits each clk | X | X | X | X | X | X | R(4) | R(3) | R(2) | R(1) | R(0) | R(4) * | G(4) | G(3) | G(2) | G(1) | G(0) | G(4) * | B(4) | B(3) | B(2) | B(1) | B(0) | B(4) * |
| 0x2 | 0x0 0x8 | progressive scan 2 pixels per shift clock | P1(20) R1(4) * | P1(12) G1(4) * | P1(4) B1(4) * | P0(20) R0(4) * | P0(12) G0(4) * | P0(4) B0(4) * | P1(23) R1(7) | P1(22) G1(6) | P1(21) G1(5) | P1(15) G1(7) | P1(14) G1(6) | P1(13) G1(5) | P1(7) B1(7) | P1(6) B1(6) | P1(5) B1(5) | P0(23) R0(7) | P0(22) R0(6) | P0(21) R0(5) | P0(15) G0(7) | P0(14) G0(6) | P0(13) G0(5) | P0(7) B0(7) | P0(6) B0(6) | P0(5) B0(5) |
| | | dual scan | Lower P(20) R(4) * | Lower P(12) G(4) * | Lower P(4) B(4) * | Upper P(20) R(4) * | Upper P(12) G(4) * | Upper P(4) B(4) * | Lower P(23) R(7) | Lower P(22) R(6) | Lower P(21) R(5) | Lower P(15) G(7) | Lower P(14) G(6) | Lower P(13) G(5) | Lower P(7) B(7) | Lower P(6) B(6) | Lower P(5) B(5) | Upper P(23) R(7) | Upper P(22) R(6) | Upper P(21) R(5) | Upper P(15) G(7) | Upper P(14) G(6) | Upper P(13) G(5) | Upper P(7) B(7) | Upper P(6) B(6) | Upper P(5) B(5) |
| 0x3 | 0x0 0x8 | progressive scan 4 pixels per shift clock | P3(14) G3(6) * | P3(6) B3(6) * | P2(14) B2(6) * | P2(6) B2(6) * | P1(14) G1(6) * | P1(6) B1(6) * | P0(14) G0(6) * | P0(6) B0(6) * | P3(23) R3(7) | P3(22) R3(6) * | P3(15) G3(7) | P3(7) B3(7) | P2(23) R2(7) | P2(22) R2(6) * | P2(15) G2(7) | P2(7) B2(7) | P1(23) R1(7) | P1(22) R1(6) * | P1(15) G1(7) | P1(7) B1(7) | P0(23) R0(7) | P0(22) R0(6) * | P0(15) G0(7) | P0(7) B0(7) |
| | | dual scan | Lower P1(14) G1(6) * | Lower P1(6) B1(6) * | Upper P1(14) G1(6) * | Upper P1(6) B1(6) * | Lower P0(14) G0(6) * | Lower P0(6) B0(6) * | Upper P0(14) G0(6) * | Upper P0(6) B0(6) * | Lower P1(23) R1(7) | Lower P1(22) R1(6) * | Lower P1(15) G1(7) | Lower P1(7) B1(7) | Upper P1(23) R1(7) | Upper P1(22) R1(6) * | Upper P1(15) G1(7) | Upper P1(7) B1(7) | Lower P0(23) R0(7) | Lower P0(22) R0(6) * | Lower P0(15) G0(7) | Lower P0(7) B0(7) | Upper P0(23) R0(7) | Upper P0(22) R0(6) * | Upper P0(15) G0(7) | Upper P0(7) B0(7) |

236

FIG. 14A

236

| | | | | | | | | | | | | | | | | | | | | | | | | | | |
|---|---|---|---|---|---|---|---|---|---|---|---|---|---|---|---|---|---|---|---|---|---|---|---|---|---|---|
| 0x4 | 0x0<br>0x8 | progressive scan<br>8 pixels per shift clock<br>dual scan | P7(23)<br>R7 * | P6(23)<br>R6 * | P5(23)<br>R5 * | P4(23)<br>R4 * | P3(23)<br>R3 * | P2(23)<br>R2 * | P1(23)<br>R1 * | P0(23)<br>R0 * | P7(15)<br>G7 * | P7(7) B7<br>* | P6(15)<br>G6 * | P6(7) B6<br>* | P5(15)<br>G5 * | P5(7) B5<br>* | P4(15)<br>G4 * | P4(7) B4<br>* | P3(15)<br>G3 * | P3(7) B3<br>* | P2(15)<br>G2 * | P2(7) B2<br>* | P1(15)<br>G1 * | P1(7) B1<br>* | P0(15)<br>G0 * | P0(7) B0<br>* |
| | | | Lower<br>P3(23)<br>R3 * | Upper<br>P3(23)<br>R3 * | Lower<br>P2(23)<br>R2 * | Upper<br>P2(23)<br>R2 * | Lower<br>P1(23)<br>R1 * | Upper<br>P1(23)<br>R1 * | Lower<br>P0(23)<br>R0 * | Upper<br>P0(23)<br>R0 * | Lower<br>P3(15)<br>G3 * | Lower<br>P3(7) B3<br>* | Upper<br>P3(15)<br>G3 * | Upper<br>P3(7) B3<br>* | Lower<br>P2(15)<br>G2 * | Lower<br>P2(7) B2<br>* | Upper<br>P2(15)<br>G2 * | Upper<br>P2(7) B2<br>* | Lower<br>P1(15)<br>G1 * | Lower<br>P1(7) B1<br>* | Upper<br>P1(15)<br>G1 * | Upper<br>P1(7) B1<br>* | Lower<br>P0(15)<br>G0 * | Lower<br>P0(7) B0<br>* | Upper<br>P0(15)<br>G0 * | Upper<br>P0(7) B0<br>* |
| 0x5 | 0x0<br>0x8 | 2 2/3 pixels per clock | X | X | X | X | X | X | X | X | X | X | X | X | X | X | X | X | G2 | B2 | R1 | G1 | B1 | R0 | G0 | B0 |
| | | | X | X | X | X | X | X | X | X | X | X | X | X | X | X | X | X | B5 | R4 | G4 | B4 | R3 | G3 | B3 | R2 |
| | | | X | X | X | X | X | X | X | X | X | X | X | X | X | X | X | X | R7 | G7 | B7 | R6 | G6 | B6 | R5 | G5 |
| 0x6 | 0x0<br>0x8 | Dual 2 2/3 pixels per clock | X | X | X | X | X | X | X | X | L G2 | L B2 | L R1 | L G1 | L B1 | L R0 | L G0 | L B0 | U G2 | U B2 | U R1 | U G1 | U B1 | U R0 | U G0 | U B0 |
| | | | X | X | X | X | X | X | X | X | L B5 | L R4 | L G4 | L B4 | L R3 | L G3 | L B3 | L R2 | U B5 | U R4 | U G4 | U B4 | U R3 | U G3 | U B3 | U R2 |
| | | | X | X | X | X | X | X | X | X | L R7 | L G7 | L B7 | L R6 | L G6 | L B6 | L R5 | L G5 | U R7 | U G7 | U B7 | U R6 | U G6 | U B6 | U R5 | U G5 |
| ** | ** | CCIREN subs | ** | ** | ** | ** | ** | ** | ** | ** | ** | ** | ** | ** | ** | ** | ** | ** | D(7) | D(6) | D(5) | D(4) | D(3) | D(2) | D(1) | D(0) |
| ** | ** | LCDEN subs | ** | ** | ** | ** | ** | ** | ** | XECL | YSCL | ** | ** | ** | ** | ** | ** | ** | ** | ** | ** | ** | ** | ** | ** | ** |
| ** | ** | ACEN subs | ** | ** | ** | ** | ** | ** | AC | ** | ** | ** | ** | ** | ** | ** | ** | ** | ** | ** | ** | ** | ** | ** | ** | ** |

* These bits are an ORed combination of the bit value shown and the next significant bit below (This rounds the color value to nearest color)
** These bits do not get a substitute and are defined to the values controlled by the pixel output mode in the upper part of the table
*** These bits are pinned out in CL-EP9215 Dillon II only They are the MSBs of the color channels
**** Set PIXELMODE P13951 high to use these pins as outputs in the CL-EP9209

FIG. 14B

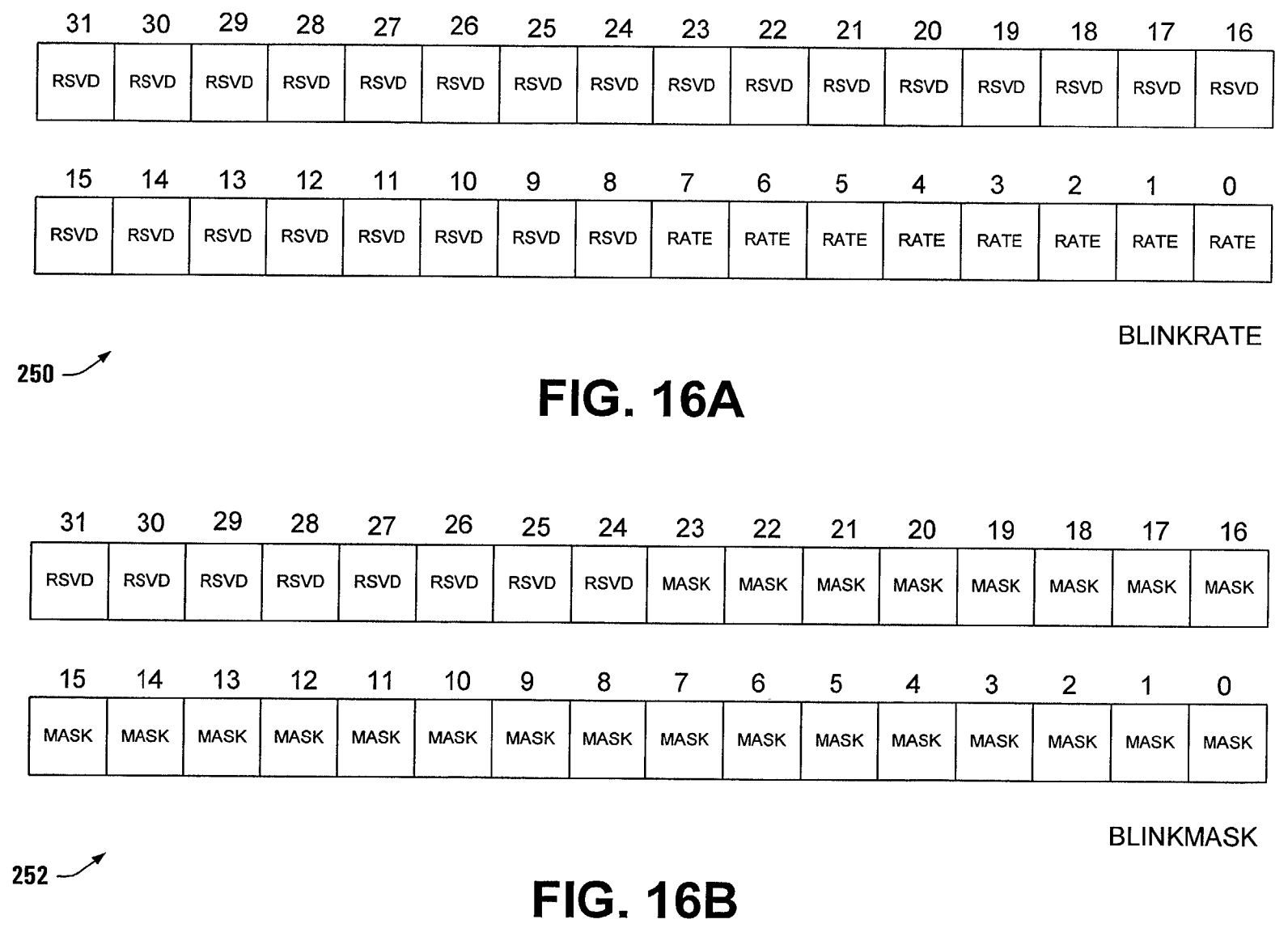

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | RSVD | RSVD | RSVD | RATE | RATE | RATE | RATE | RATE | RATE | RATE | RATE |

BLINKRATE

250

FIG. 16A

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | MASK | MASK | MASK | MASK | MASK | MASK | MASK | MASK |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| MASK | MASK | MASK | MASK | MASK | MASK | MASK | MASK | MASK | MASK | MASK | MASK | MASK | MASK | MASK | MASK |

BLINKMASK

252

FIG. 16B

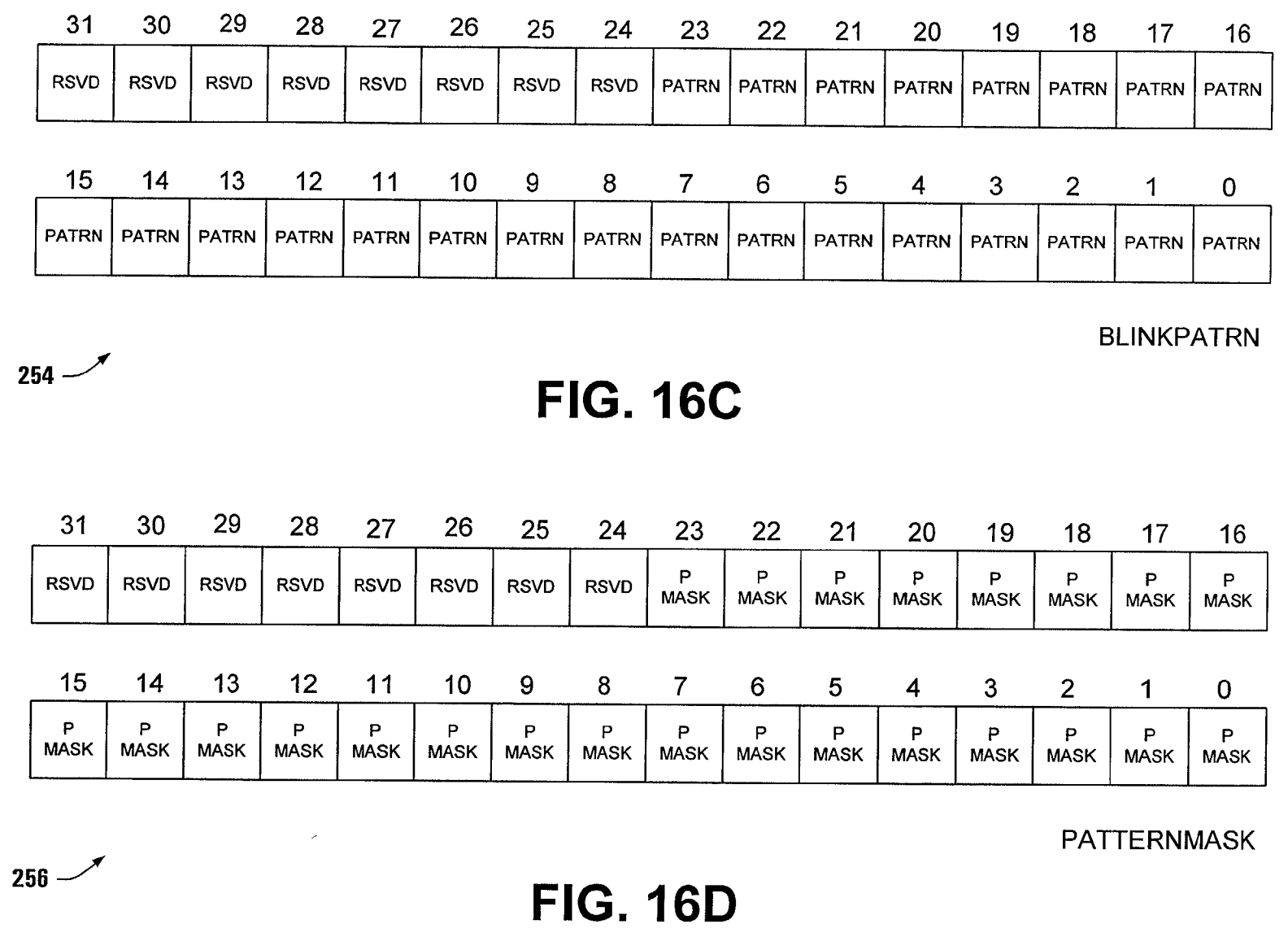

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | PATRN | PATRN | PATRN | PATRN | PATRN | PATRN | PATRN | PATRN |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| PATRN | PATRN | PATRN | PATRN | PATRN | PATRN | PATRN | PATRN | PATRN | PATRN | PATRN | PATRN | PATRN | PATRN | PATRN | PATRN |

BLINKPATRN

254

FIG. 16C

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | P MASK | P MASK | P MASK | P MASK | P MASK | P MASK | P MASK | P MASK |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| P MASK | P MASK | P MASK | P MASK | P MASK | P MASK | P MASK | P MASK | P MASK | P MASK | P MASK | P MASK | P MASK | P MASK | P MASK | P MASK |

PATTERNMASK

256

FIG. 16D

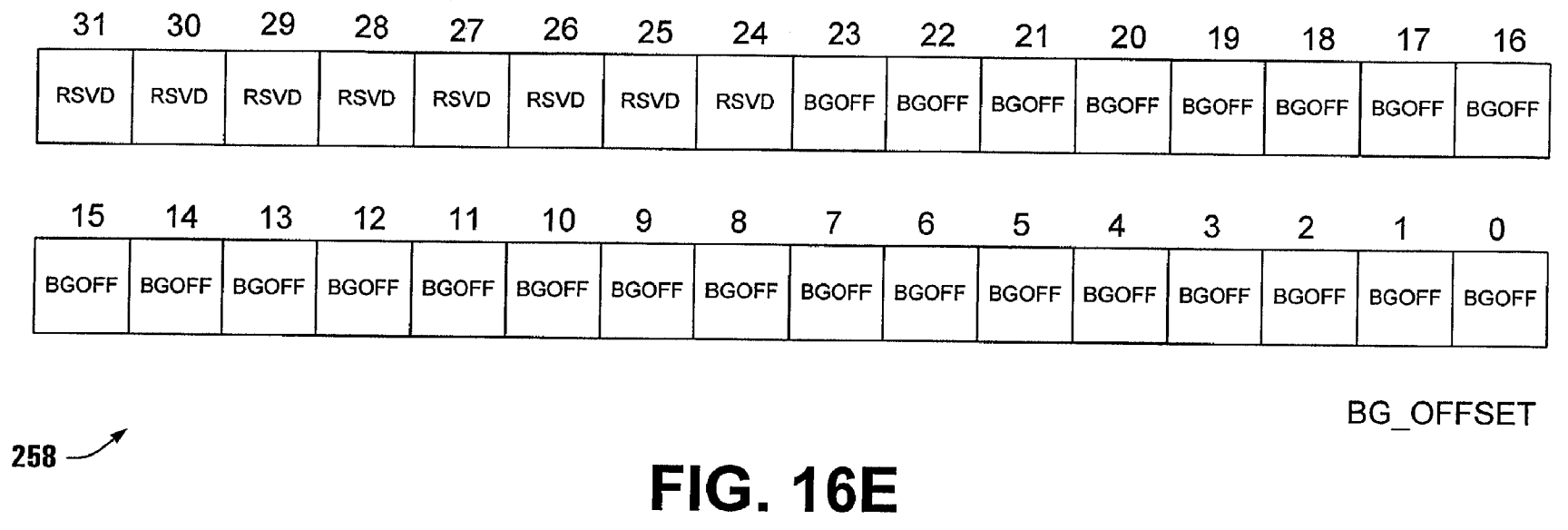

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | BGOFF | BGOFF | BGOFF | BGOFF | BGOFF | BGOFF | BGOFF | BGOFF |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| BGOFF | BGOFF | BGOFF | BGOFF | BGOFF | BGOFF | BGOFF | BGOFF | BGOFF | BGOFF | BGOFF | BGOFF | BGOFF | BGOFF | BGOFF | BGOFF |

BG_OFFSET

258

FIG. 16E

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | FRAME | VERT | HORZ |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| D15 | D14 | D13 | D12 | D11 | D10 | D9 | D8 | D7 | D6 | D5 | D4 | D3 | D2 | D1 | D0 |

GRAYSCALE LUT

282

FIG. 19

| F,V,H def | FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|---|
| for pixel | Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| in value | | | | register address | | | | | | | | | | | | | | | | | | Value |
| 000 | D18 | D17 | D16 | base + 0x80 | D15 | D14 | D13 | D12 | D11 | D10 | D9 | D8 | D7 | D6 | D5 | D4 | D3 | D2 | D1 | D0 | 00 | 000 |
| 001 | D18 | D17 | D16 | base + 0x84 | D15 | D14 | D13 | D12 | D11 | D10 | D9 | D8 | D7 | D6 | D5 | D4 | D3 | D2 | D1 | D0 | 00 | 001 |
| 010 | D18 | D17 | D16 | base + 0x88 | D15 | D14 | D13 | D12 | D11 | D10 | D9 | D8 | D7 | D6 | D5 | D4 | D3 | D2 | D1 | D0 | 00 | 010 |
| 011 | D18 | D17 | D16 | base + 0x8C | D15 | D14 | D13 | D12 | D11 | D10 | D9 | D8 | D7 | D6 | D5 | D4 | D3 | D2 | D1 | D0 | 00 | 011 |
| 100 | D18 | D17 | D16 | base + 0x90 | D15 | D14 | D13 | D12 | D11 | D10 | D9 | D8 | D7 | D6 | D5 | D4 | D3 | D2 | D1 | D0 | 00 | 100 |
| 101 | D18 | D17 | D16 | base + 0x94 | D15 | D14 | D13 | D12 | D11 | D10 | D9 | D8 | D7 | D6 | D5 | D4 | D3 | D2 | D1 | D0 | 00 | 101 |
| 110 | D18 | D17 | D16 | base + 0x98 | D15 | D14 | D13 | D12 | D11 | D10 | D9 | D8 | D7 | D6 | D5 | D4 | D3 | D2 | D1 | D0 | 00 | 110 |
| 111 | D18 | D17 | D16 | base + 0x9C | D15 | D14 | D13 | D12 | D11 | D10 | D9 | D8 | D7 | D6 | D5 | D4 | D3 | D2 | D1 | D0 | 00 | 111 |
| | X | X | X | base + 0xA0 | D15 | D14 | D13 | D12 | D11 | D10 | D9 | D8 | D7 | D6 | D5 | D4 | D3 | D2 | D1 | D0 | 01 | 000 |
| | X | X | X | base + 0xA4 | D15 | D14 | D13 | D12 | D11 | D10 | D9 | D8 | D7 | D6 | D5 | D4 | D3 | D2 | D1 | D0 | 01 | 001 |
| | X | X | X | base + 0xA8 | D15 | D14 | D13 | D12 | D11 | D10 | D9 | D8 | D7 | D6 | D5 | D4 | D3 | D2 | D1 | D0 | 01 | 010 |
| | X | X | X | base + 0xAC | D15 | D14 | D13 | D12 | D11 | D10 | D9 | D8 | D7 | D6 | D5 | D4 | D3 | D2 | D1 | D0 | 01 | 011 |
| | X | X | X | base + 0xB0 | D15 | D14 | D13 | D12 | D11 | D10 | D9 | D8 | D7 | D6 | D5 | D4 | D3 | D2 | D1 | D0 | 01 | 100 |
| | X | X | X | base + 0xB4 | D15 | D14 | D13 | D12 | D11 | D10 | D9 | D8 | D7 | D6 | D5 | D4 | D3 | D2 | D1 | D0 | 01 | 101 |
| | X | X | X | base + 0xB8 | D15 | D14 | D13 | D12 | D11 | D10 | D9 | D8 | D7 | D6 | D5 | D4 | D3 | D2 | D1 | D0 | 01 | 110 |
| | X | X | X | base + 0xBC | D15 | D14 | D13 | D12 | D11 | D10 | D9 | D8 | D7 | D6 | D5 | D4 | D3 | D2 | D1 | D0 | 01 | 111 |
| | X | X | X | base + 0xC0 | D15 | D14 | D13 | D12 | D11 | D10 | D9 | D8 | D7 | D6 | D5 | D4 | D3 | D2 | D1 | D0 | 10 | 000 |
| | X | X | X | base + 0xC4 | D15 | D14 | D13 | D12 | D11 | D10 | D9 | D8 | D7 | D6 | D5 | D4 | D3 | D2 | D1 | D0 | 10 | 001 |
| | X | X | X | base + 0xC8 | D15 | D14 | D13 | D12 | D11 | D10 | D9 | D8 | D7 | D6 | D5 | D4 | D3 | D2 | D1 | D0 | 10 | 010 |
| | X | X | X | base + 0xCC | D15 | D14 | D13 | D12 | D11 | D10 | D9 | D8 | D7 | D6 | D5 | D4 | D3 | D2 | D1 | D0 | 10 | 011 |
| | X | X | X | base + 0xD0 | D15 | D14 | D13 | D12 | D11 | D10 | D9 | D8 | D7 | D6 | D5 | D4 | D3 | D2 | D1 | D0 | 10 | 100 |
| | X | X | X | base + 0xD4 | D15 | D14 | D13 | D12 | D11 | D10 | D9 | D8 | D7 | D6 | D5 | D4 | D3 | D2 | D1 | D0 | 10 | 101 |
| | X | X | X | base + 0xD8 | D15 | D14 | D13 | D12 | D11 | D10 | D9 | D8 | D7 | D6 | D5 | D4 | D3 | D2 | D1 | D0 | 10 | 110 |
| | X | X | X | base + 0xDC | D15 | D14 | D13 | D12 | D11 | D10 | D9 | D8 | D7 | D6 | D5 | D4 | D3 | D2 | D1 | D0 | 10 | 111 |
| | X | X | X | base + 0xE0 | D15 | D14 | D13 | D12 | D11 | D10 | D9 | D8 | D7 | D6 | D5 | D4 | D3 | D2 | D1 | D0 | 11 | 000 |
| | X | X | X | base + 0xE4 | D15 | D14 | D13 | D12 | D11 | D10 | D9 | D8 | D7 | D6 | D5 | D4 | D3 | D2 | D1 | D0 | 11 | 001 |
| | X | X | X | base + 0xE8 | D15 | D14 | D13 | D12 | D11 | D10 | D9 | D8 | D7 | D6 | D5 | D4 | D3 | D2 | D1 | D0 | 11 | 010 |
| | X | X | X | base + 0xEC | D15 | D14 | D13 | D12 | D11 | D10 | D9 | D8 | D7 | D6 | D5 | D4 | D3 | D2 | D1 | D0 | 11 | 011 |
| | X | X | X | base + 0xF0 | D15 | D14 | D13 | D12 | D11 | D10 | D9 | D8 | D7 | D6 | D5 | D4 | D3 | D2 | D1 | D0 | 11 | 100 |
| | X | X | X | base + 0xF4 | D15 | D14 | D13 | D12 | D11 | D10 | D9 | D8 | D7 | D6 | D5 | D4 | D3 | D2 | D1 | D0 | 11 | 101 |
| | X | X | X | base + 0xF8 | D15 | D14 | D13 | D12 | D11 | D10 | D9 | D8 | D7 | D6 | D5 | D4 | D3 | D2 | D1 | D0 | 11 | 110 |
| | X | X | X | base + 0xFC | D15 | D14 | D13 | D12 | D11 | D10 | D9 | D8 | D7 | D6 | D5 | D4 | D3 | D2 | D1 | D0 | 11 | 111 |

FIG. 20

300

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| X | X | X | base + 0x80 | 0 | 0 | 0 | 0 | 0 | 0 | 0 | 0 | 0 | 0 | 0 | 0 | 0 | 0 | 0 | 0 | 00 | 000 |
| | | | base + 0xA0 | 0 | 0 | 0 | 0 | 0 | 0 | 0 | 0 | 0 | 0 | 0 | 0 | 0 | 0 | 0 | 0 | 01 | 000 |
| | | | base + 0xC0 | 0 | 0 | 0 | 0 | 0 | 0 | 0 | 0 | 0 | 0 | 0 | 0 | 0 | 0 | 0 | 0 | 10 | 000 |
| | | | base + 0xE0 | 0 | 0 | 0 | 0 | 0 | 0 | 0 | 0 | 0 | 0 | 0 | 0 | 0 | 0 | 0 | 0 | 11 | 000 |
| X | X | X | base + 0x9C | 1 | 1 | 1 | 1 | 1 | 1 | 1 | 1 | 1 | 1 | 1 | 1 | 1 | 1 | 1 | 1 | 00 | 111 |
| | | | base + 0xBC | 1 | 1 | 1 | 1 | 1 | 1 | 1 | 1 | 1 | 1 | 1 | 1 | 1 | 1 | 1 | 1 | 01 | 111 |
| | | | base + 0xDC | 1 | 1 | 1 | 1 | 1 | 1 | 1 | 1 | 1 | 1 | 1 | 1 | 1 | 1 | 1 | 1 | 10 | 111 |
| | | | base + 0xFC | 1 | 1 | 1 | 1 | 1 | 1 | 1 | 1 | 1 | 1 | 1 | 1 | 1 | 1 | 1 | 1 | 11 | 111 |

302

FIG. 21

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| 1 | 1 | 1 | base + 0x8C | 0 | 1 | 0 | 1 | 1 | 1 | 0 | 0 | 0 | 1 | 0 | 1 | 0 | 0 | 1 | 1 | 00 | 011 |
| | | | base + 0xAC | 1 | 0 | 1 | 0 | 0 | 0 | 1 | 1 | 1 | 0 | 1 | 0 | 1 | 1 | 0 | 0 | 01 | 011 |
| | | | base + 0xCC | 1 | 1 | 0 | 0 | 0 | 1 | 0 | 1 | 0 | 0 | 1 | 1 | 0 | 1 | 0 | 1 | 10 | 011 |
| | | | base + 0xEC | 0 | 0 | 1 | 1 | 1 | 0 | 1 | 0 | 1 | 1 | 0 | 0 | 1 | 0 | 1 | 0 | 11 | 011 |

310

FIG. 25

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| 0 | 0 | 0 | base + 0x88 | x | x | x | x | x | 0 | 1 | 0 | x | 1 | 0 | 0 | x | 0 | 0 | 1 | 00 | 010 |
| | | | base + 0xA8 | x | x | x | x | x | 1 | 0 | 0 | x | 0 | 1 | 0 | x | 0 | 1 | 0 | 01 | 010 |
| | | | base + 0xC8 | x | x | x | x | x | 0 | 0 | 1 | x | 0 | 0 | 1 | x | 1 | 0 | 0 | 10 | 010 |
| | | | base + 0xE8 | x | x | x | x | x | x | x | x | x | x | x | x | x | x | x | x | 11 | 010 |

316

FIG. 28

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| 0 | 0 | 0 | base + 0x88 | x | x | x | x | 0 | 0 | 1 | 0 | 1 | 1 | 0 | 0 | 0 | 0 | 0 | 1 | 00 | 010 |
| | | | base + 0xA8 | x | x | x | x | 1 | 1 | 0 | 0 | 0 | 0 | 1 | 0 | 0 | 0 | 1 | 0 | 01 | 010 |
| | | | base + 0xC8 | x | x | x | x | 0 | 0 | 0 | 1 | 1 | 0 | 0 | 1 | 1 | 1 | 0 | 0 | 10 | 010 |
| | | | base + 0xE8 | x | x | x | x | x | x | x | x | x | x | x | x | x | x | x | x | 11 | 010 |

320

FIG. 30

| Display Type | Horizontal Resolution x Vertical Resolution | Video Clock frequency (MHz) | Frame Buffer Storage format | Display Data format | pixels per shift clock | Pixel Shift Clock frequency (MHz) | Vertical Frame Rate (Hz) |
|---|---|---|---|---|---|---|---|
| VFD | 128 x 32 | 2 | 4 bpp | monochrome | 8 | 0.25 | 400 |
| LCD | 128 x 64 | 2 | 4 bpp | monochrome | 4 | 0.5 | 230 |
| LCD | 256 x 128 | 2 | 4 bpp | monochrome | 4 | 0.5 | 60 |
| "QVGA" TFT LCD | 320 x 234 | 6.4 | 8 bpp | analog | 1 | 6.4 | 80 |
| QVGA STN LCD | 320 x 240 | 4 | 4 bit RGB | 4 bit RGB | 1 | 4 | 50 |
| HVGA STN LCD | 640 x 240 | 8 | 4 bit RGB | 4 bit RGB | 1 | 8 | 50 |
| "VGA" DC Plasma | 640 x 400 | 16 | 4 bpp | monochrome | 4 | 4 | 60 |
| VGA EL | 640 x 480 | 24 | 4 or 8 bpp | grayscale | 8 | 3 | 75 |
| VGA STN LCD | 640 x 480 | 24 | 8 or 16 bpp | 18 bit RGB | 1 | 24 | 75 |
| VGATFT LCD | 640 x 480 | 24 | 8, 16, or 24 bpp | 18 bit RGB | 1 | 24 | 75 |
| VGA CRT | 640 x 480 | 25.175 | 8, 16, or 24 bpp | analog | 1 | NA | 70 |
| VGA CRT | 640 x 480 | 32 | 8, 16, or 24 bpp | analog | 1 | NA | 85 |
| SVGA TFT LCD | 800 x 600 | 40 | 8, 16, or 24 bpp | 18 bit RGB | 1 | 40 | 80 |
| SVGA CRT | 800 x 600 | 50 | 8, 16, or 24 bpp | analog | 1 | NA | 85 |
| XGA TFT LCD | 1024 x 768 | 60 | 8, 16, or 24 bpp | 18 bit RGB | 2 | 30 | 72 |
| XGA CRT | 1024 x 768 | 75 | 8, 16, or 24 bpp | analog | 1 | NA | 80 |
| SXGA TFT LCD | 1280 x 1024 | 85 | 8, 16, or 24 bpp | 18 or 24 bit RGB | 1 | 85 | 60 |
| SXGA CRT | 1280 x 1024 | 110 | 8, 16, or 24 bpp | analog | 1 | NA | 70 |
| SXGAW TFT LCD | 1400 x 1024 | 90 | 8, 16, or 24 bpp | 18 or 24 bit RGB | 1 | 90 | 60 |
| SXGA+ TFT LCD | 1400 x 1050 | 110 | 8, 16, or 24 bpp | 18 or 24 bit RGB | 1 | 110 | 70 |
| UXGA TFT LCD | 1600 x 1200 | 135 | 8, 16, or 24 bpp | 18 or 24 bit RGB | 1 | 135 | 65 |
| UXGA CRT | 1600 x 1200 | 135 | 8, 16, or 24 bpp | analog | 1 | NA | 60 |
| UXGAW TFT LCD | 1900 x 1200 | 135 | 8, 16, or 24 bpp | 18 or 24 bit RGB | 1 | 135 | 60 |
| HDTV-2 LCD | 1280 x 720 | 50 | 8, 16, or 24 bpp | 24 bit RGB | 1 | 50 | 50 |
| HDTV-2 CRT | 1280 x 720 | 66 | 8, 16, or 24 bpp | analog | 1 | NA | 60 |
| HDTV-4 LCD | 1920 x 1080 | 135 | 8, 16, or 24 bpp | 24 bit RGB | 1 | 135 | 60 |
| HDTV-4 CRT | 1920 x 1080 | 135 | 8, 16, or 24 bpp | analog | 1 | NA | 55 |
| QXGA LCD | 2048 x 1536 | 135 | 4 bpp | monochrome | 8 | 16.875 | 40 |
| QSXGA LCD | 2560 x 2048 | 135 | 4 bpp | monochrome | 8 | 16.875 | 24 |
| QUXGA LCD | 3200 x 2400 | 135 | 4 bpp | monochrome | 8 | 16.875 | 17 |

350

FIG. 31

METHOD AND APPARATUS FOR VIDEO UNDERFLOW DETECTION IN A RASTER ENGINE

REFERENCE TO RELATED APPLICATION

This application is a continuation-in-part of U.S. patent application Ser. No. 09/672,632, which was filed Sep. 28, 2000 now U.S. Pat. No. 6,831,647, entitled RASTER ENGINE WITH BOUNDED VIDEO SIGNATURE ANALYZER.

TECHNICAL FIELD

The present invention relates generally to the field of video displays and more particularly to improved methods and apparatus for video underflow detection in a raster engine.

BACKGROUND OF THE INVENTION

Video displays are used in computer systems to present visual images to a user based on video data provided by a computer or other processing device. The display allows a user to effectively receive information from and to interact with application programs running in the system. Such computer systems and displays are employed in numerous business, consumer, entertainment, and industrial settings, including automated industrial control systems.

Displays are available in a variety of forms, such as color or monochrome, flat panel, liquid crystal display (LCD), electro-luminescent (EL), plasma display panels (PDP), vacuum fluorescent displays (VFD), cathode ray tube (CRT), and may be interfaced to a computer system in analog or digital fashion. The display is provided with video data frame by frame, which is scanned onto the display screen according to a scanning method which may include progressive scan, dual scan, interleave scan, or interlaced scanning. The cost of displays varies with the display resolution and quality. For example, color displays generally cost more than monochrome displays. The number of pixels, as well as the number of available colors per pixel (bits per pixels) also affects display cost. The cost of a computer display may be a large percentage of the overall computer system cost. As the application of computer system displays varies greatly, displays are accordingly provided in a variety of price ranges.

Interfacing between a computer or other processing device and a display is ordinarily accomplished using a video controller, also variously referred to as graphics adapter, graphics controller, video display adapter, display controller, and display adapter. The screen resolution on a PC is determined by the video controller, which may be plugged into one of the computer's expansion slots. In conventional systems, the display must also be able to adjust to the resolution of the video controller. Common video controllers come with their own drivers for an operating system, which are installed after the video controller is installed. The driver allows the operating system to display its video output at a certain number of resolutions and colors. The video controller may include a raster engine which rasterizes video data from a frame buffer into a format that the display can accept for rendering to a user.

Raster engines typically obtain image data from a frame buffer in memory via a bus, wherein the frame buffer may be in main memory or in a separate display memory. The bus may provide access between the raster engine and the main memory, as well as between other devices in a computer system. In this shared system bus configuration, situations may arise in which the raster engine requires display image data from the frame buffer, and yet the raster engine cannot timely obtain such data due to contention with other devices using the common or shared bus. As a result, the raster engine may become empty, for example, during excessive bus loading conditions. The video display interfaced by the raster engine may exhibit undesirable visual effects under these conditions. For example, the display may suffer from visual defects such as jittering, shifting, flashing, and blank-outs in the displayed video image. Such undesirable visual defects are also experienced when a raster engine on an isolated or dedicated bus becomes starved for video data. Thus, there is a need for improved methods and apparatus for preventing or minimizing empty raster engine conditions, and the undesirable display effects associated therewith.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The foregoing and other shortcomings associated with conventional video controller devices and methodologies are reduced or minimized by the present invention, which provides a video controller and raster engine which is easily programmed to interface a computer system running a variety of application programs with a plurality of disparate display types. The invention may thus be employed in high end as well as highly cost sensitive computer system applications in association with displays ranging from high definition television (HDTV) to low resolution monochrome EL and/or LCD display panels.

The invention provides for software programmable registers in the video controller raster engine by which a user may programmatically adapt or configure the raster engine to provide video data to a wide variety of different displays with different color capabilities and resolutions. The raster engine comprises an underflow detection system, which may provide an indication of current or anticipated underflow conditions, which may be provided to a system processor or other device for taking some steps toward remedying the cause of the underflow. In addition, programmable grayscaling is provided, together with hardware cursor features applicable to dual scan displays, and hardware blinking apparatus providing low overhead blinking on an individual pixel basis. Moreover, the invention provides for integrating a video signature analyzer in the video controller, providing for self-testing, as well as the capability of testing video signatures for displays having changing portions.

According to an aspect of the present invention, the raster engine may provide an indication to a host processor that the raster engine is underflowing or about to underflow, or that a lockup condition exists in the raster engine. Input and output counters in the raster engine first in first out (FIFO) memory system, which interfaces the host bus with the raster engine video systems, are read by an underflow detection system which is adapted to provide an underflow indication according to the counter values. The underflow detection and indication system thus minimizes or reduces the undesirable visual effects associated with a starved or empty raster engine, and allows remedial and/or notification measures to be taken in a computer system employing the raster engine.

The video controller raster engine receives video data from a frame buffer and renders formatted data to a display in a computer system. According to another aspect of the invention, the raster engine comprises a first in first out (FIFO) memory interfacing a host bus in the computer system with the raster engine. The FIFO memory obtains video data from the frame buffer via the host bus and provides video data to a video pipeline in the raster engine. Input and output counters are provided to indicate the data in the FIFO as data is received from the frame buffer and fed to the video pipeline. The input counter has a value indicating video data obtained from the frame buffer, and the output counter has a value indicating video data provided to the video pipeline. The counters may operate from separate clocks. For example, the input counter may operate according to a host clock, and the output counter may operate according to a video clock. The raster engine further comprises a control logic system associated with the FIFO memory to selectively provide an underflow indication according to the input and output counter values.

The underflow indication may be used by a system processor to provide extra bus bandwidth or take some other action to reduce or prevent the FIFO memory from becoming starved for video data, thereby reducing the occurrence of deleterious visual display defects associated with raster engine starvation. The control logic system may comprise various hardware and/or software in order to compare the input and output counter values to determine if an underflow condition exists or is about to exist in the raster engine FIFO memory. For example, the logic system may determine the difference between the input and output counters, and compare the counter difference with a threshold value, which may be obtained from a programmable register. Thus, where the counters are of equal value, the logic system may determine and provide an indication (e.g., a video underflow interrupt signal) that an underflow condition exists. In addition, where a small difference (e.g., less than or equal to a threshold value) exists between the input and output counters, the logic system may determine that an underflow situation is about to occur, and provide a corresponding indication. In order to ensure valid detection of underflow conditions where two separate clocks are used in association with the FIFO memory, the underflow indication may be provided if the difference value is less than or equal to the threshold for a number of consecutive cycles of a host clock (e.g., two clock cycles).

The invention further comprises a methodology for detecting and/or indicating an underflow condition (e.g., or the likelihood of such a condition occurring) in a raster engine. The method comprises obtaining an input counter value indicative of video data obtained from a frame buffer, and obtaining an output counter value indicative of video data provided from a memory to a video pipeline in the raster engine. The method further comprises performing a comparison of the input and output counter values, and selectively providing an underflow indication according to the input and output counter value comparison. The comparison of the counter values may include subtracting the input counter value from the output counter value to obtain a difference value, and comparing the difference value with a threshold value. An underflow signal may accordingly be provided if the input and output counter values are within a threshold value of each other (e.g., if the difference value is less than or equal to the threshold). In order to ensure valid detection of underflow conditions where two separate clocks are used in association with the FIFO memory, the underflow indication may be provided if the difference value is less than or equal to the threshold for a number of consecutive cycles of a host clock (e.g., two clock cycles).

To the accomplishment of the foregoing and related ends, certain illustrative aspects of the present invention are hereinafter described with reference to the attached drawing figures. The following description and the annexed drawings set forth in detail certain illustrative applications and aspects of the invention. These are indicative, however, of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of various aspects of the invention and the attached drawings in which:

FIGS. 6A–6E are schematic diagrams illustrating exemplary control and/or data registers associated with the exemplary signature analyzer of FIG. 3;

FIGS. 11A–11G are schematic diagrams illustrating exemplary control and/or data registers associated with the hardware cursor controller of FIG. 1;

FIGS. 13A–13C are schematic diagrams illustrating exemplary control and/or data registers associated with the color mux of FIG. 12;

FIGS. 14A and 14B illustrated an exemplary pixel transfer mapping in accordance with another aspect of the invention;

FIGS. 16A–16E are schematic diagrams illustrating exemplary control and/or data registers associated with the hardware blinking apparatus of FIG. 15;

FIG. 19 is a schematic diagram illustrating an exemplary control register associated with the grayscale generator of FIGS. 17 and 18;

FIG. 20 is a schematic diagram illustrating an exemplary programmable grayscale look up table matrix in accordance with another aspect of the invention;

FIG. 21 is a schematic diagram illustrating another exemplary programmable grayscale look up table matrix in accordance with the invention;

FIG. 25 is a schematic diagram illustrating another exemplary programmable grayscale look up table matrix in accordance with the invention;

FIG. 28 is a schematic diagram illustrating another exemplary programmable grayscale look up table matrix in accordance with the invention;

FIG. 30 is a schematic diagram illustrating another exemplary programmable grayscale look up table matrix in accordance with the invention;

FIG. 31 is a table illustrating several exemplary raster engine output modes in accordance with the invention;

DETAILED DESCRIPTION OF THE INVENTION

Figure 1:
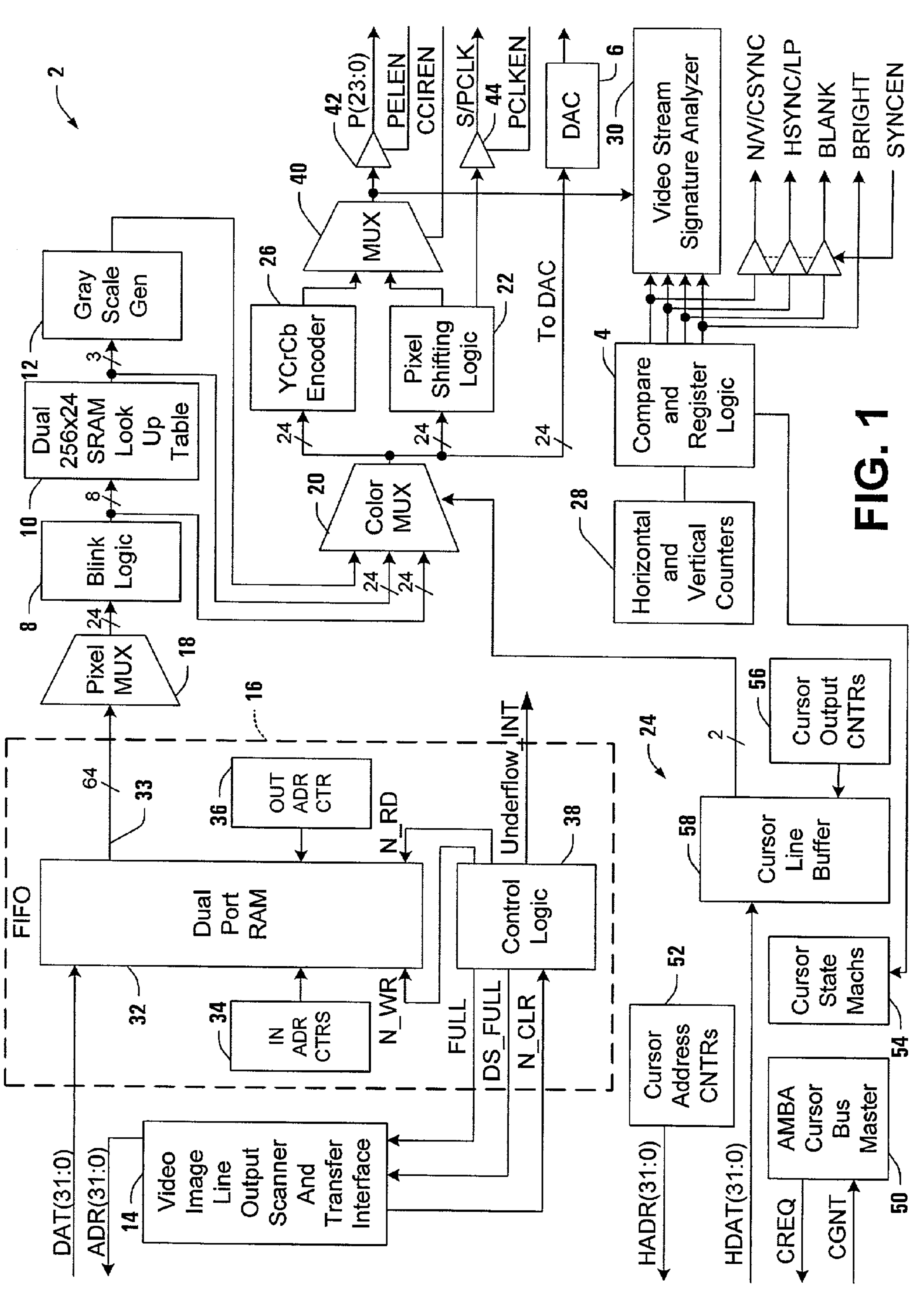
FIG. 1 is a schematic diagram illustrating an exemplary raster engine in accordance with the present invention.

The following is a detailed description of the present invention made in conjunction with the attached figures, wherein like reference numerals will refer to like elements throughout. According to the invention, an improved raster engine is provided to render video data from a frame buffer to one of a plurality of disparate displays which comprises an integral bounded video signature analyzer, a hardware cursor apparatus supporting dual scanned displays, programmatic support for multiple disparate display types, multimode programmable hardware blinking, programmable multiple color depth digital display interface, and programmable matrix controlled grayscale generation.

Referring now to the drawings, FIG. 1 illustrates an exemplary raster engine 2, which is adapted to provide data and interface signals for a variety of displays, including analog CRTs and digital LCDs (not shown). In addition, the raster engine 2 has fully programmable video interface timing for progressive non-interlaced, dual scanning, line interleaved, and interlaced displays. Programmable compare and register logic 4 allows a user or a host system application program to select appropriate display modes for interfacing a frame buffer with one or a plurality of disparate display devices. Compare and register logic 4 may comprise one or more of the control registers illustrated and described hereinafter. Separate DAC interface signals are provided to allow analog red, green, blue (RGB) signal generation for analog LCD displays or CRTs. Raster engine 2 is also designed to generate CCIR656 4:2:2 YCrCb digital video output signals for optionally interfacing an NTSC encoder (not shown). Raster engine 2 further advantageously provides support for an 8-bit parallel display interface for interfacing to low-end display modules with integrated controller and frame buffer, and may also comprise an integrated triple 8-bit DAC 6 for directly supporting analog output to CRT displays.

As illustrated in FIG. 1, the raster engine 2 includes a video pipeline comprising several major sections; a video image line output scanner and transfer interface (VILOSATI) 14, a video first in first out system (FIFO) 16, a pixel mux 18, a blink logic system 8, a dual color look up table (LUT) 10, a grayscale generator 12, an RGB color mux 20, a pixel shift logic system 22, hardware cursor logic system 24, a YCrCb encoder 26, a video timing section comprising horizontal and vertical counters 28, and the compare and register logic 4. In addition, a video stream signature analyzer 30 may be integrated in the raster engine 2 for built in self testing. The FIFO 16 further comprises a dual port RAM device 32, input address counters 34, an output address counter 36, and control logic 38 for interfacing with the VILOSATI 14. The FIFO control logic 38 further comprises an underflow interrupt output adapted to indicate a current or potential underflow condition in the FIFO 16. An output mux 40 selectively provides output video data from one of the YCrCb encoder 26 and the pixel shift logic system 22 via data and clock buffers 42 and 44, respectively. The hardware cursor system 24 comprises an AMBA cursor bus master 50 for controlling the transfer of cursor data, cursor address counters 52, cursor state machines 54, cursor output counters 56, and a cursor line buffer 58.

Figure 2A:
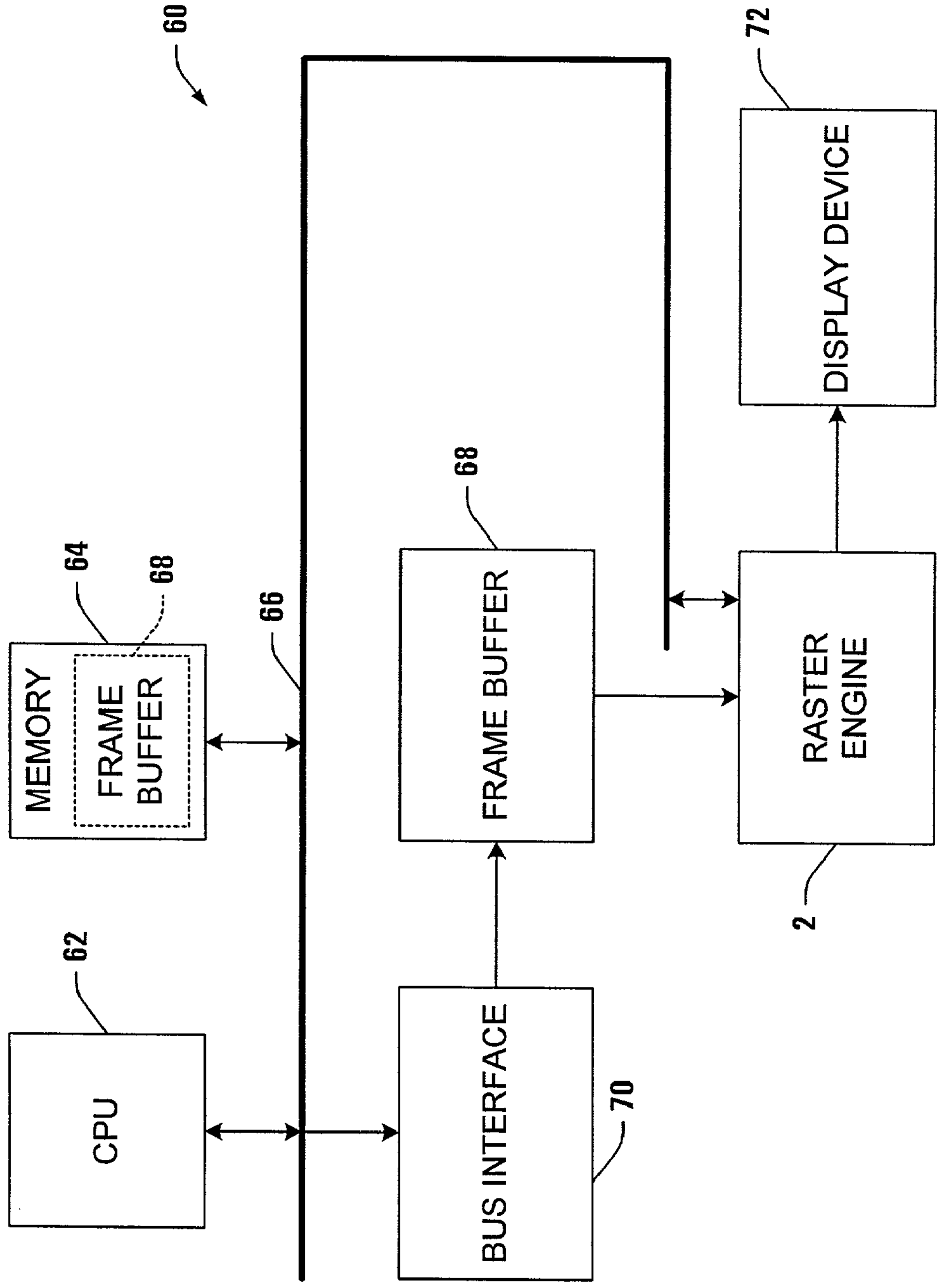
FIG. 2A is a schematic diagram illustrating a computer system in which various aspects of the invention may be employed.

Referring also to FIG. 2A, an exemplary computer system 60 is illustrated having a central processing unit (CPU) 62, a memory 64, and a bus 66 providing an interface therebetween. A video frame buffer 68 may interface with the bus 66 via a bus interface 70, or may alternatively be provided in a portion of main memory 64, wherein the beginning of video lines may be located on any 32 bit word boundary. Raster engine 2 may be operatively connected with the bus 66 for receiving video data therefrom for rendering to a display device 72. In addition, the bus 66 (e.g., including address and data busses) may provide access to the various control registers in raster engine 2, including compare and register logic 4. Video screen start registers (not shown) may be used to determine the upper left corner of the video screen. Video word addressing in screen memory may be from left to right and then top to bottom.

Four bit pixels packaged within video words may be organized in device independent bitmap (DIB) format with the left most pixel in the most significant location on a per byte basis. Several screens may be available for video display depending on screen size, pixel depth, and amount of memory dedicated to video images. The screen size may be up to 4096×4096 pixels and the pixel depth may be 4, 8, 16, 24, or 32 bpp. The raster engine 2 provides a pulse width modulated brightness control output that can be used in conjunction with a resistor and capacitor (not shown) to provide a DC voltage level for brightness control. The signal may be further employed for direct pulse width modulated cold cathode fluorescent lamp (CCFL) brightness control that can be synchronized to a display frame rate.

The raster engine 2 pipeline includes a hardware pixel blink logic system 8, adapted to selectively blink pixels on a display according to a programmable count of vertical sync intervals in a BLINKRATE register, as described in greater detail hereinafter. For 4 bpp and 8 bpp modes, either multiple or single bit planes may be used to specify blinking pixels according to the 256×24 SRAM look up table 10. This allows the number of definable blinking pixels to range from all pixel combinations blinking to one pixel combination blinking, providing significant overhead savings over conventional software blinking techniques, and finer grained blinking control than was available using conventional character blinking methodologies. For 16 bpp and 24 bpp modes, the blink logic system 8 may bypass the look up table 10, whereby blink functions may be accomplished via logic transformations of pixel data. In addition to logical AND/OR/XOR LUT address translations, the system 8 will support logical blink to background, blink dimmer, blink brighter, and blink to reverse operation.

The raster engine 2 may further comprise a dual look up table (LUT) 10, wherein each LUT will allow the raster engine 2 to output 256 different pixel combinations of 24 bit pixels in lower color depth modes. The raster engine 2 is further adapted to support video information as DIB format stored in a packed pixel architecture, although the video information need not be stored in a packed line architecture. The raster engine 2 allows a different memory organization between video scan out and graphic image memory. Therefore, memory gaps may exist between lines. Accordingly, the graphics memory may be organized wider than the video frame. For example, this may be used for left and right panning of the displayed information.

The grayscale generator 12 is adapted to generate grayscales on monochrome (or color) display types. The grayscale generator 12 supports up to 8 grayscale shades including on and off, by dithering pixels based on frame count, screen location, and pixel value. For example, the pixel value may be determined by the least significant 3 bits from LUT translated pixel data for any bpp mode. The raster engine 2 loads image data from a special DMA interface to a DRAM memory controller, and further comprises a separate advanced high speed bus (AHB) bus master for collecting hardware cursor information from anywhere in a host computer system memory.

The raster engine 2 also provides hardware cursor support via hardware cursor logic system 24. System 24 comprises an AMBA cursor bus master 50, cursor address counters 52, cursor state machines 54, cursor output counters 56, and a cursor line buffer 58. The cursor image size is adjustable to 16, 32, 48, or 64 pixels wide by up to 64 pixels in height, and is stored anywhere in memory as a 2 bpp format. The image pixel information implies transparent, inverted, cursor color 1, or cursor color 2. The cursor hardware may be supplied an image starting address, 2 cursor colors, an X and Y screen location, and a cursor size. Using this information, the raster engine 2 overlays the cursor in the output video stream. Bottom and right edge clipping may also be performed by the raster engine hardware. The raster engine 2 further provides hardware cursor support for dual scan display types according to a selected display mode, as described in greater detail hereinafter.

The VILOSATI 14 connects to a dedicated DMA port on an SDRAM controller (not shown) and reads video image data from memory, such as a frame buffer, and thereafter transfers the image data to the video FIFO 16. VILOSATI 14 keeps track of image location, width, and depth for both progressive and dual scanned images, and responds to controls (e.g., FULL, DS_FULL) from the FIFO 16 for more video data. During single scan operation, when the FIFO 16 has room for a 16 word burst, the FULL signal is inactive and VILOSATI 14 attempts to initiate a burst. The VILOSATI 14 will initiate appropriate size transfers and bursts in order to get to a 16 word boundary. After this point, VILOSATI 14 will perform transfers more efficiently using 16 word long bursts. When the FIFO 16 is full (e.g., 40 to 64, 32 bit words), the current burst is completed, and no further data is requested. When FIFO 16 signals that it has room for a burst again, the image reading process from the frame buffer continues.

For dual scan operation, the FIFO 16 is split in two and operates with a separate FULL indicator for each half. In this mode, the FULL signal and a DS_FULL indicator (not shown) trigger from 12 to 32 words. For dual and single scan displays, information for the upper left corner of the display begins at a word address stored in a VIDSCRNPAGE register (not shown). For a dual scan display, information from the upper left corner of the lower half of the display begins at the word address stored in a VIDSCRNHPG register (not shown). The VIDSCRPAGE and VIDSCRNHPG registers are used to pre-load address counters at the beginning of a video frame. The VILOSATI 14 continues to service the video FIFO 16 until it has transferred an entire screen image (e.g., a frame) from memory. The size of the screen image is controlled by the values stored in a SCRNLINES register and a LINELENGTH register (not shown). The SCRNLINES register value defines the total number of displayed (active) lines for the video frame. The LINELENGTH register defines the number of words for each displayed (active) video line. A separate register, VLINESTEP (not shown), defines the word offset in memory between the beginning of each line and the next line. Setting the VLINESTEP value larger than the LINELENGTH value provides the capability for image panning.

The video FIFO 16 is used to buffer video data transferred from the frame buffer memory (e.g., of frame buffer 68 of FIG. 2A) to the video output system without stalling the video data stream of the raster engine 2. The FIFO 16 comprises a dual port RAM 32 with input and output address index counters 34 and 36, respectively, and a control logic system 38 to operate as a FIFO memory. The input data bus width to the FIFO 16 is 32 bits. During dual scan mode, wherein the display requires scan out of the bottom and top half of the screen at the same time, top half (or bottom half) information is stored in every other FIFO location. In progressive scan mode wherein video data is scanned out as a single progressive image, the FIFO data is stored sequentially. The FIFO output data bus is 64 bits wide and can output even and odd words on both the upper and lower half of the bus. Writes to the FIFO 16 advance the input index counter 34, while reads from the FIFO 16 advance the output index counter 36. The input and output counters 34 and 36 are compared to generate the FULL and DS_FULL output controls to the VILOSATI 14. The N_CLR signal resets both the input and output index counters 34 and 36 to 0, for example, at the end of a video frame.

The control logic 38 in the FIFO system 16 includes an underflow detection and indication system which operates to detect an underflow of the FIFO 16 (e.g., dual port RAM 32) and/or a near underflow condition therein, and to provide the Underflow_INT signal according to the detected underflow condition. The underflow system of the FIFO control logic 38 may include, for example, comparison logic for comparing the values of in and out counters 34 and 36, respectively, and for making a determination of whether an underflow condition exists or is anticipated. The Underflow_INT indication may be advantageously provided to a host processor (e.g., CPU 62 of FIG. 2A) whereby methods to balance bus loading or to limit burst sizes may be applied by the host processor. This feature is particularly advantageous where the raster engine interface with the frame buffer memory is via a bus isolated from that of the host processor. In this situation, the host may not be able to independently detect or sense bus loading conditions resulting in a starving raster engine. Thus, the invention provides for early indication to the host processor, whereby elimination or reduction in raster engine underflow conditions may be achieved.

Figure 2B:
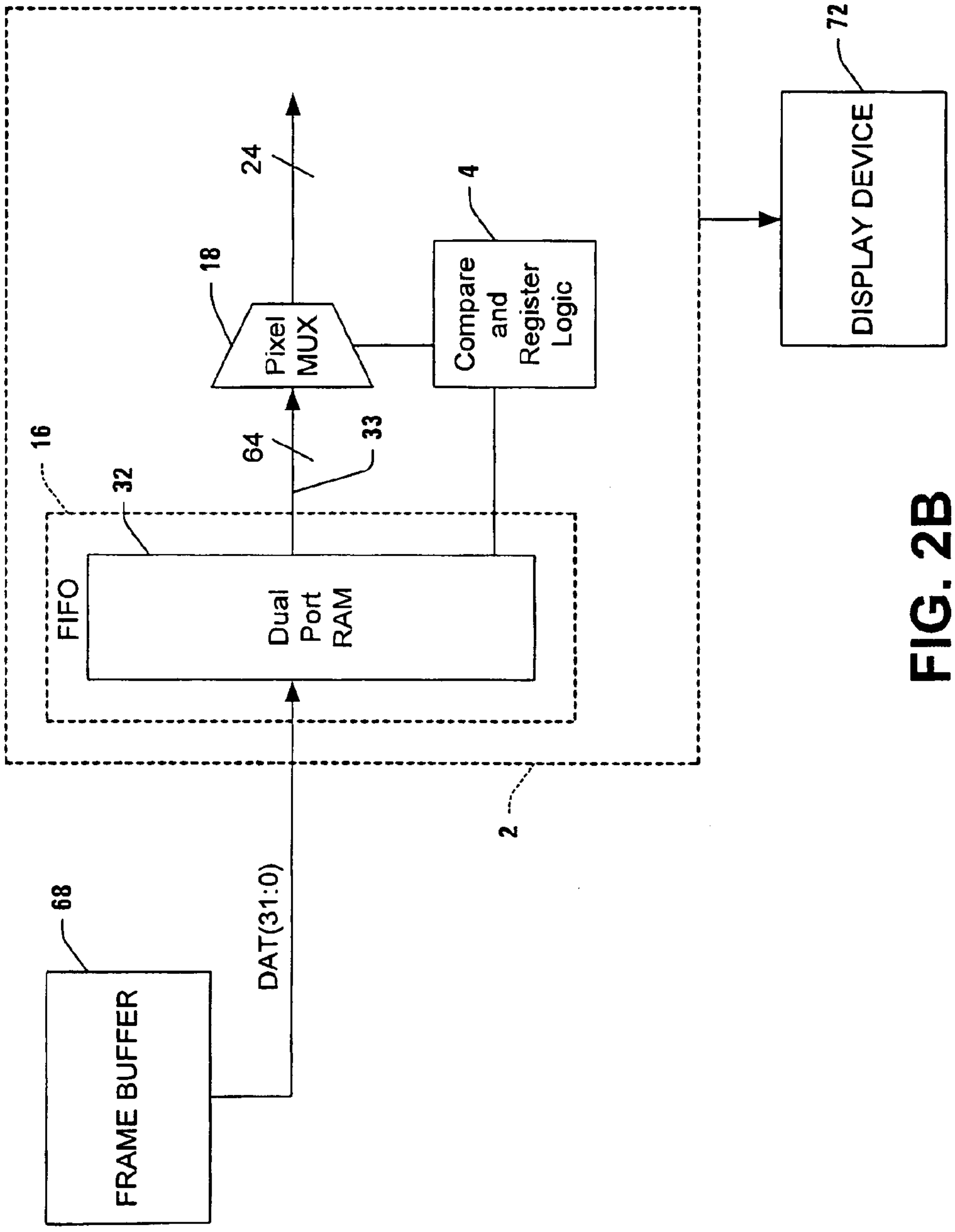
FIG. 2B is a schematic diagram further illustrating the raster engine of FIG. 1.

Referring also to FIG. 2B, the pixel reconstruction system of the raster engine 2 includes a pixel multiplexer 18 and pipe-line registers (not shown), wherein the pixel multiplexer 18 is operative to 'unpack' the video pixels stored in the dual port RAM 32 of the video FIFO 16. The stored FIFO words (e.g., 32 bit words in the dual port RAM 32) may be transferred 2 at a time across a 64 bit bus 33. The multiplexer 18 selects a single pixel to go on the 24 bit output bus based on the value set in a PIXELMODE register (e.g., in compare and register logic 4), as illustrated and described in greater detail hereinafter. The pixel multiplexer 18 is controlled by a pixel counter (not shown) that also increments based on the PIXELMODE register value.

The amount and frequency of data read from the FIFO 16 is dependent on the number of bits per pixel. For example, in an 8 bpp configuration, the 64 bit FIFO output is changed for every eight pixels. In dual scan mode, the upper 32 bits and lower 32 bits are read out in parallel and upper half screen and lower half screen pixels are unpacked and loaded into the video stream sequentially. The format of the video data in the frame buffer 68 may vary. For example, the data obtained by the dual port RAM 32 from the frame buffer 68 may comprise 4 bpp (bits per pixel), 8 bpp, 16 bpp 555 mode, 16 bpp 565 mode, 24 bpp mode or 32 bpp data formats. The pixel multiplexer 18 selects appropriate pixel data from the dual port RAM 32 according to a selected display mode, and accordingly provides the selected pixel data to match an output format required by the selected display type. The raster engine 2 thereby provides for selective remapping of the pixel data from the frame buffer format to a format appropriate for interfacing to a selected display device type, without requiring rerouting of signals outside of the raster engine. This remapping feature is provided via one or more user programmable control registers, which may be included within the compare and register logic 4 as illustrated in FIG. 2B, or which may reside elsewhere in the raster engine 2.

Bounded Video Signature Analyzer

Figure 3:
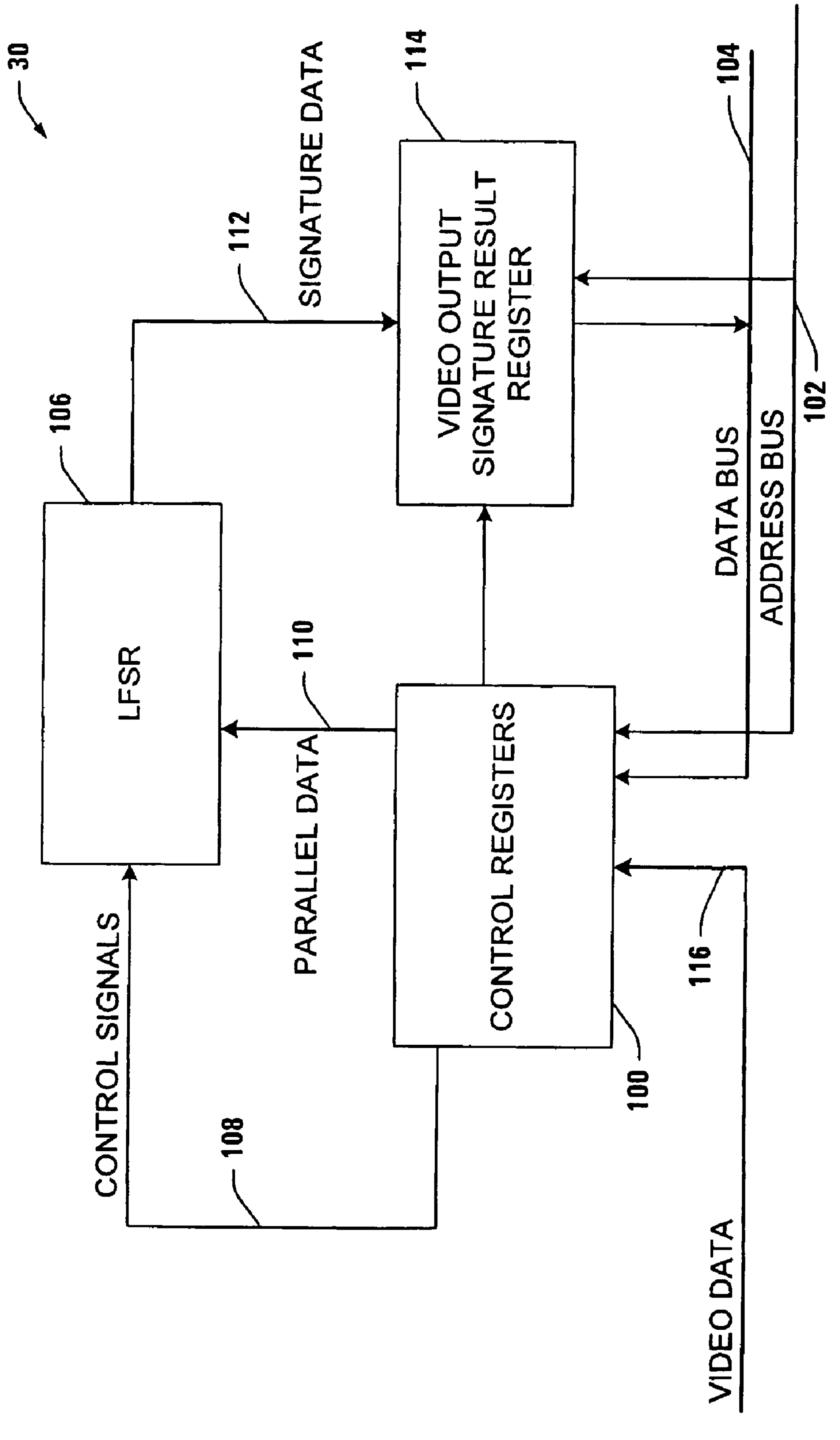
FIG. 3 is a schematic diagram illustrating an exemplary signature analyzer in accordance with an aspect of the invention.

Referring now to FIG. 3, the exemplary bounded video output signature analyzer 30 is illustrated having control registers 100 accessible to a host processor in the system (e.g., system 60 of FIG. 2A) via an address bus 102 and a data bus 104 (e.g. collectively system bus 66 of system 60), and further comprising a linear feedback shift register (LFSR) 106 receiving control signals 108 and parallel video data 110 from control registers 100, and providing video signature data 112 to a video output signature result register 114. Registers 100 may be, for example, included within the compare and register logic 4 of raster engine 2 in FIG. 1, and receive video data 116 from the mux 40 of the raster engine 2. Signature analyzer 30 may be used for built in self testing of reference images to ensure proper operation of the entire video system and data path. In addition, the signature analyzer 30 is operative to perform selective analysis of a portion of the video data from the raster engine 2. The bounded video signature analyzer 30 thus may perform signature analysis on one or more selected portions of the video data, in order to allow testing of video screen images having features which change over time (e.g., clocks, date indications, and the like). The video timing section (e.g., counters 28 and compare and register logic 4) of the exemplary raster engine 2 provides enable and clear control signals that determine the area of the output image that is used for the signature analysis calculation and at what time the next signature starts/last value is stored.

Figure 4:
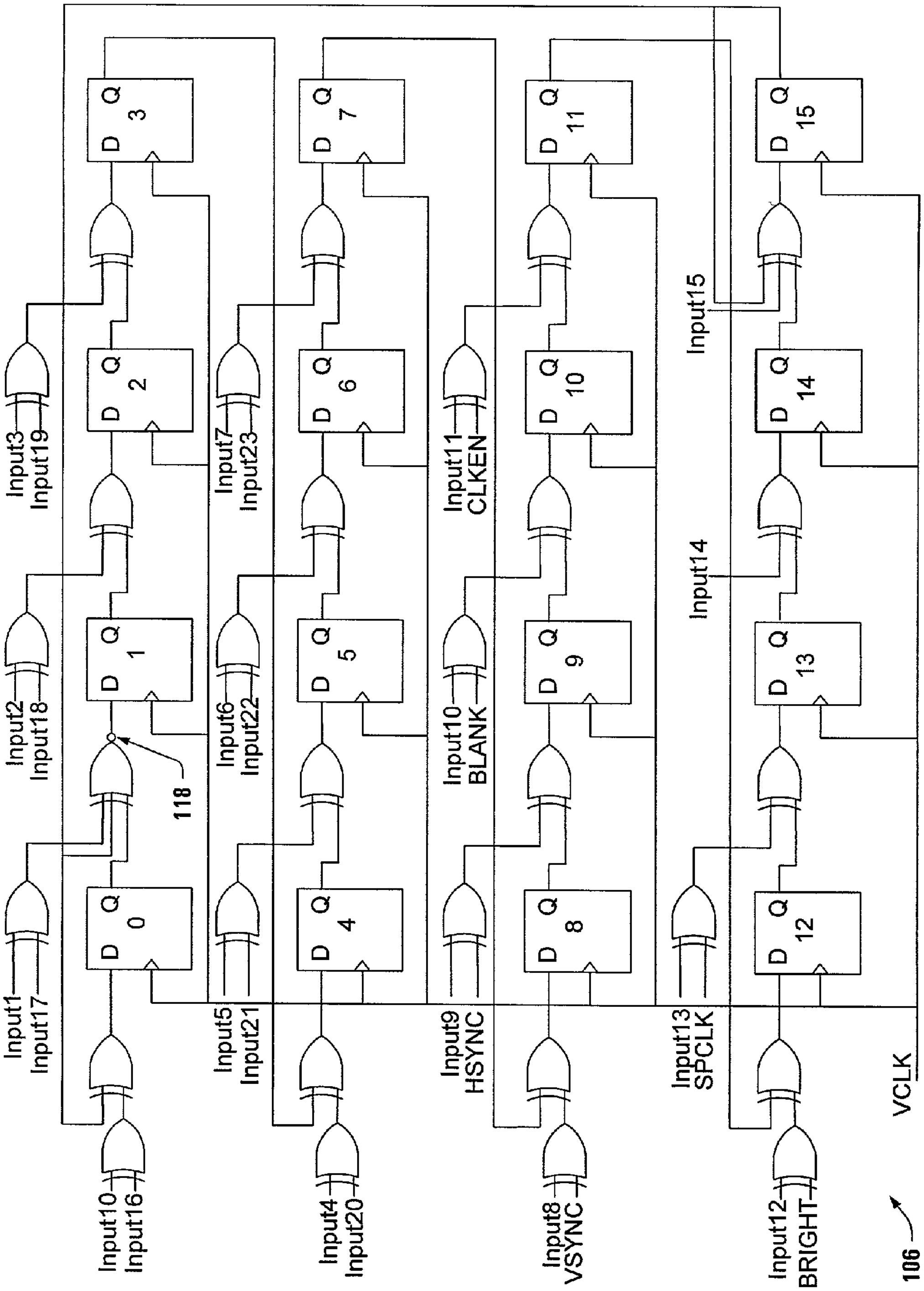
FIG. 4 is a schematic diagram illustrating an exemplary linear feedback shift register in accordance with another aspect of the invention.

Referring also to FIG. 4, the video analyzer LFSR 106 is illustrated having parallel inputs input0 through input23 for incoming video data to be analyzed. Timing control signals are also fed into the LFSR 106 as parallel data to be analyzed. Each parallel input into the video signature analyzer LFSR 106 may be separately enabled in the control registers 100. Result storage register 114 receives a signature value from the LFSR 106 which is unique to the input video data 110, and may be read via the host computer system (e.g., system 60 of FIG. 2A). For example, a new signature is calculated once per frame and stored based on a programmed signature clear location. During grayscale operation, the signature may be automatically taken over a 12 frame or other interval.

Depending on the refresh frequency of the display device 72, this could be a significant time interval. For example, the analyzer may have a calculation interval of 500 ms or more before updating the signature value. In addition, the signature analyzer LFSR 106 includes a logical inversion 118 in the feedback chain, whereby a non-zero signature output is provided by LFSR 106 in response to zero parallel input data 110 from control registers 100. Thus, for a zero seed value and null inputs, a signature is still generated based on the number of clock pulses.

The integration of the signature analyzer 30 with the raster engine 2, allows the raster engine 2 to be tested after shipment to an end user or retailer, and further enables self-testing initiated via the control registers 100 by a user and/or an application programming running on a host computer system (e.g., system 60). This integration provides significant advantages over conventional video signature analyzers and video controllers where a separate signature analyzer had to be connected to a raster engine to perform such signature analysis.

Figure 5:
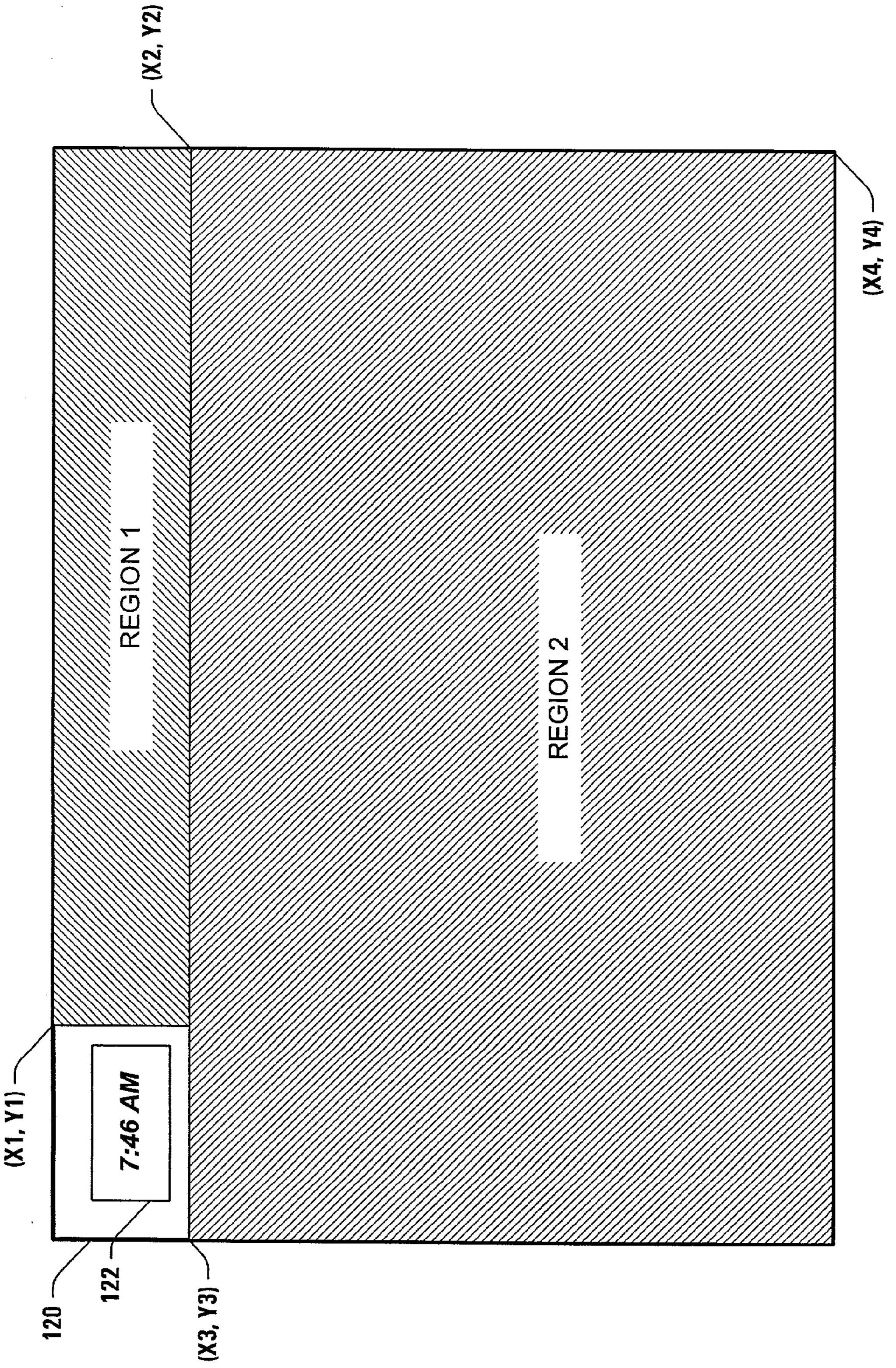
FIG. 5 is a schematic diagram illustrating a bounded video signature analysis for a bounded portion of a display using the exemplary signature analyzer of FIG. 3.

The signature analyzer 30, moreover, is bounded. The analyzer 30 may thus be programmed (e.g., via control registers 100) to analyze a portion of a video screen data set, whereby selective avoidance of certain display areas may be achieved. Referring also to FIG. 5, an exemplary display screen 120 is illustrated having a clock image 122 displayed thereon. Thus, where it is known that the clock image 122 changes over time, the signature analyzer 30 may be adapted to selectively analyze one or more regions REGION 1 and/or REGION 2 in the display 120. Thus, the signature analyzer 30 may first analyze the video data between display locations (X1, Y1), and (X2, Y2) to obtain a signature for REGION 1, and subsequently analyze the video data between locations (X3, Y3) and (X4, Y4) to generate a signature for REGION 2. This capability allows successful signature analysis of the majority of the display 120 by comparison to known good signature information, without experiencing false indications of failure due to the changing nature of the clock image 122, which false indications were common in prior non-bounded signature analyzers.

Figure 6A:
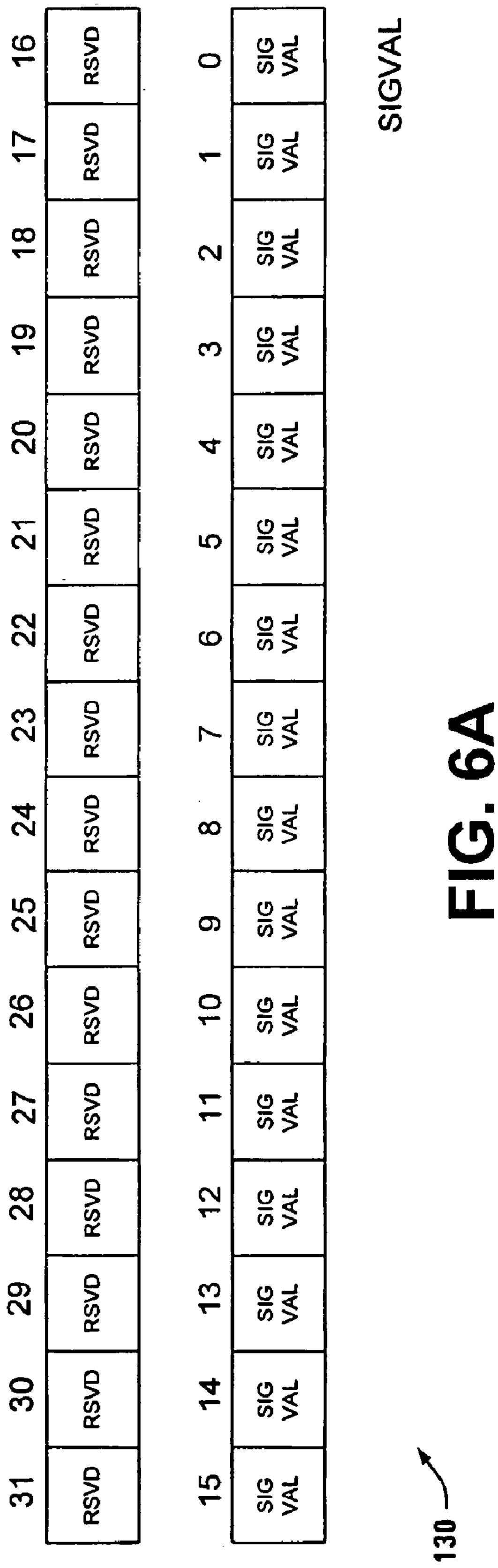

Referring also to FIGS. 6A through 6E, exemplary control registers SIGVAL 130, SIGCTL 132, VSIGSTRTSTOP 134, HSIGSTRTSTOP 136, and SIGCLR 138 are illustrated. The registers 130, 132, 134, 136, and 138 may be included within control registers 100 of FIG. 3. SIGVAL 130 is a video output signature result value register (e.g., register 114 of FIG. 3), having reserved bits RSVD, and SIGVAL[15:0] bits. The read only SIGVAL value is the 16 bit result of the video output signature. This value may be updated once per frame based on the SIGCLR location. During grayscale operation, the SIGVAL register may be updated once every 12 frames. The SIGCTL register 132 of FIG. 6B is a video output signature control register, having the following bit descriptions: EN: enable bit, which enables a linear feedback shift register; RSVD (reserved) bits; SPCLK bit which may be used to enable the SPCLK output for calculation in the video signature; BRIGHT bit used to enable the BRIGHTNESS control output for calculation in the video signature; a CLKEN bit used to enable the CLKEN control for calculation in the video signature; a HSYNC bit used to enable the HSYNC output for calculation in the video signature; a VSYNC bit is used to enable the VSYNC output for calculation in the video signature; and PEN[23:0] bits, which may be used to enable individual pixel bits for calculation in the video signature.

The SIGSTRTSTOP register 134 is a vertical signature bounds start/stop register, having reserved bits RSVD and STOP[10:0] bits to provide a value of a vertical down counter at which the VSIGEN signal goes inactive. This may be used to indicate the end of a signature calculation for a vertical frame. VSIGEN may be an internal block signal. The SIG_ENABLE control to the video signature analyzer may be enabled by the logical AND of VSIGEN and HSIGEN. In addition, the SIGSTRTSTOP register 134 further includes STRT[10:0] bits which indicate a value of the vertical down counter at which the VSIGEN signal becomes active. This may indicate the beginning of the signature calculation for the vertical frame. VSIGEN is an internal block signal. The SIG_ENABLE control to the video signature analyzer may be enabled by the logical AND of VSIGEN and HSIGEN.

The HSIGSTRTSTOP register 136 is a horizontal signature bounds start/stop register, having reserved bits RSVD and STOP[10:0] bits which indicate a value of the horizontal down counter at which the HSIGEN signal goes inactive, indicating the end of the signature calculation for a horizontal line. HSIGEN is an internal block signal. The SIG_ENABLE control to the video signature analyzer may be enabled by the logical AND of VSIGEN and HSIGEN. Register 136 further comprises STRT[10:0] bits indicating a value of the horizontal down counter at which the HSIGEN signal becomes active. This indicates the beginning of the signature calculation for a horizontal line. HSIGEN is an internal block signal. The SIG_ENABLE control to the video signature analyzer is enabled by the logical AND of VSIGEN and HSIGEN.

The SIGCLR register 138 is a signature clear location register having reserved bits RSVD and VCLR[10:0] bits which may indicate a value of the vertical down counter at which the VSIGCLR signal is active. This indicates the line for clearing the LFSR and storing the result value for the vertical frame. VSIGCLR is an internal block signal. The SIG_CLR control to the video signature analyzer is generated by the logical AND of VSIGCLR and HSIGCLR. The SIGCLR control signal is also routed to an edge trigger capable interrupt on the interrupt controller for use as a programmable secondary REALITI interrupt output. Register 138 further comprises HCLR[10:0] bits which may indicate a value of the horizontal down counter at which the HSIGCLR signal is active. This indicates the specific horizontal pixel clock for clearing the LFSR and storing the result value within a horizontal line. HSIGCLR is an internal block signal. The SIG_CLR control to the video signature analyzer is generated by the logical AND of VSIGCLR and HSIGCLR. The SIGCLR control signal is also routed to an edge trigger capable interrupt on the interrupt controller for use as a programmable secondary REALITI interrupt output.

Hardware Cursor

Figure 7B:
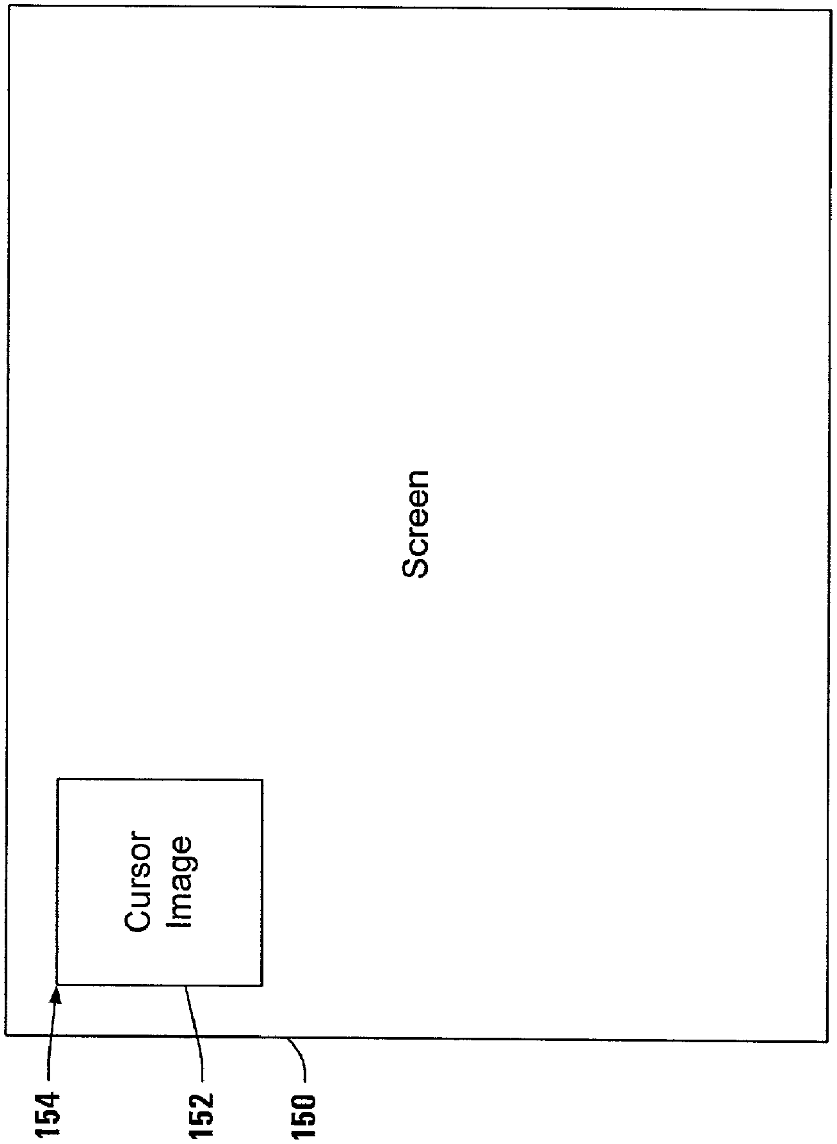
FIG. 7B is a schematic diagram illustrating an exemplary progressive scan display including the cursor image of FIG. 7A.
Figure 7A:
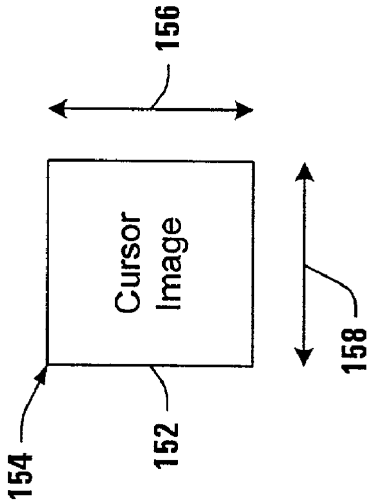
FIG. 7A is a schematic diagram illustrating an exemplary cursor image in accordance with another aspect of the invention.

The raster engine 2 further provides support for a hardware cursor, via the exemplary hardware cursor system 24 of FIG. 1. The hardware cursor system 24 is adapted to support dual as well as progressive scan display types according to a selected display mode, as described in greater detail hereinafter. Referring to FIGS. 7A and 7B, a progressive scan display 150 is illustrated having a cursor image 152 displayed thereon. The cursor image 152 has a starting address 154 (e.g., X and Y location), a vertical height 156, and a width 158, for example, where the height 156 and width 158 may be expressed in terms of lines and pixels, respectively. The hardware cursor system 124 is adapted to selectively overlay the cursor image 152 onto the display 150 in progressive scan mode. For a progressive scanned images, the system 24 is provided a starting address in memory for the cursor image 152, the X and Y location 154, the height 156 of the cursor in lines, and the width 158 of the cursor in pixels. A single line of the cursor image 152 is then loaded into the storage registers 100 of FIG. 1. As the display 150 is scanned, the system 24 waits for the appropriate X and Y location on the line and pixel counters (e.g., horizontal and vertical counters 28 of FIG. 1), and then overlays the cursor data into the video stream via the mux 20.

Figure 8B:
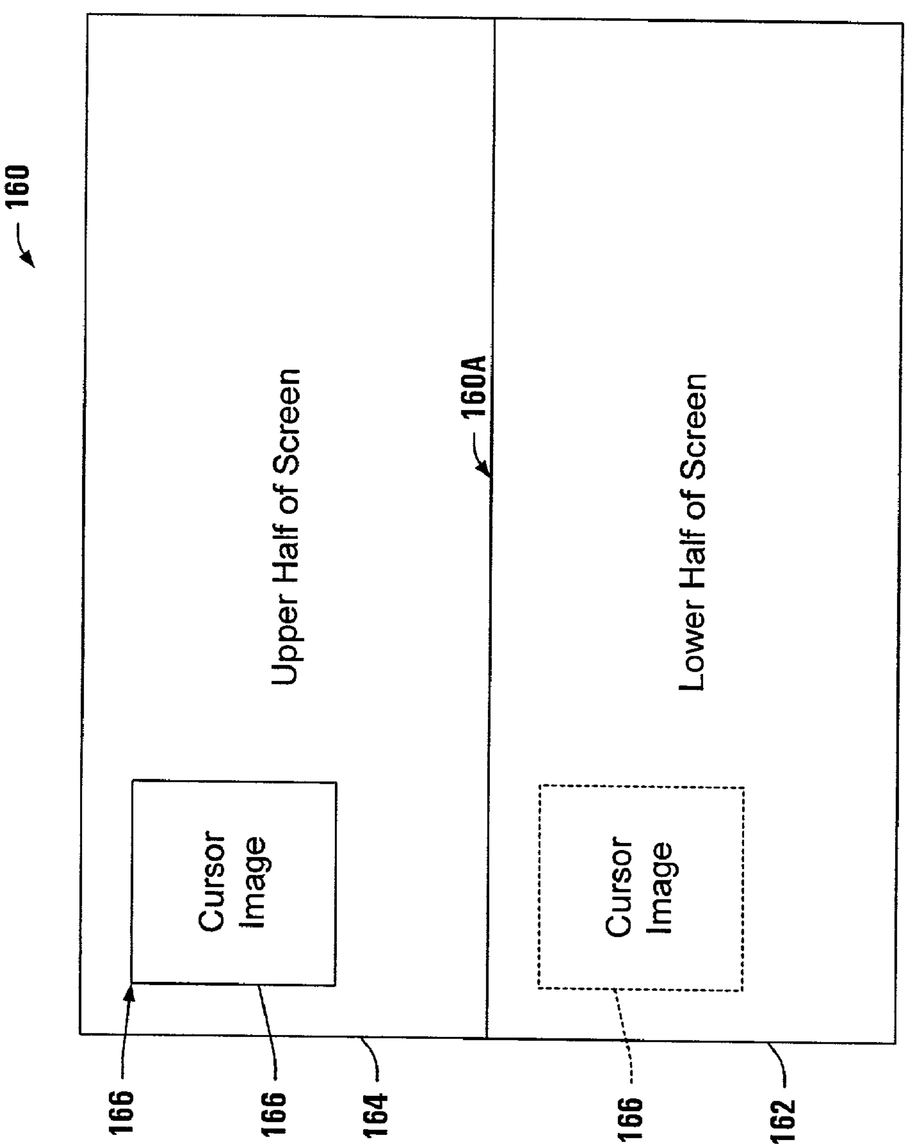
FIG. 8B is a schematic diagram illustrating an exemplary dual scan display including the cursor image of FIG. 8A.
Figure 8A:
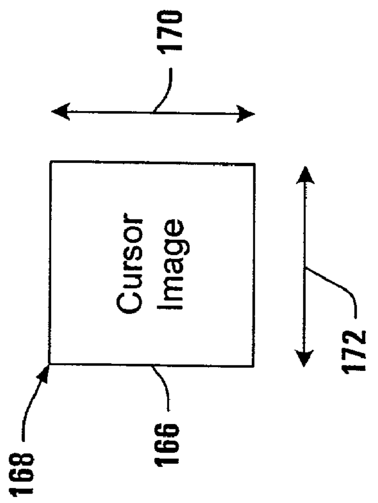
FIG. 8A is a schematic diagram illustrating another exemplary cursor image in accordance with the invention.

Referring now to FIGS. 8A and 8B, an exemplary dual scan display 160 is illustrated having adjacent first display portion 162 and second display portion 164, providing lower and upper halves of the display 160, respectively, and with a display boundary 160A therebetween. The dual scan display 160 may be refreshed by scanning out the first and second display portions 162 and 164 at the same time in parallel. A cursor image 166 has a start address 168, a vertical height 170, and a width 172. The hardware cursor system 24 is adapted to selectively overlay the cursor image 166 onto one of the first and second portions 162 and/or 164, respectively of the display 160 in dual scan mode.

Figure 9B:
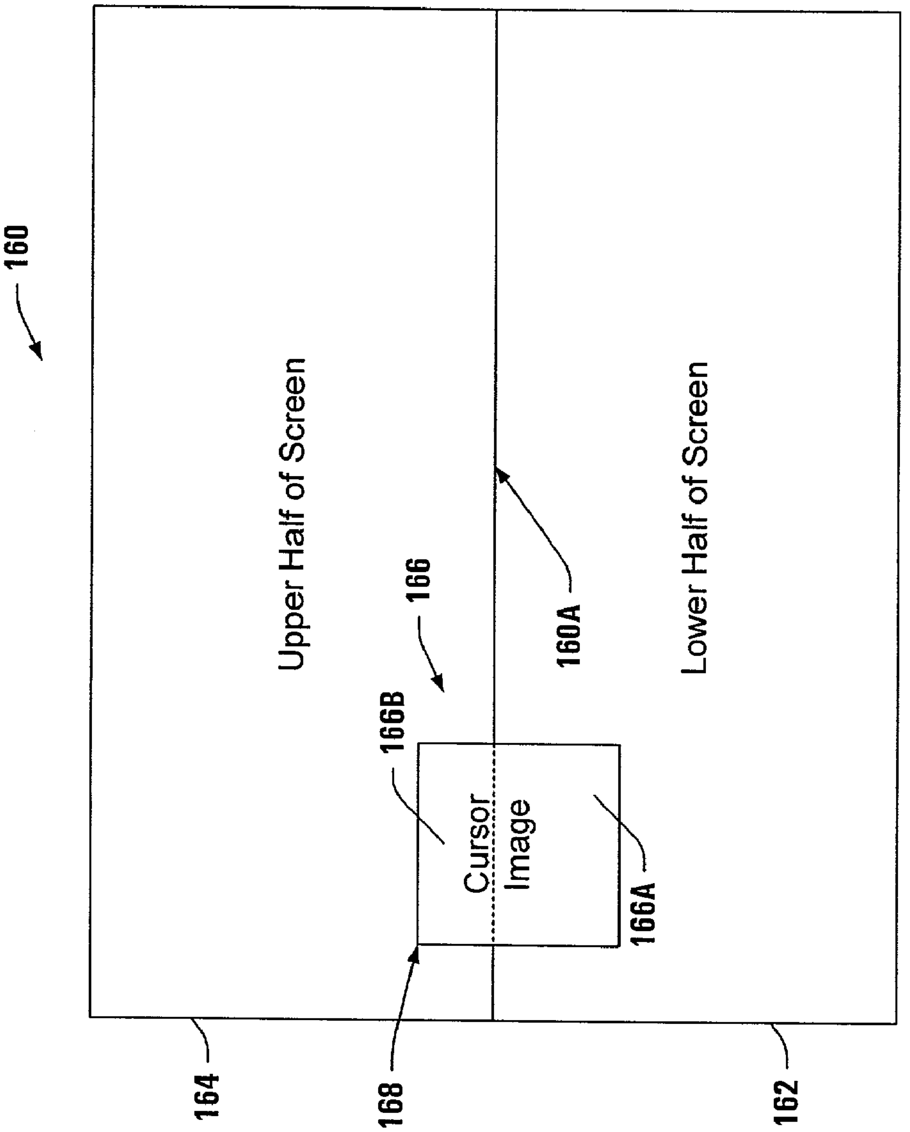
FIG. 9B is a schematic diagram illustrating the exemplary dual scan display of FIG. 8B including the cursor image of FIG. 9A.
Figure 9A:
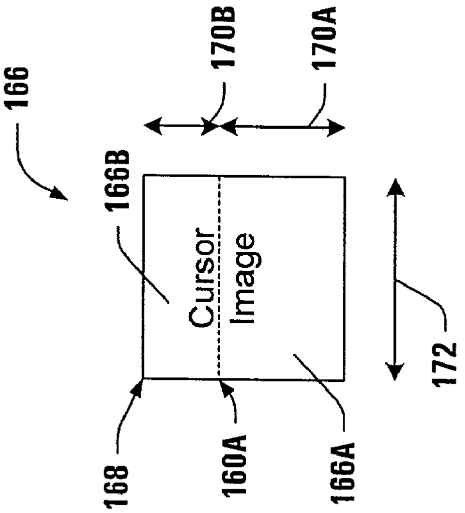
FIG. 9A is a schematic diagram illustrating another exemplary cursor image in accordance with the invention.

Referring also to FIGS. 9A and 9B, the cursor image 166 is illustrated crossing the display boundary 160A, wherein a first portion 166A thereof is in the first or lower portion 162 of the display 160 having a first cursor portion height 170A, and wherein a second cursor portion 166B is in the second or upper display portion 164 having a second cursor portion height 170B. For dual scanned images, the hardware cursor system 24 is provided with the X and Y coordinates or location of where to begin inserting the cursor image 166 into the video stream, the address of where the first portion 166A of the cursor image 166 is to be overlayed, the Y location or coordinate of the second portion 166B of the cursor image 166 if applicable (e.g., where the cursor image 166 crosses the display boundary 160A), the address at which to start looking for the next part of the cursor image 166 to be overlayed (e.g., the second cursor portion 166B) after overlaying the last line of the cursor image first portion 166A, the first and second cursor portion heights 170A and 170B, respectively (if applicable), the cursor width 172, and whether the cursor image 166 is in the first display portion 162, the second display portion 164, or both (e.g., cursor image 166 crosses the display boundary 160A).

The hardware cursor system 24 employs this information to overlay the cursor image 166 onto the display 160 by selectively inserting cursor image data into the video stream of the raster engine 2 via the mux 20. Initially, the first line of the first portion 166A of the cursor image 166 is loaded into one or more registers (e.g., of compare and register logic 4) from the start address. As the display 160 is scanned, the cursor system 24 waits for the X and Y location on the horizontal and vertical counters 28, and overlays or inserts the appropriate cursor data into the video stream. In dual scan operation where the cursor image 166 appears only in one of the first and second display portions 162 and 164, respectively, the cursor image data is overlaid in the appropriate display portion. This process continues until all the cursor image data lines have been inserted into the video stream via the mux 20. If the cursor is entirely in one of the display portions 162 or 164, this completes the cursor image overlay until the next video image frame.

Where the cursor image 166 crosses the display boundary 160A, the hardware cursor system 24 jumps to the address location for the second cursor portion 166B, which is also known as the reset address. The first line of the second cursor portion 166B is then loaded into the storage buffer registers of compare and register logic 4. It will be appreciated that where the dual scanning simultaneously scans from top to bottom of each of the first (lower) portion 162 and the second (upper) portion 164 of the display 160, that the first (lower) cursor portion 166A will be overlayed into the video stream for the first (lower) display portion 162 prior to the second (upper) cursor portion 166B being overlayed into the video stream for the second (upper) display portion 164, although the invention contemplates other scanning methodologies. The system 24 then waits for the same X and the second Y location in the line and pixel counters (e.g., via cursor output counters 56, compare and register logic 4, and horizontal and vertical counters 28). At the appropriate counter values, the cursor line buffer 58 overlays the second cursor portion 166B into the video stream for the second (upper) display portion 160B via the mux 20 until the second cursor portion 166B has been completely overlayed (e.g., according to the height 170B of the second cursor portion 166B).

In this fashion, fast hardware cursor overlaying is provided for progressive as well as dual scanned display types according to a selected display type. The invention thus provides significant reduction in the processing resource overhead associated with conventional software cursor overlay techniques, and programmatically supports a variety of disparate display and cursor types. For example, the cursor image size may be adjustable to 16, 32, 48, or 64 pixels wide by up to 64 pixels in height, and may be stored anywhere in memory as a 2 bpp.

The image pixel information implies transparent, inverted, cursor color 1, or cursor color 2. The cursor hardware system 24 may be supplied an image starting address, 2 cursor colors, an X and Y screen location, and a cursor size. Using this information, the raster engine 2 overlays the cursor in the output video stream. Bottom and right edge clipping may also be performed by the raster engine hardware 24. The bus mastering interface 50 to an AMBA bus allows the hardware cursor image to be stored anywhere in host system memory (e.g., memory 64 of FIG. 2A). Software provides a location start, reset, size, x & y position, and two cursor colors. The system 24 loads a line at a time from memory and multiplexes the video stream data based on the cursor values. The X & Y locations are compared to the horizontal and vertical counters (e.g., counters 28 of raster engine 2) and trigger the state machine 54 to enable the cursor output overlay via the cursor line buffer 58 and the mux 20.

Figure 10:
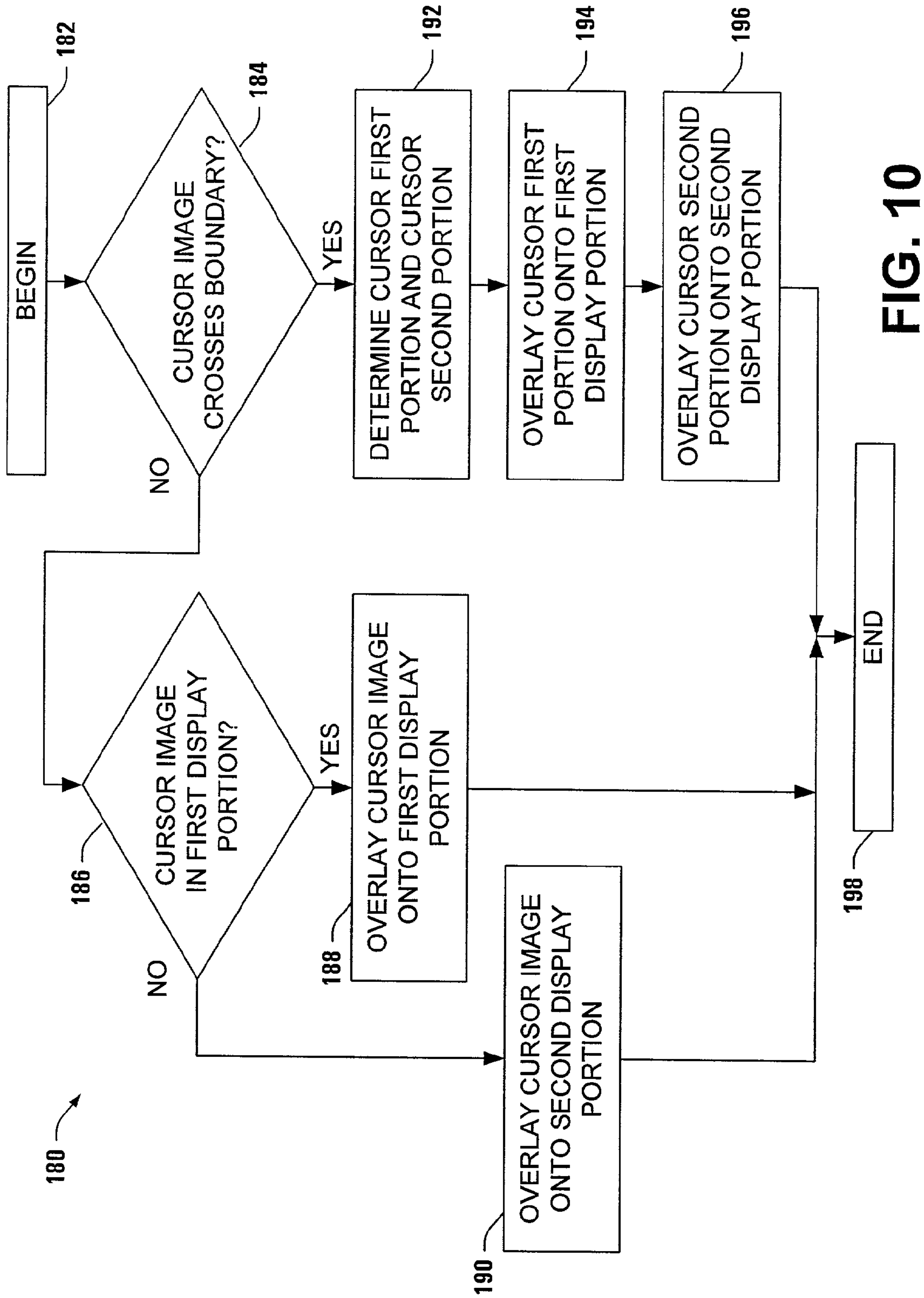
FIG. 10 is a flow diagram illustrating an exemplary method in accordance with another aspect of the invention.

The invention further comprises a method of overlaying a cursor image onto a dual scan display. Referring to FIG. 10, an exemplary method 180 is illustrated for each frame beginning at step 182. In dual scan display mode, decision step 184 determines whether the cursor image (e.g., image 166 of FIG. 9A) crosses the display boundary (e.g., display boundary 160A of display 160). If not, decision step 186 determines whether the cursor image is in the first display portion (e.g., first display portion 162). If so, the cursor image is overlayed onto the first display portion at step 188. If not, the cursor image is overlayed onto the second display portion (e.g., second display portion 164) at step 190. Where the cursor image crosses the display boundary at step, 184, the method 180 proceeds to step 192 where the first and second portions of the cursor are determined (e.g., first and second cursor portions 166A and 166B of FIG. 9A). Thereafter, the first cursor portion is overlayed onto the first display portion at step 194, after which the second cursor portion is overlayed onto the second display portion at step 196. Once the cursor image has been thus overlayed onto the dual scanned display, the method 180 ends at step 198, until the next frame is to be scanned out.

Figure 11A:
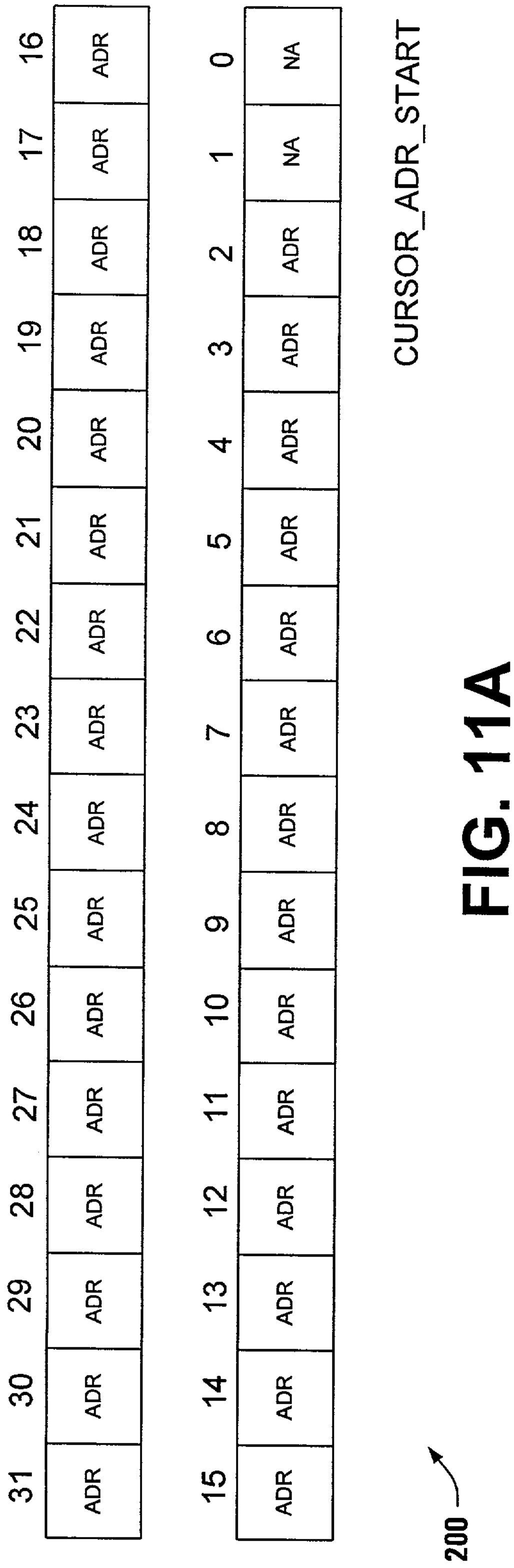

Referring now to FIGS. 11A through 11G, various registers operatively associated with the hardware cursor system 24 are illustrated and described hereinafter. It will be appreciated that the registers of FIGS. 11A through 11G may be included in the compare and register logic 4 of the exemplary raster engine 2 in FIG. 1, or alternatively may be located elsewhere in the raster engine 2. In FIG. 11A, a CURSOR_ADR_START register 200 is illustrated. This register 200 is a cursor image address start register having reserved bits RSVD and ADR[31:2] bits indicating the beginning word location of the part of the cursor image to be displayed first. The image is 2 bits per pixel, and may be stored linearly. The amount of storage space is dependent on the width and height of the cursor. Reset is the beginning word location of the part of the cursor which will be displayed next after reaching the last line of the cursor. These locations are used for dual scan display of cursor information. If the cursor is totally in the upper half or lower half of the screen, the Start and Reset locations may be the same. Otherwise the cursor may be overlaid on the video information at the start address, and when the dual scan height counter generates a carry, will jump to the reset value. The cursor then continues to be overlaid when the Y location is reached, and will jump to the start address value when the height counter for the upper half generates a carry. Offsetting the start value and changing the width of the cursor to be different from the cursor step value allows the appropriate 48, 32, or 16 pixels of a larger cursor to be displayed only. Furthermore, offsetting the starting X location off of the left edge of the screen allows pixel placement of the cursor off of the screen edge.

Figure 11B:
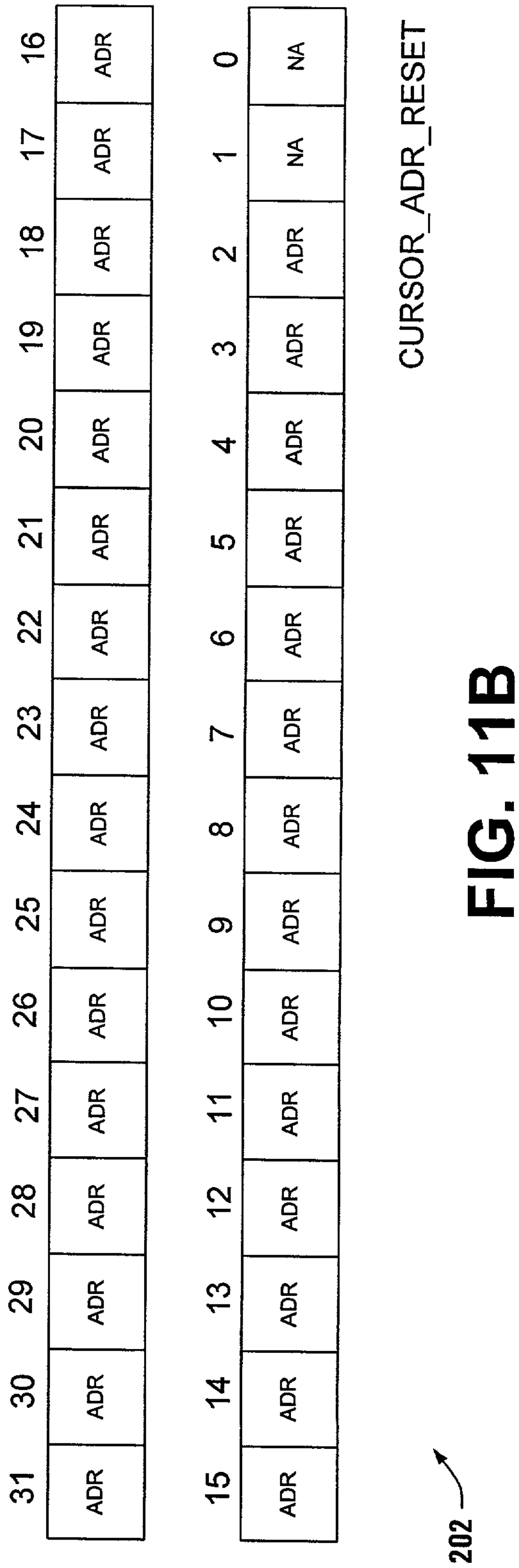

In FIG. 11B, a CURSOR_ADR_RESET register 202 is illustrated, having reserved bits RSVD and ADR[31:2] bits indicating the beginning word location of the part of the cursor which may be displayed next after reaching the last line of the cursor. Both start and reset locations are employed for dual scan display of cursor information. If the cursor is totally in the upper half or lower half of the screen, the Start and Reset locations may be the same. Otherwise (the cursor image crosses the display boundary) the cursor will be overlaid on the video information beginning at the start address, and when the dual scan height counter generates a carry, will jump to the reset value. The cursor will then continue to be overlaid when the Y location is reached, and will jump to the start address value when the height counter for the upper half (e.g., the second display portion) generates a carry. Offsetting the reset value and changing the width of the cursor to be different from the cursor step value allows the appropriate 48, 32, or 16 pixels of a larger cursor to be displayed only. Furthermore, offsetting the reset X location off of the left edge of the screen will allow pixel placement of the cursor off of the screen edge.

A CURSORSIZE register 204 is illustrated in FIG. 11C for setting the cursor height, width, and step size, having reserved bits RSVD and DLNS[5:0] (dual scan lower half lines) bits which may be set to the number of cursor lines displayed in the lower half of the screen in dual scan mode. Register 204 further comprises CSTEP[1:0] cursor step size bits, which control the counter step size for the width of the cursor image. For example, the following cursor step sizes are possible according to the CSTEP bits: 00=step by 1 word or 16 pixels at a time, 01=step by 2 words or 32 pixels at a time, 10= step by 3 words or 48 pixels at a time; and 11=step by 4 words or 64 pixels at a time. The register 204 further comprises CLINS[5:0]: cursor line bits, which control height in lines of the cursor image. The value may be set, for example, to the number of lines minus 1. In a dual scan mode this may be set to the number of cursor lines displayed in the top half of the screen. Also included in register 204 are CWID[1:0]: cursor width bits, which control the displayed word width (minus 1) of the cursor image, which may have the following values: 00=display 1 word or 16 pixels; 01=display 2 words or 32 pixels; 10=display 3 words or 48 pixels; or 11=display 4 words or 64 pixels.

In FIG. 11D, the CURSORCOLOR1, CURSORCOLOR2, CURSORBLINK1, and CURSORBL1 registers 206 are illustrated for defining the color of the displayed cursor image. The registers have the following bit definitions: RSVD: Reserved; COLOR[23:0]: Image color inserted directly in the video pipeline, which overlays all other colors when cursor enabled, and may not go through LUT. (e.g., look up table 10). The 2 bit per pixel stored cursor image bits may, for example, be displayed as follows: 00=transparent; 01=invert video stream; 10=CURSORCOLOR1 during no blink, CURSORBLINK1 during blink; and 11=CURSORCOLOR2 during no blink, CURSORBLINK2 during blink.

Figure 11E:
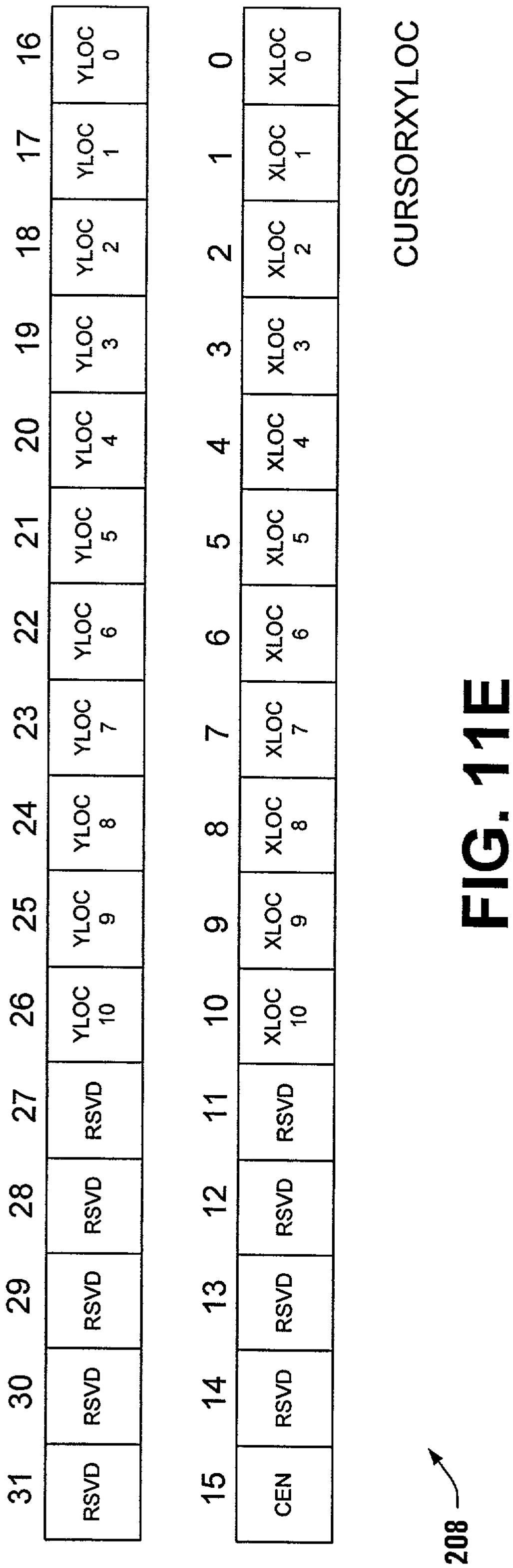

Referring to FIG. 11E, a CURSORXYLOC register 208 is illustrated for defining the X and Y cursor location, which includes reserved bits RSVD and YLOC[10:0] bits which control the starting vertical Y location of the cursor image. The value is used to compare to the vertical line counter and may be set by software to be between the active start and active stop vertical line values. The cursor hardware 24 may clip the cursor at the bottom of the screen. The new location value may not be used until the next frame to prevent cursor distortion. Also included in the register 208 is a CEN bit, which may be used to enable the hardware to insert the defined cursor into the image output video stream. For example, when active, data from a location defined by the CURSORADR register may be combined with the output video stream. Thus, the CEN bit may have the following values: 0=hardware cursor not activated; and 1=hardware cursor activated. During dual scan mode this bit may be used to indicate that some or all of the cursor is located on the upper half of the screen. The XLOC[10:0]: bits control the starting horizontal X location of the cursor image. The value may be used to compare to the horizontal pixel counter and may be set by software to be between the active start and active stop horizontal pixel values. The cursor hardware may clip the cursor at the right edge of the screen. This value may also be used to control the starting location for the cursor image on the upper half of the screen during dual scan mode. The new location value may not be used until the next frame to prevent cursor distortion.

Figure 11F:
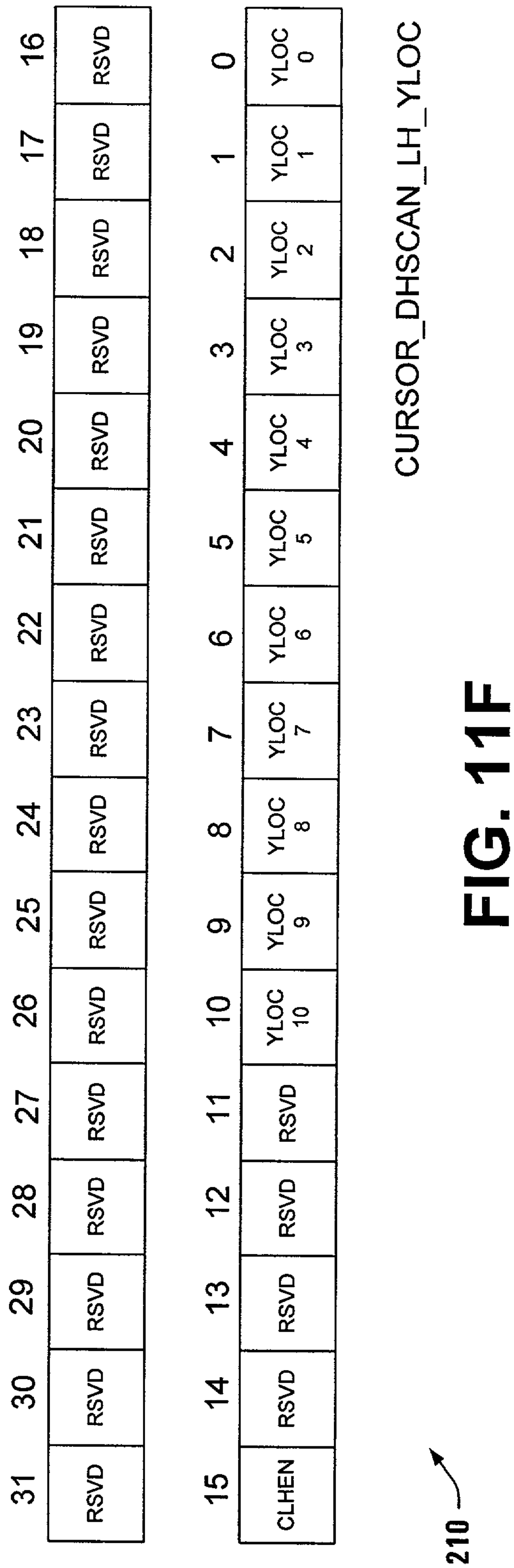
Figure 11G:
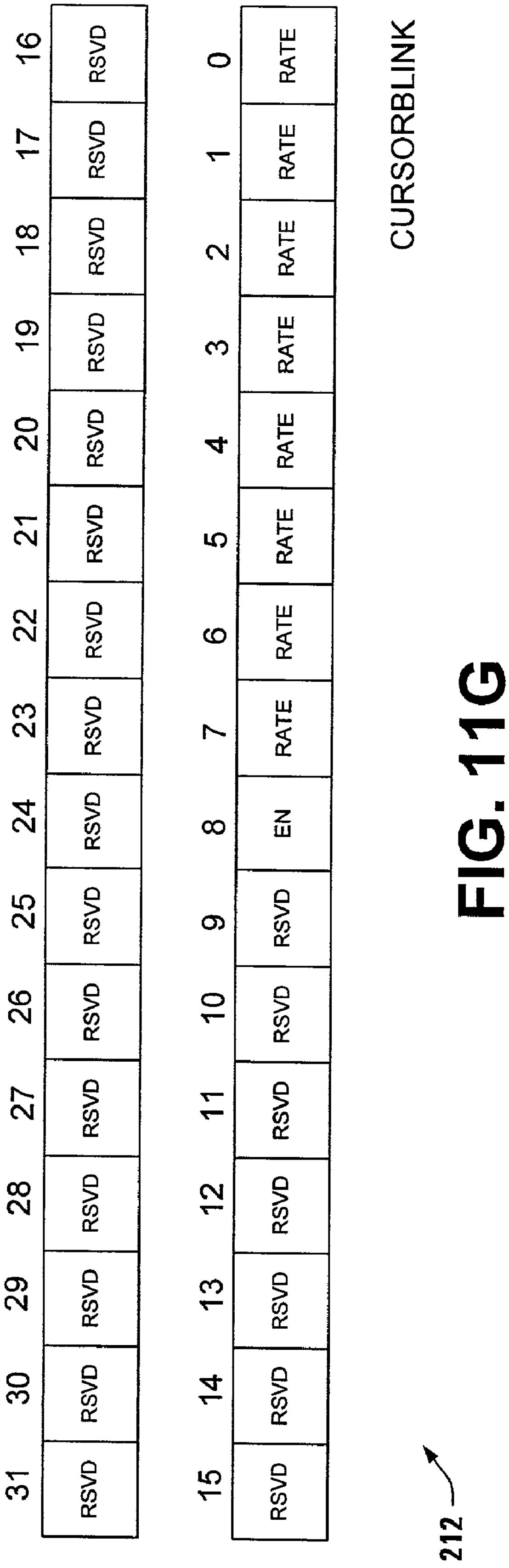

In FIG. 11F, a CURSOR_DHSCAN_LH_YLOC register 210 is illustrated for indicating the X and Y cursor location. This register 210 includes reserved bits RSVD, a CLHEN bit (cursor lower half enable) indicating that some or all of the cursor is located on the lower half of the screen, and YLOC[10:0]bits, wherein during dual scan display mode, the YLOC[10:0] value controls the starting vertical Y location on the lower half of the screen for the cursor image. The value may be used to compare to the vertical line counter and may be set by software to be between the active start and active stop vertical line values. The cursor hardware may clip the cursor at the bottom of the screen. The new location value may not be used until the next frame to prevent cursor distortion. In FIG. 11G, a CURSORBLINK register 212 is illustrated, which may be used to control the blink rate for the cursor image. CURSORBLINK register 212 includes reserved bits RSVD and an EN (hardware cursor blinking enable) bit used to enable blinking for CURSORCOLOR1 and CURSORCOLOR2 to CURSORBLINK1 and CURSORBLINK2 registers (206) respectively. This bit may also enable the cursor blink rate counter, according to the following values: 0=hardware cursor blinking not activated, and 1=hardware cursor blinking activated.

Register 212 further comprises RATE[7:0] bits. The value of the RATE bits may be used to control the number of video frames that occur before switching between CURSORCOLOR1 or CURSORCOLOR2 and CURSORBLINK1 or CURSORBLINK2 registers (206) respectively. An on/off cursor blink cycle may be controlled by the following equation: Blink Cycle=2×(1/VXTAL2)×HCLKSTOTAL×VLINESTOTAL×(255−BLINKRATE). This pertains to a 50% duty cycle blink rate, however other duty cycle blink rates may be attained by using an appropriate count value and comparison value.

In the above registers 200–212, Start is the beginning word location of the part of the cursor image to be displayed first. The image may be 2 bits per pixel, and may be stored linearly. The amount of storage space may depend on the width and height of the cursor. The two bits correspond to show screen image (transparent), invert screen image, display color1, and display color2. Reset is the beginning word location of the part of the cursor which will be displayed next after reaching the last line of the cursor. These locations may be advantageously employed for dual scan display of cursor information. For example, if the cursor is totally in the upper half or lower half of the screen, the Start and Reset locations may be the same. Otherwise (the cursor crosses the display boundary), the cursor may start being overlaid on the video information at the start address, and when the dual scan height counter generates a carry, may jump to the reset value. The cursor may then continue to be overlaid when the Y location is reached, and may jump to the start address value when the height counter for the upper half generates a carry.

Offsetting these values and changing the width of the cursor to be different from the cursor step value allows the right 48, 32, or 16 pixels of a larger cursor to be displayed. In addition, offsetting the starting X location off of the left edge of the screen may allow pixel placement of the cursor off of the screen edge. The size may be specified as a width adjustable to 16, 32, 48, or 64 pixels, a height in lines up to 64 pixels (e.g., controls the top half of the screen only in dual scan mode), a step size for number of words in a cursor line up to 4, and a height of up to 64 lines on the bottom half of the screen used in dual scan mode. The Y location value may control the starting vertical Y location of the cursor image. The value may be used to compare to the vertical line counter and may be set by software to be between the active start and active stop vertical line values. The cursor hardware 24 may clip the cursor at the bottom of the screen. The new Y location value may not be used until the next frame to prevent cursor distortion.

The X location value controls the starting horizontal X location of the cursor image. The value is used to compare to the horizontal pixel counter (e.g., horizontal and vertical counters 28) and may be set by software to be between the active start and active stop horizontal pixel values. The cursor hardware 24 may clip the cursor at the right edge of the screen. This value may be also used to control the starting location for the cursor image on the upper half of the screen during dual scan mode. The new X location value may not be used until the next frame to prevent cursor distortion. During dual scan display mode, the lower half Y value controls the starting vertical Y location on the lower half of the screen for the cursor image. The value may be used to compare to the vertical line counter and may be set by software to be between the active start and active stop vertical line values. The cursor hardware may clip the cursor at the bottom of the screen. The new location value may not be used until the next frame to prevent cursor distortion. The hardware cursor system 24 further includes a separate blinking function, wherein the rate may be a 50% or alternately other duty cycle programmable number of vertical frame intervals. For example, when a blink frame is active, the mux 20 may switch in 24 bit BLINKCOLOR1 and BLINKCOLOR2 values for CURSORCOLOR1, and CURSORCOLOR2, respectively.

Multiple Color Depth Interface

Figure 12:
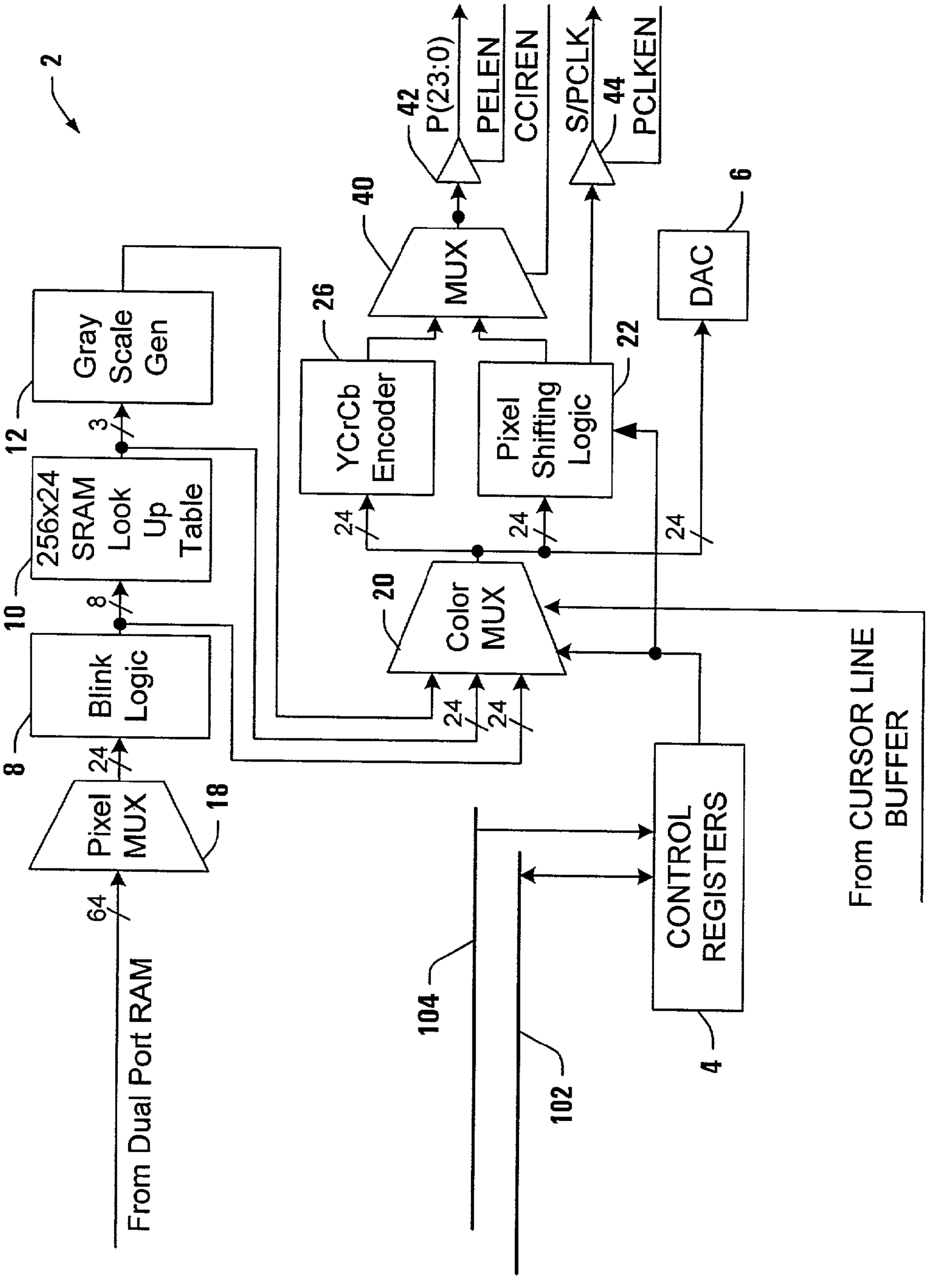
FIG. 12 is a schematic diagram illustrating an exemplary color mux and associated control registers in accordance with another aspect of the invention.

Referring now to FIGS. 1 and 12, the raster engine 2 comprises the dual 256×24 bit SRAM 10 used as a pixel color look up table (LUT). One LUT may be inserted in the video pipeline, while the other may be accessible by the system processor via the AHB bus. Writing a control bit selects which LUT is in the video pipeline and which is accessible via the bus. The dual LUT 10 may be memory mapped with respect to a raster engine base address and accessible from the AHB bus, one LUT at a time. During active video display, an LUT switch command may be synchronized to the beginning of the next vertical frame. The status of actual switch occurrence may be monitored on an LUTCONT.SSTAT bit (not shown) in the registers 4, which may be polled. Alternatively, the frame interrupt may be enabled and used to time the switching. Each table in the dual LUT 10 may be used for 4 bpp and 8 bpp modes and may be beneficial to bypass for 16 bpp and 24 bpp modes since a reduction in the number of simultaneously available colors would result. Control for whether or not the dual LUT 10 is used or bypassed altogether in the video pipeline is performed by configuring a PIXELMODE register color definition value, as illustrated and described in greater detail hereinafter. The PIXELMODE and other registers may thus be programmed by a user or by an application program to select and implement display modes for a variety of disparate display types.

The color RGB mux 20 is adapted to select appropriate pixel data and to provide the selected data to the appropriate video output stream. The mux 20 selects pixel data from the LUT 10, the grayscale generator 12, the hardware cursor logic 24, or directly from the pipeline after the blink logic system 8 according to the selected display mode. Mux 20 formats data for the pixel shift logic 22, a color digital to analog converter (DAC) 6, and/or for the YCRCB interface 26. The formatted video output data may be provided to a display device (not shown) via the output mux 40 together with data and clock buffers 42 and 44, respectively. The selected display mode is programmable to determine the operating mode for the mux 20, the pixel shift logic system 22, the blink logic system 8, LUT 10, and the grayscale generator 12, as well as for the signature analyzer 30 and hardware cursor system 24, as described above. For example, the mode of operation for the mux 20 may be set by the value of the PIXELMODE register. Accordingly, the mux 20 selects video data from the grayscale generator 12, from the LUT 10, or from the video pipeline after the blink logic 8 according to the selected display mode.

When the hardware cursor 24 is enabled, cursor data values may be injected into the pipeline via the mux 20, or alternatively, the primary incoming video data may be inverted. When in 16-bit 555 or 565 data display modes, the pixel data may be reformatted to fit into a 24-bit bus. This may include copying the MSBs for the data into one or more unused LSBs of the bus to allow full color intensity range. Once selected and formatted, output data is provided by the mux 20 to the pixel shift logic system 22, the YCrCb encoder 26, and/or the DAC 6.

The pixel shifting logic system 22 allows for reduced external data and clock rates by performing multiple pixel transfers in parallel. The output can be programmatically adapted (e.g., via the compare and register logic 4) to transfer a single pixel per clock up to 24 bits wide, a single 24-bit or 16-bit pixel mapped to a single 18 bit pixel output per clock (e.g., triple 6 RGB on 18 active data lines), 2 pixels per clock up to 9 bits wide each (18 pixel data lines active), 4 pixels per clock up to 4 bits wide each (16 pixel data lines active), or 8 pixels per clock up to 2 bits wide each (16 pixel data lines active). The pixel shifting logic system 22 may also be programmed to output 2 and ⅔, 3 bit pixels on the lower 8 bits of the bus per pixel clock or to operate in a dual scan 2 and ⅔ pixel mode putting 2 and ⅔ pixels from the upper and lower halves of the screen on the lower 8 bits of the bus and the next 8 bits of the bus per clock respectively. In dual scan mode, every other pixel in the pipeline may be from the other half of the display. Dual scan mode support may thus be provided for various formats, including 1 upper/1 lower pixel, 2 upper/2 lower pixels, and 4 upper/4 lower pixels corresponding to the 2 pixels per clock, 4 pixels per clock and 8 pixels per clock modes.

Figure 13C:
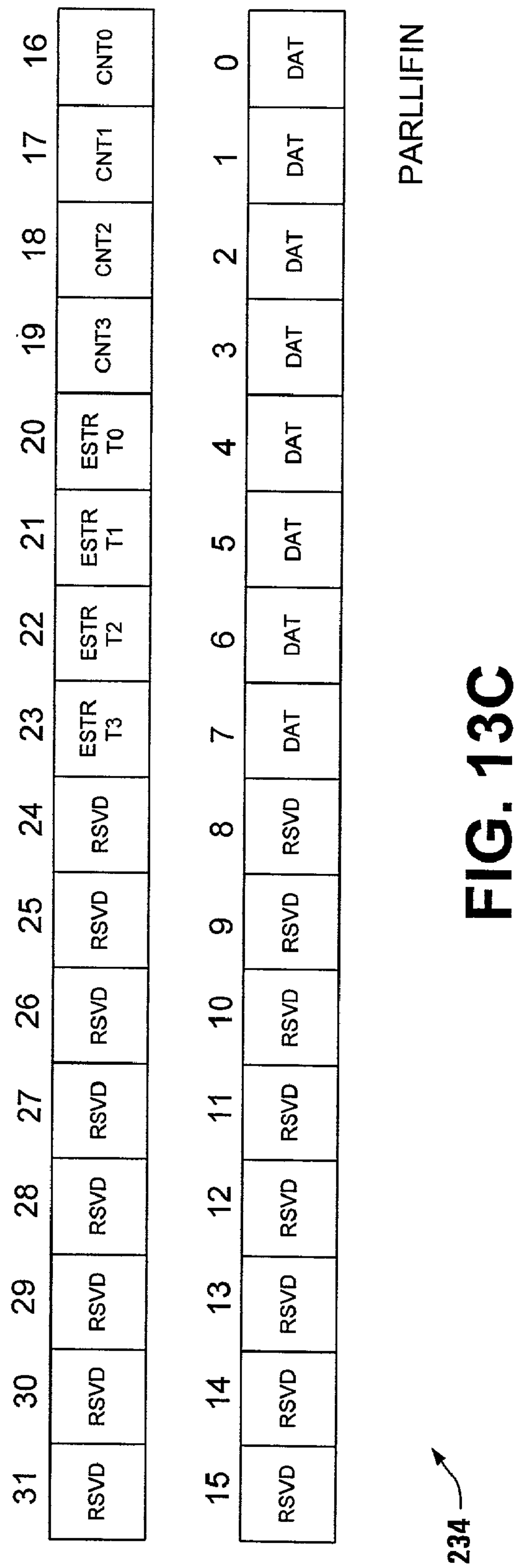

Referring also to FIGS. 13A through 13C, the compare and register logic may further comprise a PIXELMODE register 230, a PARLLIFOUT register 232, and a PARLLIFIN register 234. The PIXELMODE register 230 is adapted to indicate a selected display mode for the operation of the raster engine 2, and includes reserved bits RSVD and a DSCAN (dual scan enable) bit for servicing dual scanned displays. When active, data from two locations in memory (top and bottom halves of the screen) may be piped through the video pipeline every other pixel. The output pixel shift logic system 22 accordingly drives the top and bottom half screen data at the same time. This mode may be employed, for example, in association with passive matrix LCD screens that require both halves of the screen to be scanned out at the same time, or alternatively, may be used to drive two separate screens with different data. The values for the DSCAN bit may include: 0=half page mode not activated, and 1=half page mode activated.

The PIXELMODE register 230 further comprises C[3:0]: color mode definition bits having values indicating a selected color mode according to the following table:

| C3 | C2 | C1 | C0 | Color Mode |
|---|---|---|---|---|
| X | 0 | 0 | 0 | Use LUT Data |
| X | 1 | 0 | 0 | Triple 8 bits per channel |
| X | 1 | 0 | 1 | 16-bit 565 color mode |
| X | 1 | 1 | 0 | 16-bit 555 color mode |
| 1 | X | X | X | Grayscale Palette Enabled |

In addition, PIXELMODE register 230 includes M[3:0]: blink mode definition bits, having values which indicate a selected blink mode according to the following table:

| M3 | M2 | M1 | M0 | Blink Mode |
|---|---|---|---|---|
| 0 | 0 | 0 | 0 | Blink Mode Disabled |
| 0 | 0 | 0 | 1 | Pixels ANDed with Blink Mask |
| 0 | 0 | 1 | 0 | Pixels ORed with Blink Mask |
| 0 | 0 | 1 | 1 | XORed with Blink Mask |
| 0 | 1 | 0 | 0 | Blink to background register Value |
| 0 | 1 | 0 | 1 | Blink to offset color single value mode |
| 0 | 1 | 1 | 0 | Blink to offset color 888 mode (555,565) |
| 0 | 1 | 1 | 1 | Undefined |
| 1 | 1 | 0 | 0 | Blink dimmer single value mode |
| 1 | 1 | 0 | 1 | Blink brighter single value mode |
| 1 | 1 | 1 | 0 | Blink dimmer 888 mode (555,565) |
| 1 | 1 | 1 | 1 | Blink brighter 888 mode (555,565) |

PIXELMODE register 230 further comprises S[2:0]: output shift mode bits, having values indicating a selected shift mode according to the following table:

| S2 | S1 | S0 | Shift Mode |
|---|---|---|---|
| 0 | 0 | 0 | 1 - pixel per pixel clock (up to 24 bits wide) |
| 0 | 0 | 1 | 1 - 24-bit or 16-bit pixel mapped to 18 bits each pixel clock |
| 0 | 1 | 0 | 2 - pixels per shift clock (up to 9 bits wide each) |
| 0 | 1 | 1 | 4 - pixels per shift clock (up to 4 bits wide each) |
| 1 | 0 | 0 | 8 - pixels per shift clock (up to 2 bits wide each) |
| 1 | 0 | 1 | 2⅔ 3-bit pixels per clock over 8 bit bus |
| 1 | 1 | 0 | Dual Scan 2⅔ 3-bit pixels per clock over 8 bit bus |
| 1 | 1 | 1 | Undefined - Defaults to 1 - pixel per pixel clock |

The PIXELMODE register 230 also comprises pixel mode bits P[2:0]: having values indicating a selected number of bits per pixel scanned out by the raster engine 2, according to the following table:

| P2 | P1 | P0 | Pixel Mode |
|---|---|---|---|
| 0 | 0 | 0 | pixel multiplexer disabled |
| 0 | 0 | 1 | 4 bit per pixel |
| 0 | 1 | 0 | 8 bits per pixel |
| 0 | 1 | 1 | do not use |
| 1 | 0 | 0 | 16 bits per pixel |
| 1 | 0 | 1 | do not use |
| 1 | 1 | 0 | 24 bits per pixel |
| 1 | 1 | 1 | 32 bits per pixel |

Referring also to FIG. 13B, the compare and register logic 4 of the raster engine 2 further comprises a PARLLIFOUT register 232 (e.g., parallel interface output control register) having a RD bit for controlling reads of the register 232. When writing to register 232, a>0=in this bit location will initiate a parallel interface write cycle and a>1=in this bit location initiates a parallel interface read cycle. In addition, register 232 includes DAT[7:0] bits, adapted to indicate the data output on the parallel interface during a write cycle. The DAT[7:0] bits may be driven onto CNSYNCn, HSYNCn, BLANKn, P[17]/AC, and P[3:0] lines respectively.

In FIG. 13C, a PARLLIFIN register 234 (parallel interface control register) is illustrated, having reserved bits RSVD and ESTRT[3:0] (E enable signal start value) bits, which indicate the value of the parallel interface counter where the E enable signal becomes active (high). The data buffer enable also becomes active at the same time as the E enable signal during a write cycle. The E enable signal becomes inactive just before the counter changes to 0, while the data is driven throughout the 0 count. This allows data to be driven active for one additional clock cycle to provide hold time to the display when writing. Register 234 further includes CNT[3:0] counter preload value bits adapted to indicate a value loaded into a parallel interface down counter. When a write or read command is issued by writing to register 234, the counter begins to count down from this value.

Additional IO lines (not shown) may be used to provide a read vs. write status indication, a data vs. instruction indication, and any address or chip select control signals. Raster engine 2 may thus provide a direct display command interface for interfacing a host processor (e.g., CPU 62) of FIG. 2A with a low cost display, such as an LCD, having a command interface. The difference between the CNT[3:0] value and the ESTRT[3:0] value operates to ensure setup timing for write data and 10 signals to an integrated display module before the rising edge of the E enable signal. In addition, the register 234 comprises DAT[7:0] bits, which indicate the data input on the parallel interface during a read cycle. The DAT[7:0] bits may be loaded into the LSB of this register from C/VSYNCn, HSYNCn, BLANKn, P[17]/AC, and P[3:0] lines, respectively, on the falling edge of the E interface enable control signal. The direct display command interface may be employed, for example, in interfacing a display module having a built-in processor which receives command words from the raster engine 2, rather than rasterized data. This feature enables a high speed host processor (e.g., CPU 62 of FIG. 2A) to provide display commands to such a low-end display module (which typically operates at a much lower speed than does the host processor) via the raster engine, which provides appropriate timing and enable signaling to interface with the display module. Thus, the provision in the raster engine 2 of direct display command operating modes allows a processor to easily and efficiently provide commands to such a display module.

Referring also to FIGS. 14A and 14B, a table 236 indicates various exemplary output transfer modes which are programmable in the raster engine 2 via the PIXELMODE register 230. As can be seen in the table 236, the selection of a shift mode (e.g., via the S[2:0]: output shift mode bits) and the color mode (e.g. via the C[3:0]: color mode definition bits) provides programmable support for a plurality of different display types having various video data output display modes. For example, the selected shift mode and color mode may be used to support various display modes, including: single pixel per clock up to 24 bits wide; single 16 bit 565 pixel per clock; single 16 bit 555 pixel per clock; single 24 bit pixel on 18 lines; single 16 bit 565 pixel on 18 lines; single 16 bit 555 pixel on 18 lines; 2 pixels per clock; 4 pixels per clock; 8 pixels per shift clock; 2⅔ pixels per clock; and dual 2⅔ pixels per clock. Thus, the raster engine 2 provides the capability of outputting a plurality of pixels in a single shift clock.

The raster engine 2 may thus programmatically translate selected pixel data from a first format to a second format according to the selected display mode. As further indicated in the table 236, the raster engine may selectively translate video data between formats having disparate numbers of bits. For example, where the first format comprises more bits than does the second format, the raster engine 2 may selectively interpolate between a portion of the selected pixel data in the first format and generate a portion of the data in the second format (e.g., via the pixel shift logic 22). This may be accomplished, for example, via performing a logical OR combination of at least two bits of the selected pixel data in the first format to generate a bit in the second format. This selective interpolation accomplishes a rounding which provides for maximum utilization of available colors, thus significantly improving color usage compared with simple truncation of unused bits.

As can be seen in table 236 of FIGS. 14A and 14B, the raster engine provides a programmable interface to a plurality of disparate display device types. In this regard, the raster engine employs a universal routing scheme (e.g., as illustrated in the table 236) whereby a variety of such disparate display types may be interfaced with a host computer (e.g., CPU 62 of FIG. 2A). While prior raster engines required rerouting of output signals outside of the raster engine, no such rerouting is required in order to employ the raster engine 2. In addition, the raster engine 2 may be employed to interface with display devices using only four data bits, while still providing support for multiple video interface formats. In this regard, a control bit (not shown) is provided in the raster engine 2 which may be programmable via the PIXELMODE register 230 in order to invoke this operation as indicated in the table 236 (e.g., P(13), P(9), P(5), and P(1)).

Programmable Hardware Blinking

Figure 15:
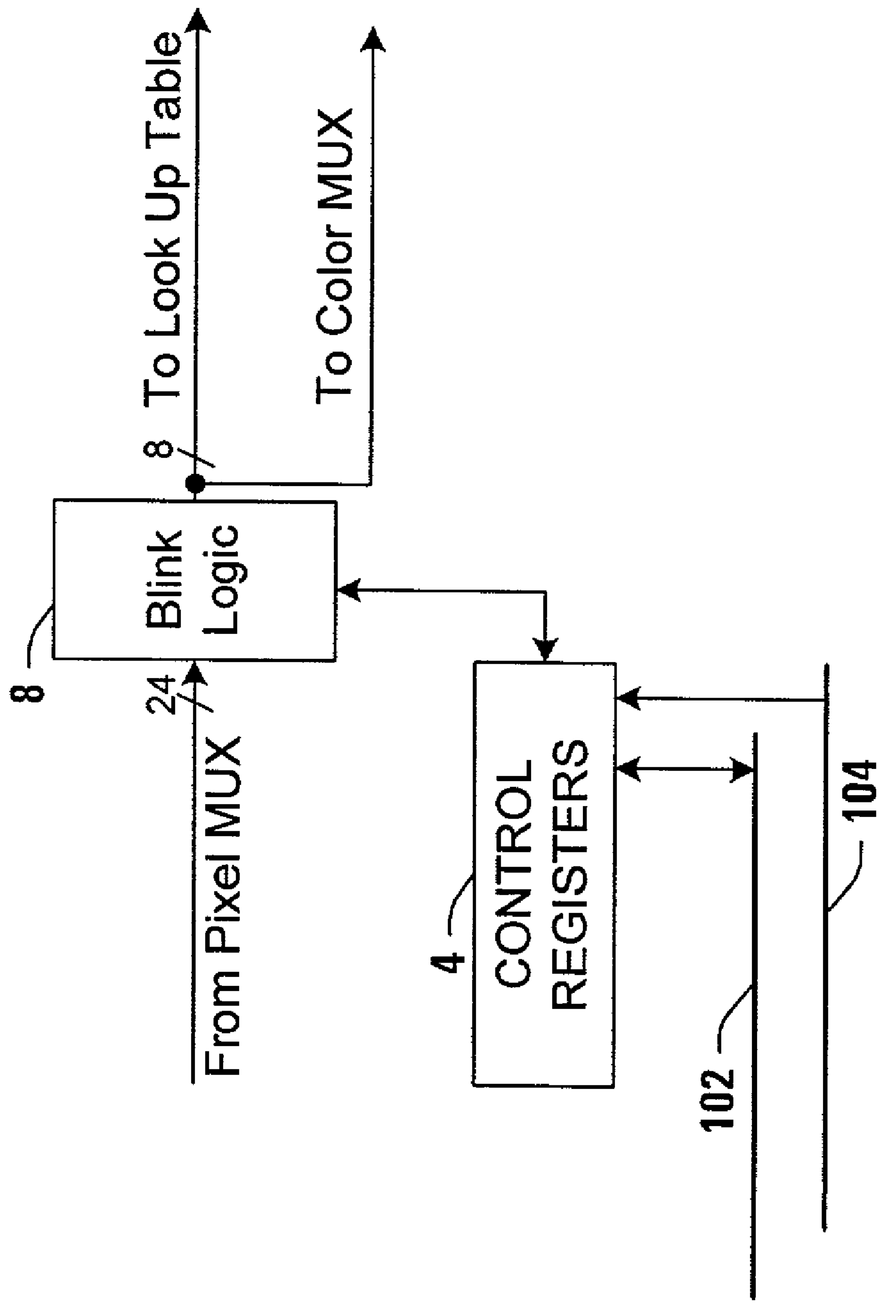
FIG. 15 is a schematic diagram illustrating an exemplary hardware blinking apparatus in accordance with another aspect of the invention.

Referring now to FIGS. 1 and 15, the raster engine 2 further comprises the pixel blink logic system 8 adapted to blink pixels based on a selected blink mode. The pixel blink logic system 8 may be operatively associated with one or more control registers in the compare and register logic 4 or elsewhere in the raster engine 2. Referring also to FIGS. 16A through 16E, the number of video frames for a blink cycle may be controlled by a value in a BLINKRATE register 250, as described in greater detail hereinafter. The system 8 is further adapted to determine which pixels are designated as blinking pixels. Pixel blinking may be programmatically accomplished in several different ways, some of which may employ the look up table 10. This is done via the blink logic system 8 logically transforming the address into the look up table 10 based on whether the pixel is a blink pixel, and whether it is currently in the blink state, as well as a selected display mode. For example, a red blinking pixel may be set up to normally address location 0x11 in the look up table. When not in the blink state, the color output from this location would be red. In the blink state, the address could be logically modified to 0x21 via the blink logic system 8 according to the values in one or more control registers 4. The color stored at the 0x21 location could be green or black or whatever other color that it is desired for red in the blink state. For every pixel color, there may be a blinking version.

For LUT blinking, the address may be modified by using a masked AND/OR/XOR function according to a selected blink mode. A mask may be defined in a BLINKMASK register, as described in greater detail hereinafter with respect to FIG. 16B. Selection of whether the pixel data is ANDed, ORed, or XORed with the mask is set by the PIXELMODE register 230 of FIG. 13A. In another mode of blink operation, the blink function may be performed by logical or mathematical operations on the pixel data via the system 8. Such logical and/or mathematical operations may be programmed, for example, to implement blink to background, blink dimmer, blink brighter, or blink to offset blink modes by setting an appropriate PIXELMODE register value.

For example, when blink to background mode is enabled, the blink logic system 8 may selectively replace a blinking pixel with the value in a BG_OFFSET register, as illustrated and described in greater detail hereinafter with respect to FIG. 16E. Setting this register to the background screen color in this mode may cause an object to appear and disappear. Blink brighter and blink dimmer modes may also be achieved, wherein pixel data values may be shifted by one or more bit locations. For example, to blink brighter, the LSB may be dropped, the MSBs may be all shifted one bit lower, and the MSB may be set to a '1'. For blink dimmer, the LSB may be dropped, the MSBs may be all shifted one bit lower, and the MSB may be set to a '0'. Blink to offset may be accomplished by adding the value in the BG_OFFSET register to blinking pixels. The shifting and offsetting can be programmed to be compatible with the selected pixel organization mode. Many different blinking modes are possible within the scope of the invention, whereby programmable hardware blinking of one or more pixels in a display may be accomplished.

A blinking pixel may be defined by a BLINKPATRN register and a PATTRNMASK register, as illustrated and described in greater detail hereinafter with respect to FIGS. 16C and 16D. By using the PATTRNMASK register, either multiple or single bit planes may be used to specify blinking pixels. This allows the number of definable blinking pixels to range from all pixel combinations blinking to only one pixel that blinks. In addition, this feature allows the option of minimizing the number of lost colors by reducing the number of blinking colors, thus providing significant flexibility and advantages over conventional palette blinking techniques. The BLINKPATRN register may then be used to define the value of the PATTRNMASKed bits that should blink.

Referring now to FIGS. 16A through 16E, several control registers are illustrated and described hereinafter, which are operatively associated with the blink logic system 8 of the raster engine 2. A BLINKRATE register 250, BLINKMASK register 252, BLINKPATRN register 254, PATTERNMASK register 256, and a BG_OFFSET register 258 may be employed in association with the system 8 in order to achieve the selective pixel blinking in accordance with the invention. The registers 250–258, moreover, may be included in the compare and register logic 4 of raster engine 2, or alternatively may be located elsewhere in the raster engine 2.

The number of video frames for a blink cycle may be controlled by a value in the BLINKRATE register 250 of FIG. 16A, which may comprise reserved bits RSVD, as well as RATE[7:0] bits. The value of the BLINKRATE register is programmable via the RATE bits to control the number of video frames that occur before the LUT addresses assigned to blink switch between masked and unmasked. Thus, an on/off blink cycle may be controlled according to the following equation: Blink Cycle=2×(1/VXTAL2)×HCLKSTOTAL×VLINESTOTAL×(255−BLINKRATE), wherein the HCLKSTOTAL and VLINESTOTAL represent the value of counters (not shown) in the raster engine 2. This pertains to a 50% duty cycle blink rate, however other duty cycle blink rates may be attained by using a count value and a comparison value.

The BLINKMASK register 252 illustrated in FIG. 16B may comprise reserved bits RSVD, along with mask bits MASK[23:0]. The value of the BLINKMASK register 252 may be ANDed, ORed, or XORed with a pixel data address into the look up table 10 defined as a blink pixel during a blink cycle. The programmable mask allows a blinking pixel to jump from the normal color definition location to a blink color location in the look up table 10 according to whether the pixel is in the blinking state or the non-blinking state. A logical AND operation may accordingly modify the LUT address by clearing bits, whereas an OR operation modifies the LUT address by setting bits, and an exclusive OR operation (XOR) modifies the LUT address by inverting bits.

Referring also to FIG. 16C, the BLINKPATRN register 254 defines a blink pattern for use by the blink logic system 8, which comprises reserved bits RSVD as well as pattern bits PATRN[23:0]. After being masked with the value of the PATTRNMASK register 256 described hereinafter, the PATRN value may be compared with pixel data bits (e.g., bits 23–0) in order to determine when pipeline pixels are defined as blink pixels. Thus, the blink logic system 8 may be adapted to determine whether a pixel is a blinking pixel or not. In FIG. 16D, the PATTERNMASK register 256 is illustrated, having reserved bits RSVD and pattern mask bits PMASK[23:0]. These bits PMASK[23:0] may be used to determine which PATTRN[23:0] bits of the BLINKPATRN register 254 are to be used to define pixels as blinking pixels. For example, the PMASK bits may have the following values: 0=bit used for comparison, and 1=bit not used for comparison.

Referring also to FIG. 16E, the BG_OFFSET register 258 is illustrated having reserved bits RSVD along with bits BGOFF[23:0] which may be used to set a blink background color or a blink offset value. The function of the BG_OFFSET register 258 may change based on the selected blink mode. For example, when the M[3:0] bits of the PIXELMODE register (e.g., register 230 of FIG. 13A) are set to select a blink to background blink mode, the BG_OFFSET register 258 may be used by the blink logic system 8 to define a 24 bit color for the background. Alternatively, when the M[3:0] bits of the PIXELMODE register 230 are set to a blink to offset blink mode, the BG_OFFSET register 258 may be used by the blink logic system 8 to define a mathematical offset value for the blink color. In this regard, the format for the mathematical offset may be based on the selected display mode (e.g., 888, 565, 555).

Grayscale Generator

Figure 17:
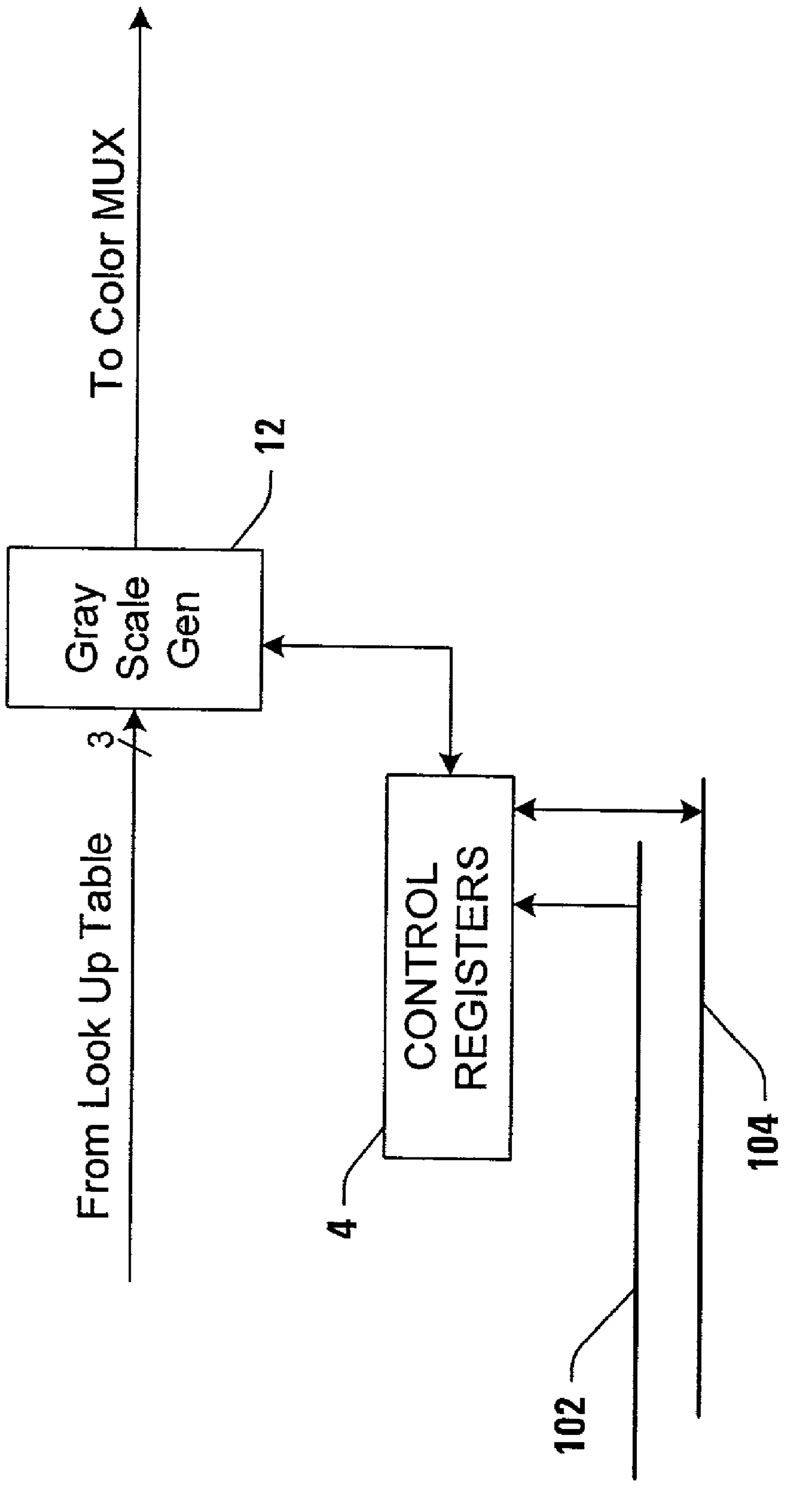
FIG. 17 is a schematic diagram illustrating an exemplary grayscale generator in accordance with another aspect of the invention.
Figure 18:
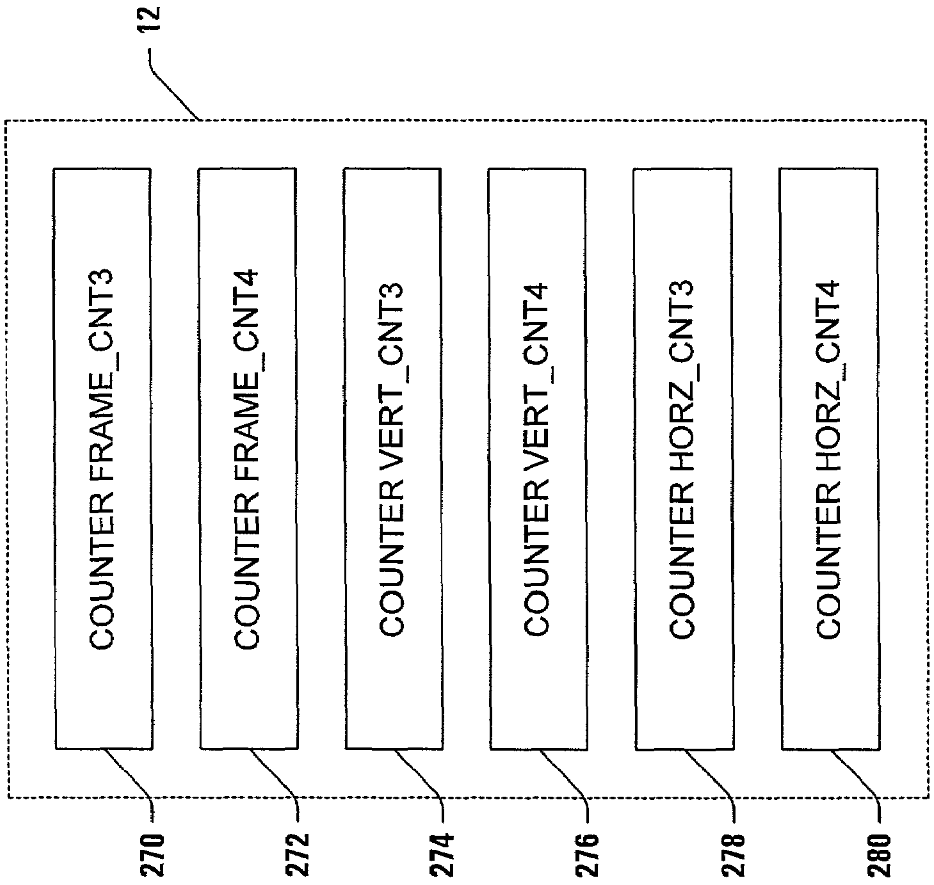
FIG. 18 is a schematic diagram illustrating several exemplary counters associated with the grayscale generator of FIG. 17.

As illustrated in FIGS. 1, 17, and 18, the raster engine 2 further provides a programmable grayscale generator 12 adapted to provide grayscales for monochrome displays via one or more control registers, which may but need not be included within the compare and register logic 4. The grayscale generator 12 may be inserted in the video pipeline by the mux 20 according to a selected display mode. The grayscale generator 12 translates a 3 bit input to a single monochrome bit dithered output, thereby providing 8 shades of gray including black and white. The grayscale generator 12 may further comprise six 2-bit counters; FRAME_CNT3 270, FRAME_CNT4 272, VERT_CNT3 274, VERT_CNT4 276, HORZ_CNT3 278, and HORZ_CNT4 280 as illustrated in FIG. 18 and described in greater detail hereinafter.

A look up table or matrix in the grayscale generator 12 (or elsewhere in the raster engine 2, e.g., in compare and register logic 4) may be programmed with values that define the on/off dithering operation for a pixel value based on value of one or more of the counters 270–280, as illustrated and described in greater detail hereinafter with respect to FIGS. 20–30. A matrix size or dimension may be defined for each pixel value (e.g., 0 through 7 for 3 bits). The matrix size may be from 3 horizontal rows×3 vertical columns×3 frames (e.g., 3H×3V×3F) to 4H×4V×4F, or any combination of 3 or 4. It will be appreciated that wile the exemplary grayscale generator 12 provides for matrices varying from 3H×3V×3F to 4H×4V×4F, that the many different matrix sizes are possible, and are contemplated as being within the scope of the invention. The grayscale look up table is then filled in for each pixel with this matrix information. The grayscale generator 12 uses the programmed matrix to perform grayscaling according to the selected display mode, which is particularly advantageous when employed in association with low cost or monochrome displays.

Referring also to FIG. 19, a GRAYSCALE LUT register 282 may be provided in the raster engine and operatively associated with the grayscale generator 12. It will be noted that the register 282 may be included in the compare and register logic 4, or may be located elsewhere in the raster engine 2. GRAYSCALE LUT register 282 may be used to fill the matrix, and comprises reserved bits RSVD, as well as a FRAME bit, defining a frame counter selection for the current 3 bit pixel value wherein 0=use FRAME_CNT3 and 1=use FRAME_CNT4. In addition, the register 282 comprises a VERT bit defining a vertical counter selection for the current 3 bit pixel value wherein 0=use VERT_CNT3 and 1=use VERT_CNT4, as well as a HORZ bit. A horizontal counter selection may be defined for the current 3 bit pixel value using the HORZ bit, wherein 0=use HORZ_CNT3 and 1=use HORZ_CNT4. In this manner, the matrix size may be programmed using the FRAME, VERT, and HORZ bits via the register 282.

The GRAYSCALE LUT register 282 further includes matrix position enable bits D[15:0]. These bits D[15:00] may be used to control/dither a monochrome data output according the to horizontal position, the vertical position, the frame, and the 3 bit incoming pixel definition. The grayscale matrix is thus fully programmable by a user or an application program to provide selective grayscaling according to a selected display mode for the raster engine 2. This allows the raster engine 2 to obtain pixel data from a frame buffer (e.g., frame buffer 68 of FIG. 2A) and to generate grayscale formatted video data according to the selected display mode.

Referring now to FIG. 20, an exemplary grayscale matrix 300 is illustrated having a dimension 4H×4V×4F. The bit positions in the matrix 300 are illustrated corresponding to the GRAYSCALE LUT register 282 of FIG. 19. As an example of programming the grayscale matrix, FIG. 21 illustrates another exemplary grayscale matrix 302, wherein the grayscale matrix 300 is programmed for full on and full off operation. For example, where a pixel input value of zero (e.g., 000 binary for three bit) is off, setting register addresses 0x80, 0xA0, 0xC0, and 0xE0 to all 0 ensures that a 0 pixel never turns on. Assuming that a pixel value of seven (e.g., 111 binary) is full on, setting addresses 0x9C, 0xBC, 0xDC, and 0xFC to all 1, ensures that the value is always on. The values between full on and full off may be programmed according to any criteria, including the characteristics of a particular display type, for example, contrast, persistence, turn on time, turn off time, on/off duty cycle, and refresh rate.

Figure 22:
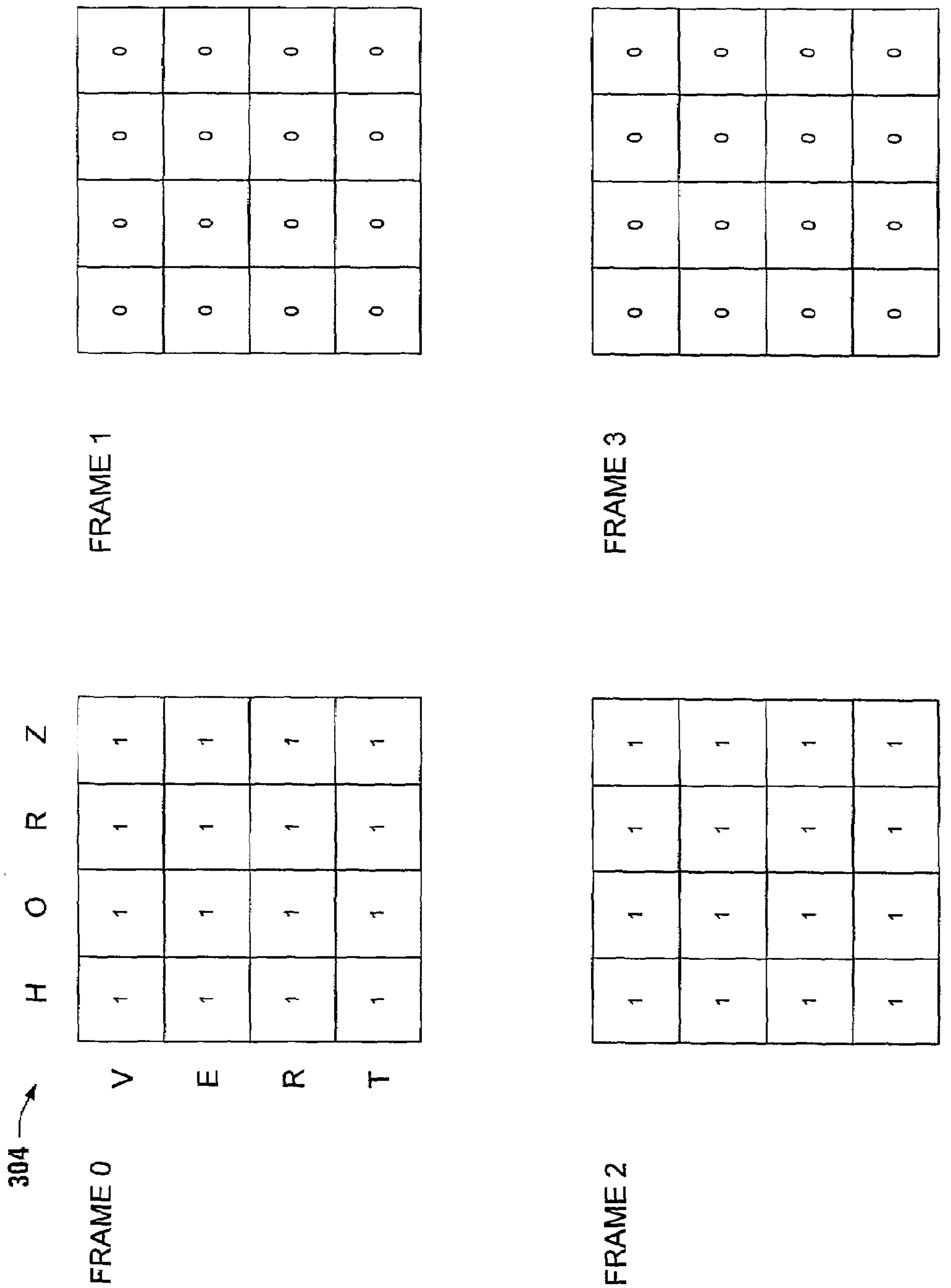
FIG. 22 is a schematic diagram illustrating an exemplary 4×4×4 grayscale pattern in accordance with the invention.

To achieve different shades of gray, more values may be provided below half the luminance average, due to the higher sensitivity to luminance variations by the human eye at lower levels. Other considerations in programming the grayscale matrix include temporal distortion (e.g., flickering), spatial distortion (e.g., walking patterns), and spatial interference patterns. Referring now to FIG. 22, a fifty percent duty cycle 4Hx4Vx4F matrix 304 is graphically illustrated. This particular matrix definition in FIG. 22 may be subject to temporal distortion or flickering due to each pixel being turned on and turned off together.

Figure 23:
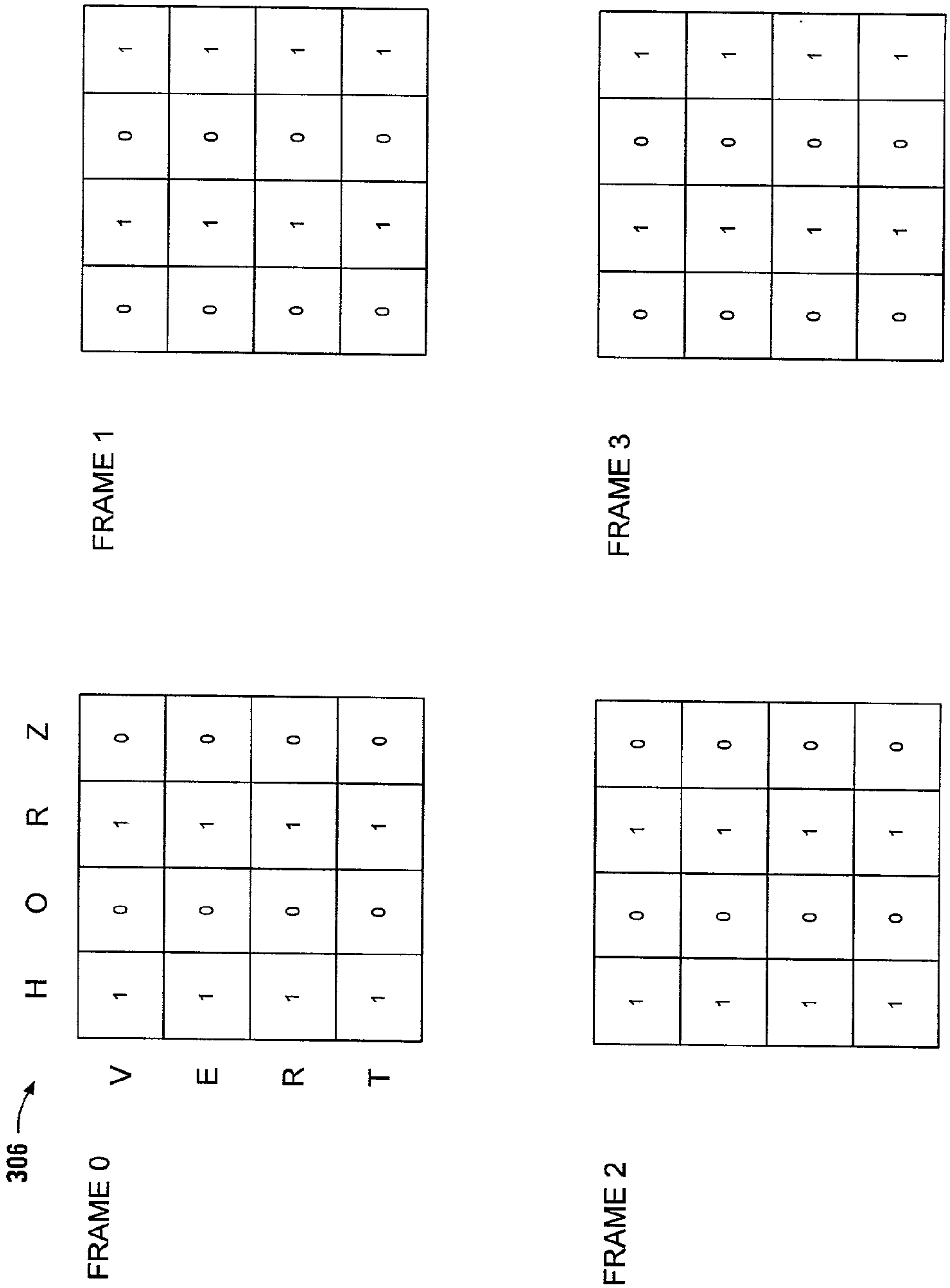
FIG. 23 is a schematic diagram illustrating another exemplary 4×4×4 grayscale pattern in accordance with the invention.
Figure 24:
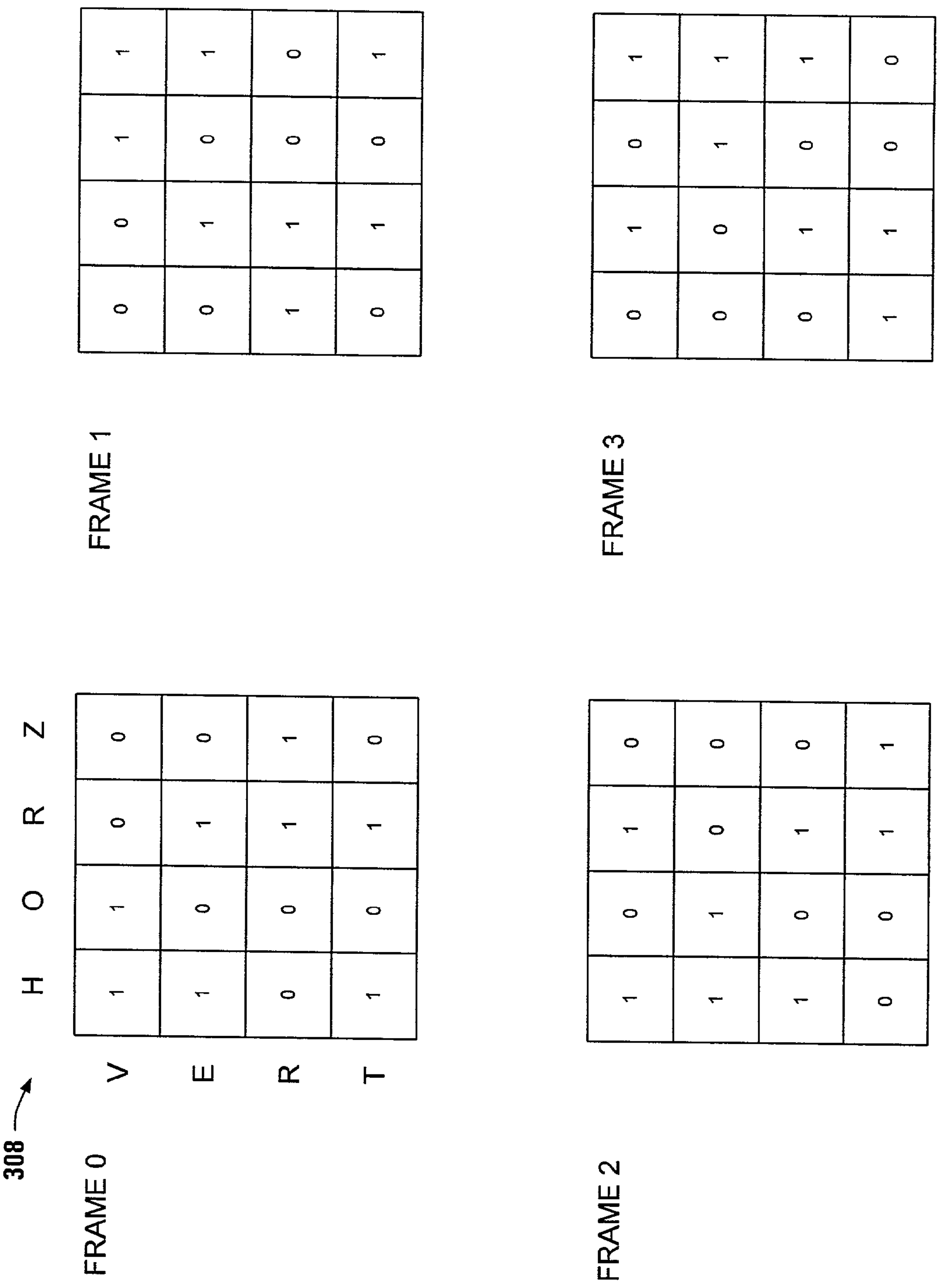
FIG. 24 is a schematic diagram illustrating another exemplary 4×4×4 grayscale pattern in accordance with the invention.

Referring now to FIG. 23, another exemplary fifty percent duty cycle 4Hx4Vx4F matrix 306 is illustrated. In order to avoid flickering, every other pixel may be turned on, such that the human eye integrates the on and off pixels between two consecutive frames. The matrix definition of FIG. 23, however, may suffer from spatial interference, particularly wherein image displayed in this grayscale requires that every other column be activated (e.g., a checkerboard pattern). Referring also to FIGS. 24 and 25, this type of spatial interference may be minimized by mixing up the pattern sequence as illustrated in the 4Hx4Vx4F matrix 308. This pattern mixes two sets of adjacent pixels with sets of every other pixel. The matrix 308 may suffer from a walking pattern type of distortion, depending on the display type. Assuming that a three bit pattern representing the fifty percent duty cycle grayscale of FIG. 24 is 011 binary, the matrix 310 of FIG. 25 illustrates the programming of the grayscale matrix of the grayscale generator 12 for the pattern of FIG. 24.

Figure 26:
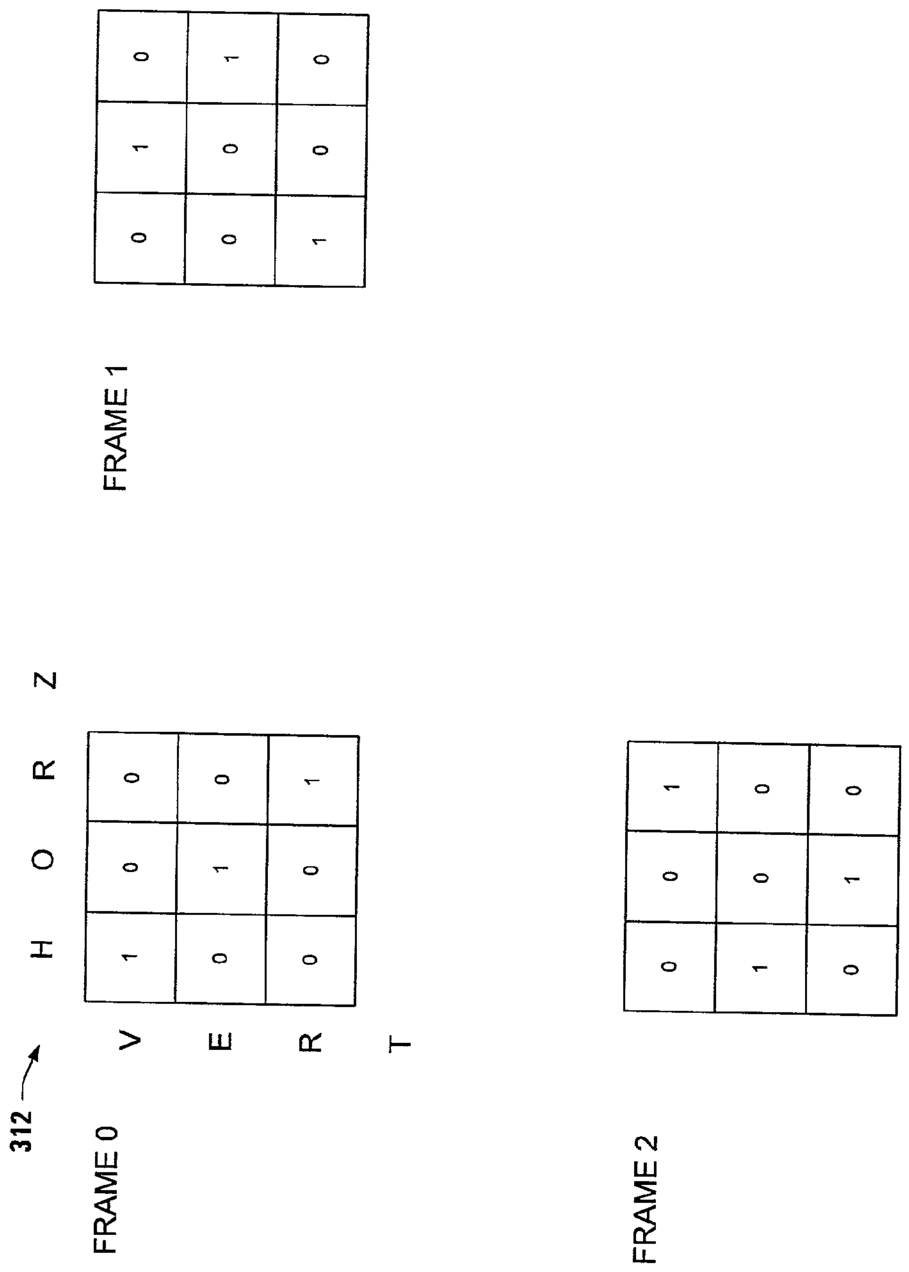
FIG. 26 is a schematic diagram illustrating an exemplary 3×3×3 grayscale pattern in accordance with the invention.

Referring now to FIG. 26, another exemplary grayscale matrix 312 is illustrated with a 3Hx3Vx3F dimension. According to this exemplary grayscale dithering pattern, each cell in the matrix 312 is active for only one frame in any three frame sequence, thus achieving a thirty three percent duty cycle for each pixel. This 3Hx3Vx3F matrix 312 may also suffer from spatial distortion, since as the frame number progresses, the bit pattern in each row moves one pixel to the right. For example, diagonal lines in a displayed image using the grayscale matrix 312 may accordingly appear as though they are moving or walking to the right.

Figure 27:
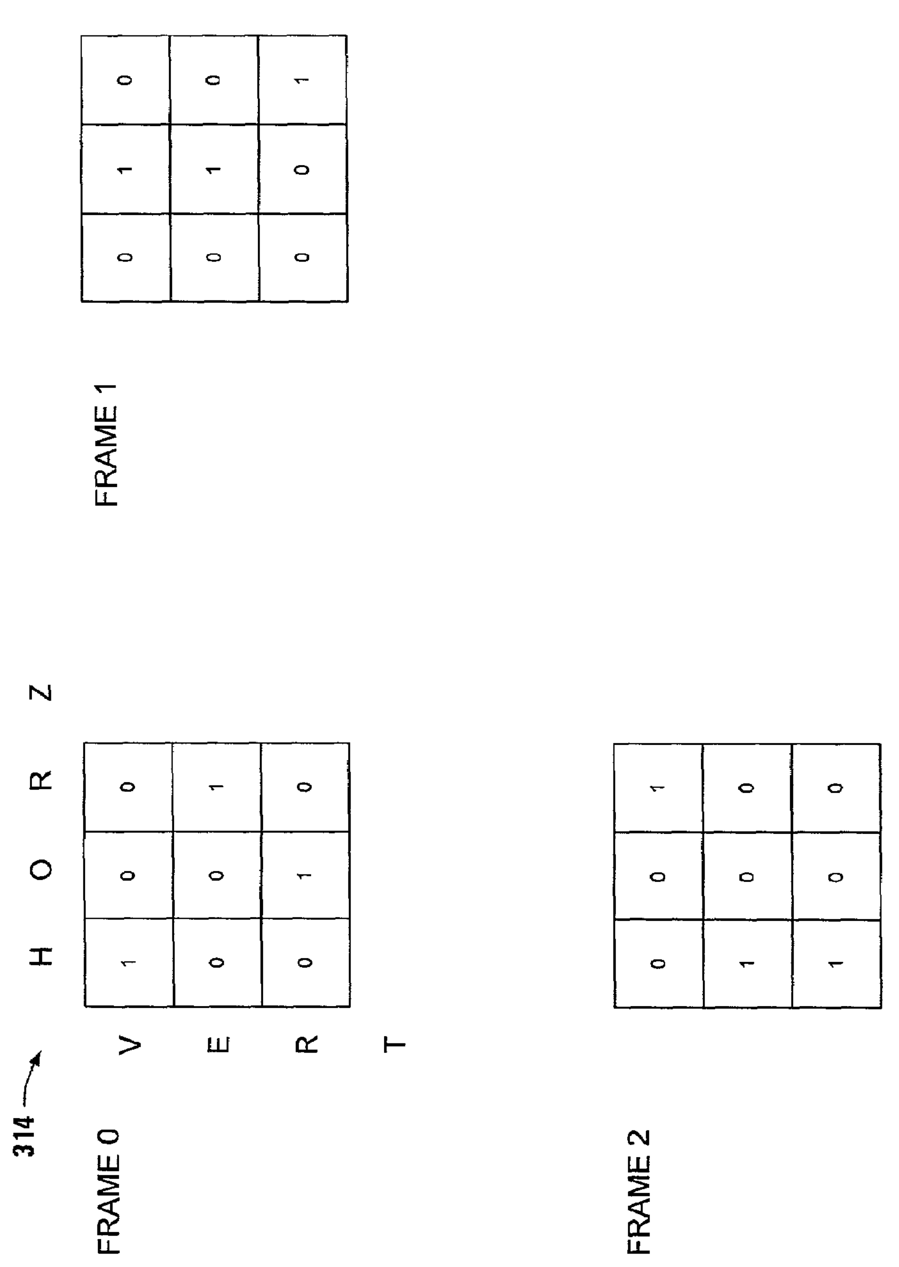
FIG. 27 is a schematic diagram illustrating another exemplary 3×3×3 grayscale pattern in accordance with the invention.
Figure 29:
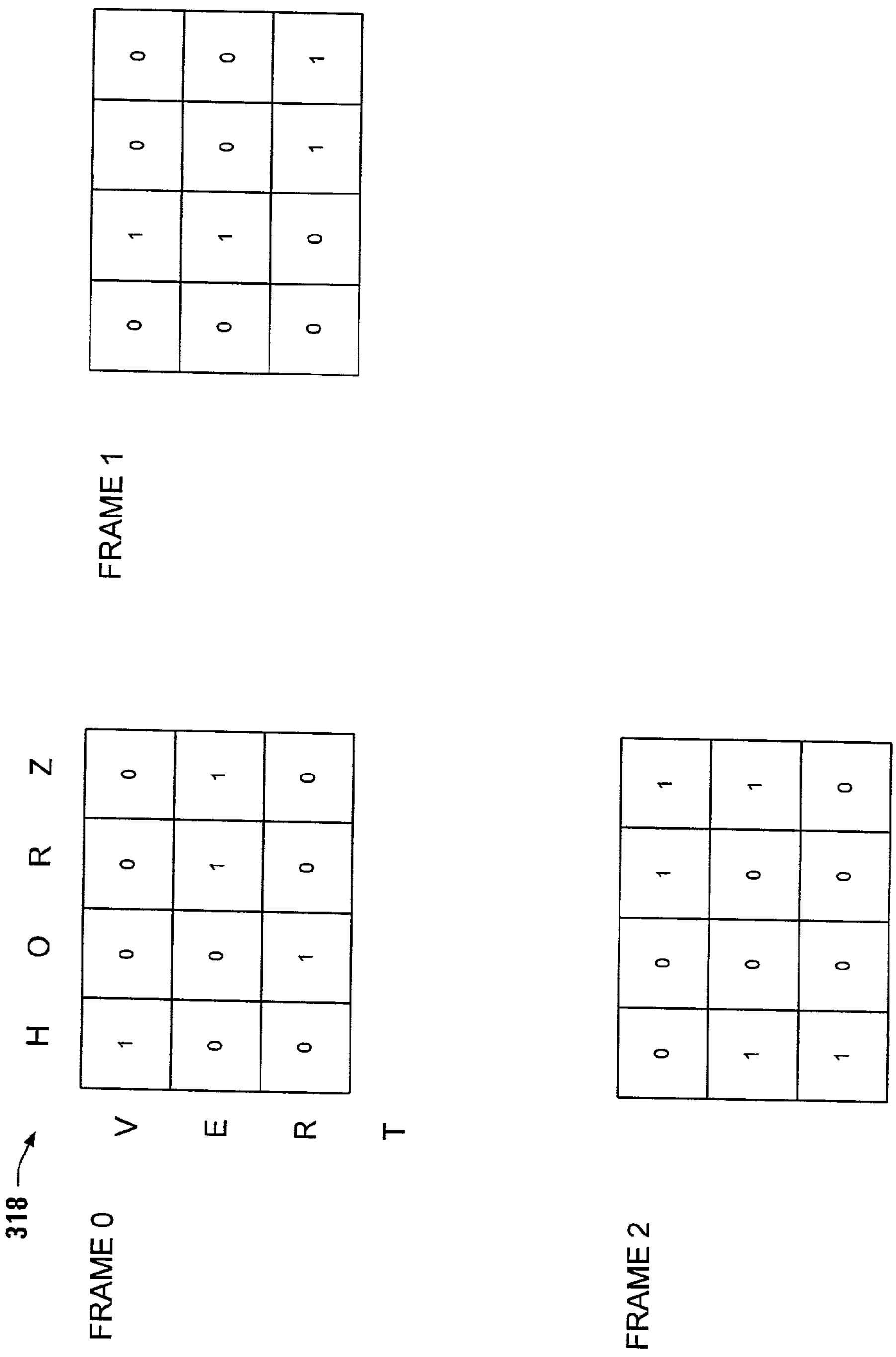
FIG. 29 is a schematic diagram illustrating an exemplary 4×3×3 grayscale pattern in accordance with the invention.

Turning now to FIG. 27, another exemplary 3Hx3Vx3F matrix 314 is illustrated which reduces the walking distortion potential of the matrix 312, via a slightly different dithering pattern. Assuming the 3 bit input pattern that represents the thirty three percent duty cycle grayscale of matrix 314 is 010 binary, the matrix may be programmed as illustrated in the register matrix 316 of FIG. 28. With the look up table or matrix 316 thus programmed into the control registers, the grayscale generator 12 may accordingly provide grayscaling in accordance therewith. Referring now to FIGS. 29 and 30, non-symmetrical matrix sizes are further possible in accordance with the invention. An exemplary 4Hx3Vx3F matrix 318 is illustrated graphically in FIG. 29. Referring also to FIG. 30, and assuming that the three bit input pattern that represents a thirty three percent duty cycle grayscale is 010 binary, the programmed register matrix 320 further illustrates the programming of the grayscale matrix.

Referring now to FIG. 31, the raster engine 2 may be employed in a variety of systems having disparate display types and data formatting requirements. For example, the table 350 illustrates several of the possible applications of the raster engine 2 with various display types. While the invention has been described herein in association with certain display types, it will be recognized that the invention is useful for other applications involving other display types not specifically illustrated and described herein. In addition the invention may be implemented as part of a system having other components and features.

Figure 32:
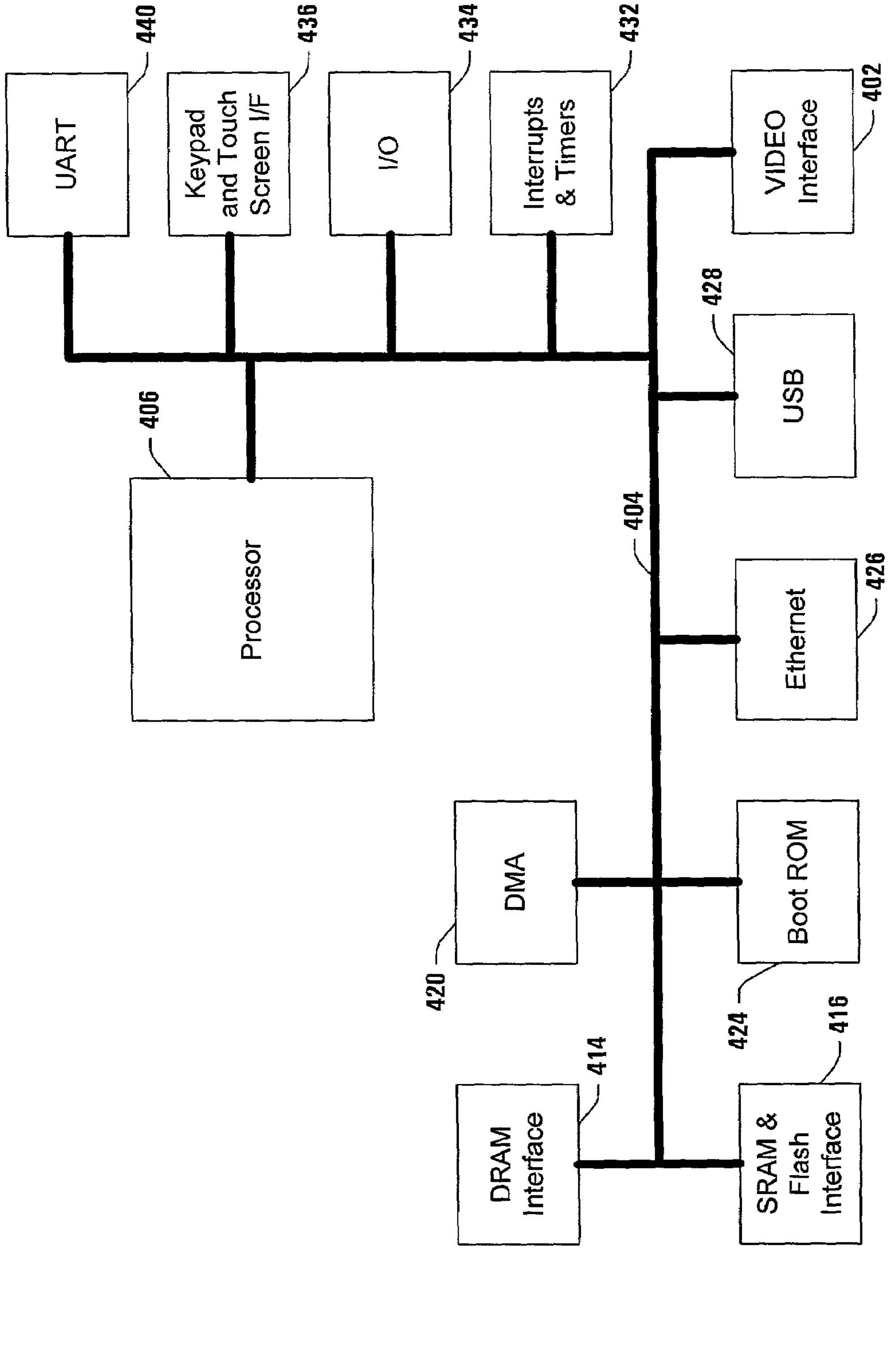
FIG. 32 is a schematic diagram illustrating an exemplary computer system in which various aspects of the present invention may be carried out.

Referring now to FIG. 32, a system 400 is illustrated in which various aspects of the present invention may be carried out. As illustrated and described above, the raster engine 2 may be employed in various computer systems (e.g., system 60 of FIG. 2A). In addition, the raster engine 2 may be employed in other applications within the scope of the invention. For example, the raster engine 2 may be included within the system 400 of FIG. 32 as part of a video interface 402, wherein the system 400 may comprise a multi-function integrated circuit or chip having multiple components in addition to the video interface 402. The video interface 402 may be operatively connected to a bus 404 providing communications between various system components, as described hereinafter, including a processor 406.

The processor 406 may communicate via the bus 404 with various memory and peripheral components within the system 400. Included among these are a DRAM (dynamic random access memory) interface 414, an SRAM (static random access memory) and flash memory interface 416, a DMA (direct memory access) system 420, and a boot ROM (read only memory) 424. System 400 may further provide Ethernet access via an Ethernet device 426. A USB (universal serial bus) 428 is also connected to the bus 404, along with interrupts and timers 432, I/O circuitry 434, a keypad and touch screen interface 436, and a UART (universal asynchronous receiver transmitter) 440. In this regard, it will be appreciated that the exemplary raster engine 2 and video controller of the invention may be employed in a variety of systems and applications, including those not specifically illustrated and described herein.

Video Underflow Detection and Indication

Figure 33:
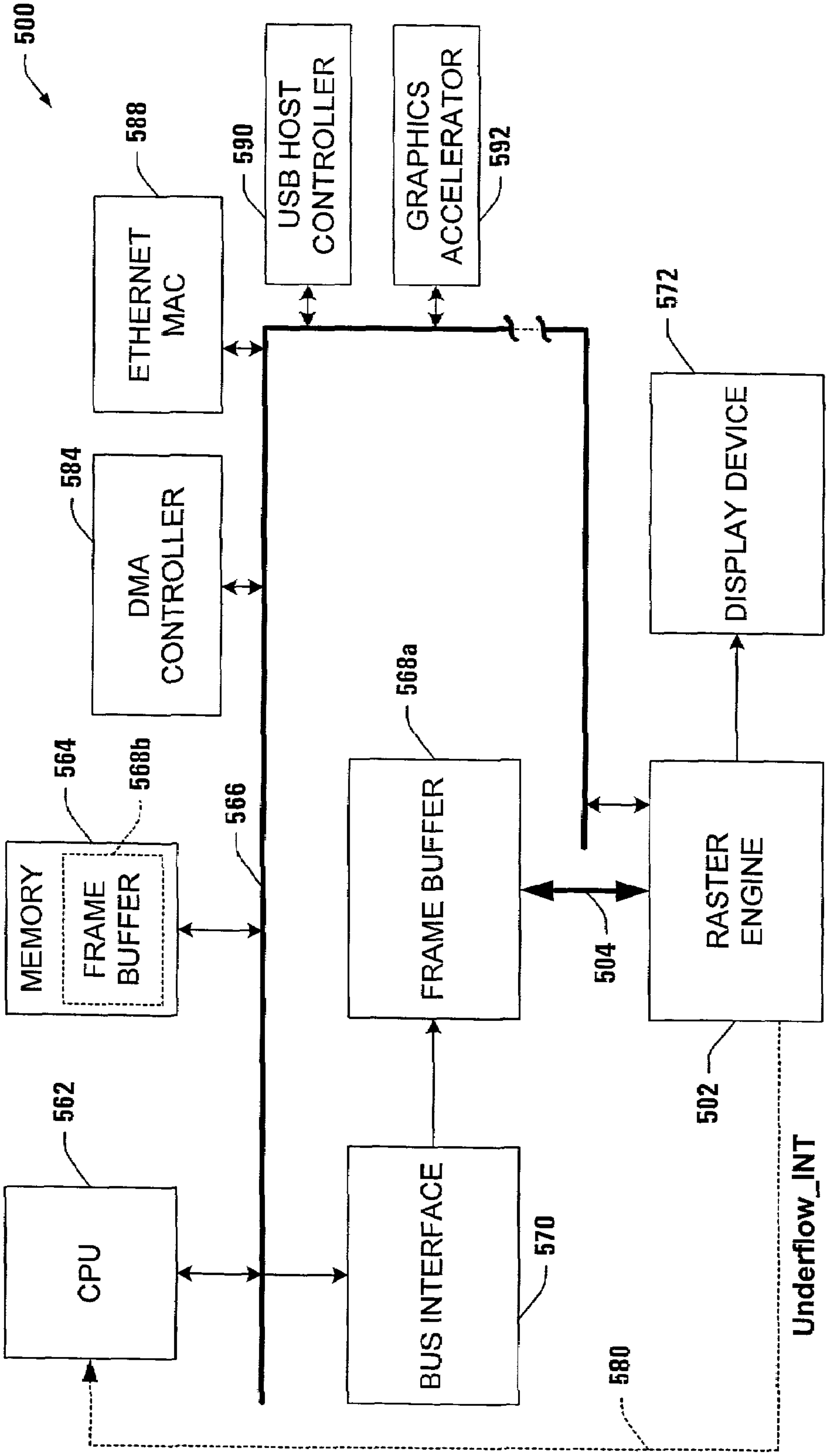
FIG. 33 is schematic diagram illustrating another computer system including an exemplary raster engine providing an underflow indication in accordance with another aspect of the invention.

Another aspect of the invention provides apparatus and methods for detecting and/or indicating overflow conditions in a raster engine. In order to provide context for the underflow detection and indication aspects of the invention, FIG. 33 illustrates an exemplary computer system 500 having a central processing unit (CPU) 562, a memory 564, and a shared system bus 566 providing an interface therebetween. A video frame buffer 568*a* may interface with the bus 566 via a bus interface 570. Alternatively, a frame buffer 568*b* may be provided in a portion of main memory 564, wherein the beginning of video lines may be located on any 32 bit word boundary. An exemplary raster engine 502 may be operatively connected with the bus 566 for receiving video data therefrom for rendering to a display device 572. In addition, the bus 566 (e.g., including address and data busses) may provide access to the various control registers in raster engine 502. The bus 566 may be further shared between the CPU 562 and other devices in the system 500. For example, a direct memory access (DMA) controller 584 interacts with the bus 566, wherein the DMA controller 584 may be used as an integrated drive electronics (IDE) interface for a hard disk or CD ROM device (not shown). Other system devices may also be accessed via the system bus 566, such as an Ethernet MAC 588, a USB host controller 590, and a graphics accelerator 592.

In one form of operation, video data is transferred from the frame buffer 568*b* in the system memory 564 across the system bus 566, and moved to the display device 572 by the raster engine 502. The frame buffer 568*b* may thus be part of the same system memory 564 used by the CPU 562 for various purposes, or may be a separate video memory 568*a*. Where a separate frame buffer 568*a* is employed, the raster engine 502 may obtain video data from the frame buffer 568*a* via the bus interface 570 and the shared system bus 566, or alternatively via an isolated or dedicated bus 504. In this case, a frame buffer bus interface (not shown) may be provided to interface the frame buffer 568*a* with the isolated bus 504. When the raster engine 502 needs to access a display image store in a frame buffer 568*a* or 568*b* (e.g., collectively referred to as 568) via the shared system bus 566, contention for or excessive loading of the shared bus 566 may cause the raster engine 502 to become starved for video data (e.g., underflow). The configuration in which such a system bus (e.g., bus 566) is shared between the CPU 562 and other system devices (e.g., some of which may be "masters" in a multiple master configuration) may sometimes be referred to as a unified memory architecture (UMA) system.

Where two or more devices are in contention for access to the shared bus 566 (e.g., and in particular for access to the shared system memory 564), there is a potential for the raster engine 502 to become starved for video data from the frame buffer 568, for example, under excess loading on the bus 566, or during extremely long burst operations. When the Raster engine 502 becomes starved, undesired visual defects such as jittering, shifting, flashing, and blank-outs may occur in the video image rendered by the display device 572. According to one aspect of the present invention, the exemplary raster engine 502 may comprise an underflow detection system, which detects underflow conditions in the raster engine 502 (e.g., where the raster engine 502 is or is about to become starved for video data), and provides an underflow indication 580.

The underflow indication 580 may comprise, for example, and underflow signal or interrupt, which may be provided to the system CPU 562. The CPU 562 may in turn implement remedial techniques, such as methods to balance bus loading or limit burst sizes on the shared bus 566, in order to reduce or minimize the occurrence of such underflow conditions in the raster engine 502. Although the CPU 562 may be able to detect certain bus behavior and performance measures with respect to the shared system bus 566 (e.g., bus loading, etc.), the CPU 562 is not able to unilaterally determine whether an underflow condition exists or is about to occur in the raster engine 502, absent the underflow indication 580. It will be further noted that where the raster engine 502 obtains video data from the frame buffer 568*a* via the isolated bus 504, the CPU 562 may not even be able to detect excess bus loading, error, or lock-up conditions on the isolated bus 504. A system watchdog may not detect locked up activity on the isolated bus 504 unless the shared memory sub-system is also locked up as well. Thus, the provision of the underflow indication 580 from the raster engine 502 in accordance with the invention provides significant advantages in reducing or eliminating underflow conditions and the deleterious display effects associated with such conditions.

Figure 34:
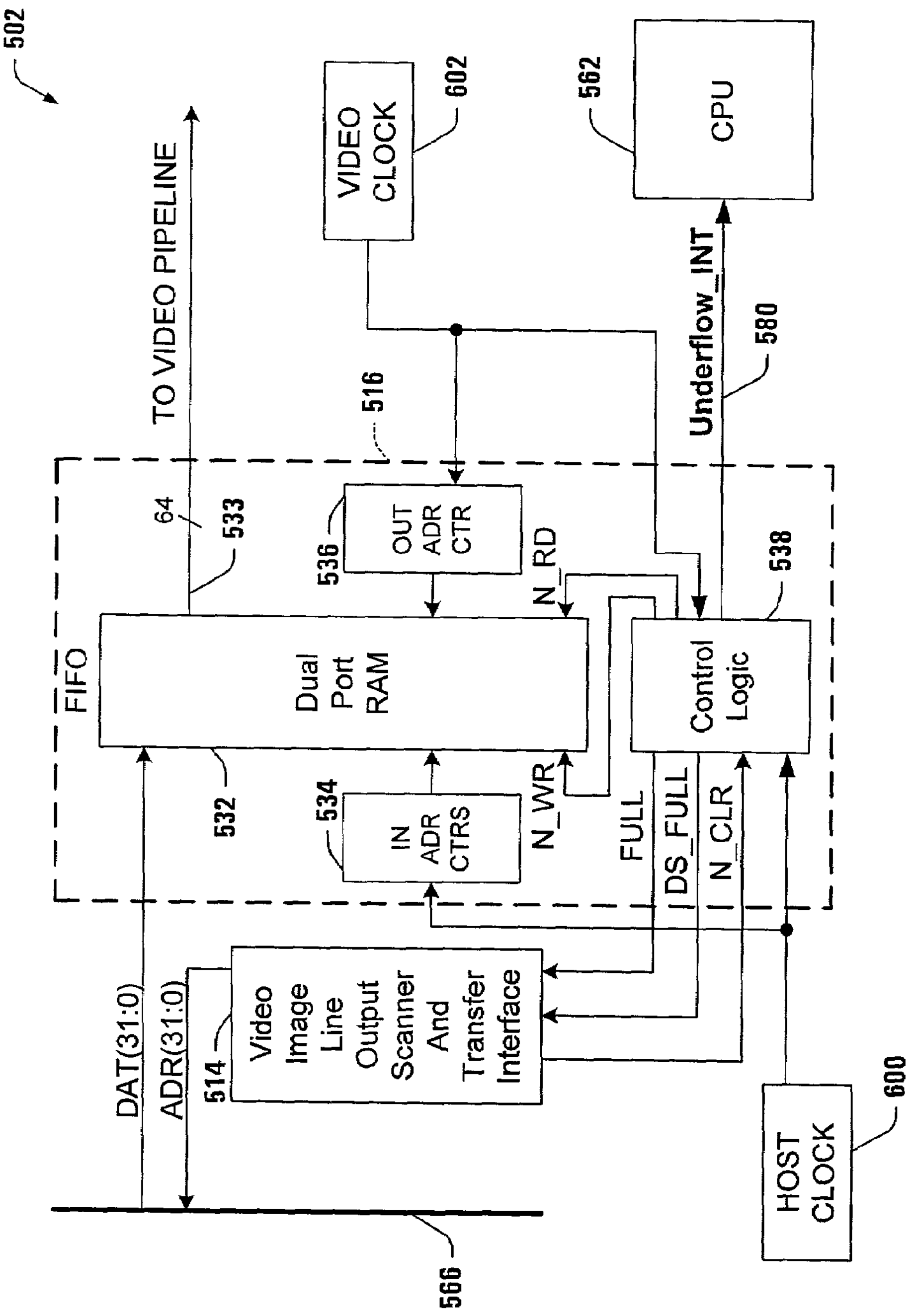
FIG. 34 is a schematic diagram illustrating further details of the exemplary raster engine of FIG. 33.

Referring also to FIG. 34, a portion of the exemplary raster engine 502 is illustrated having a first in first out (FIFO) memory system 516 interfacing a host bus such as the system bus 566 in the computer system 500 with the raster engine 502. The FIFO 516 includes a dual port memory 532 and is adapted to obtain video data from a frame buffer (e.g., frame buffer 568) via the host bus 566 (e.g., or via a dedicated or isolated bus such as bus 504) and to provide video data to a video pipeline (e.g., as illustrated and described above with respect to FIG. 1). Raster engine 502 further includes an input address counter 534 having an input counter value (not shown) indicative of video data obtained from the frame buffer via bus 566 and an output counter 536 having an output counter value (not shown) indicative of video data provided to the video pipeline. The input and output of the FIFO memory system 516 may be operated according to separate clocks. For instance, the input of video data from the host bus 566, including the operation of the input counter 534, may be performed according to a host clock 600, and the output of video data to the video pipeline together with the operation of the output counter 536 may be performed according to a video clock 602.

A control logic system 538 is associated with the FIFO memory 516 and is adapted to provide an underflow indication 580, such as an interrupt to the CPU 562, according to the values of the input and output counters 534 and 536, respectively. In addition, the control logic system 538 provides interfacing to a video image line output scanner and transfer interface (VILOSATI) 514, which may connect to a dedicated DMA port on an SDRAM controller (not shown). The VILOSATI 514 reads video image data from memory (e.g., frame buffer 568) and transfers the image data to the video FIFO 516. VILOSATI 514 keeps track of image location, width, and depth for both progressive and dual scanned images, and responds to controls (e.g., FULL, DS_FULL) from the FIFO 516 for more video data. For example, during a single scan operation, when the FIFO 516 has room for a 16 word burst, the FULL signal may be inactive and the VILOSATI 514 attempts to initiate a burst. The VILOSATI 514 will initiate appropriate size transfers and bursts in order to get to a 16 word boundary. After this point, VILOSATI 514 will perform transfers more efficiently using 16 word long bursts. When the FIFO 516 is full (e.g., 40 to 64, 32 bit words), the current burst is completed, and no further data is requested. When the FIFO 516 signals that it has room for a burst again, the image reading process from the frame buffer continues.

For dual scan operation, the FIFO 516 may be split in two and operates with a separate FULL indicator for each half. In this mode, the FULL signal and a DS_FULL indicator (not shown) trigger from 12 to 32 words. The VILOSATI 514 continues to service the video FIFO 516 until it has transferred an entire screen image (e.g., a frame) from memory. The video FIFO 516 is used to buffer video data transferred from the frame buffer memory (e.g., of frame buffer 668) to the video output system without stalling the video data stream of the raster engine 502. During dual scan mode, wherein the display requires scan out of the bottom and top half of the screen at the same time, top half (or bottom half) information is stored in every other location in the FIFO 516. In progressive scan mode wherein video data is scanned out as a single progressive image, the FIFO data is stored sequentially.

The FIFO output data bus 533 is 64 bits wide and can output even and odd words on both the upper and lower half of the bus. Writes to the FIFO 516 advance the input index counter 534, while reads from the FIFO 516 advance the output index counter 536. The input and output counters 534 and 536 are compared to generate the FULL and DS_FULL output controls to the VILOSATI 514, as well as to determine whether an underflow condition exists or is likely to occur. The N_CLR signal resets both the input and output input and output counters 534 and 536 to 0, for example, at the end of a video frame. The control logic system 538 in the FIFO system 516 includes an underflow detection and indication system, which operates to detect an underflow of the FIFO 516 (e.g., dual port RAM 532) and/or a near underflow condition therein, and to provide the Underflow_INT signal 580 according to the detected underflow condition.

The underflow system of the FIFO control logic 538 may include, for example, comparison logic for comparing the values of input and output counters 534 and 536, respectively, and for making a determination of whether an underflow condition exists or is anticipated. The Underflow_INT indication 580 may be advantageously provided to a host processor (e.g., CPU 562) whereby steps to balance bus loading or to limit burst sizes may be taken. This feature is particularly advantageous where the raster engine interface with the frame buffer memory is via a bus isolated from that of the host processor. In this situation, the host CPU (e.g., CPU 562) may not be able to independently detect or sense bus loading conditions resulting in a starving raster engine 502. Thus, the invention provides for early indication to the host processor 562, whereby elimination or reduction of raster engine underflow conditions may be achieved. The underflow indication 580 may further be used to indicate a lockup condition in the raster engine 502.

Figure 35:
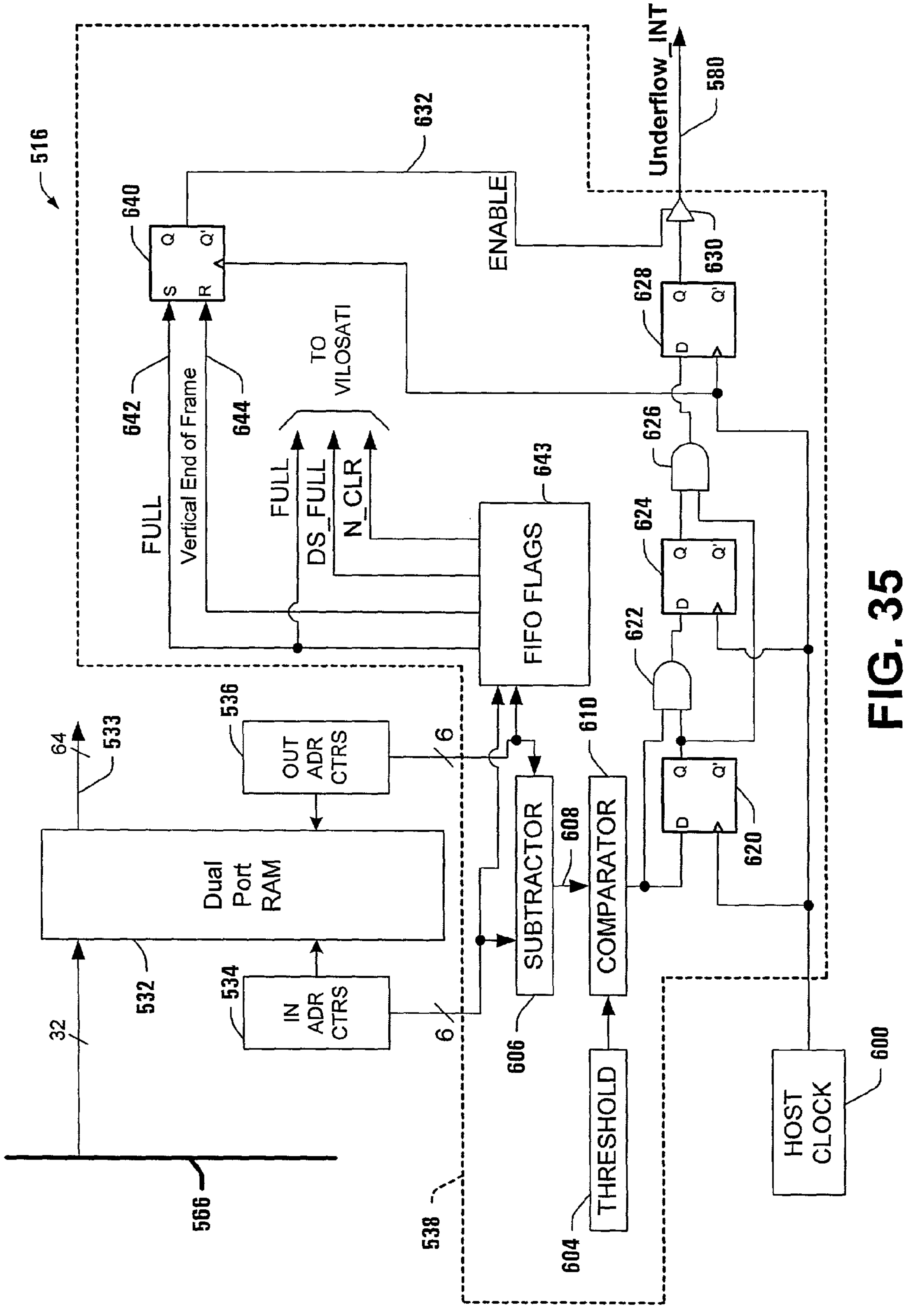
FIG. 35 is a schematic diagram illustrating an exemplary underflow detection system in accordance with an aspect of the invention.

Referring also to FIG. 35, further details of the exemplary control logic system 538 are illustrated. The control logic system 538 comprises underflow detection and indication components to provide the underflow indication 580 when an underflow condition exists and also when an underflow condition is anticipated. For example, a threshold value register 604 may be provided, which may be programmable by a host processor (e.g., CPU 562), wherein the control logic system 538 obtains a threshold value (e.g., 3) from the threshold value register 604, and compares the threshold value with the difference between the input and output counter values. To accomplish this, the exemplary system 538 comprises a subtractor 606 receiving an input counter value (e.g., 6 bits) from the input counter 534 and an output counter value from the output counter 536. The subtractor 606 provides a difference value 608 (e.g. input counter value-output counter value) to a comparator 610.

The comparator 610 performs a comparison of the difference value 608 with the threshold value from the threshold value register 604. The underflow indication 580 may be selectively provided (e.g., to host CPU 562) to indicate an existing underflow condition when the input and output counter values are equal, and to indicate an anticipated underflow condition when the input and output counter values are within the threshold value of each other. Additional components may be provided in the system 538 to ensure that the underflow indication is accurate in situations where the FIFO 516 obtains video data from the frame buffer (e.g., 568) according to the host clock 600 and provides video data to the video pipeline according to the video clock 602, as described further hereinafter. This may be accomplished, for example, by providing an underflow condition 580 when the first input and output counter values are equal or within the threshold value of each other for at least two cycles of the host clock 600.

The comparator 610 may provide an input signal to a first voting flip-flop 620 operating according to the host clock 600, as well as to an AND gate 622 providing a logical ANDing of the output of the flip-flop 620 and the signal from the comparator 610. The result of this AND operation is provided to a second voting flip-flop 624. The outputs of the first and second flip-flops 620 and 624 are provided as inputs to an AND gate 626 which provides and input to a third flip-flop 628. The third flip-flop 628 accordingly provides a signal when the values of the input and output counters 534 and 536, respectively, are within the threshold value of each other for at least two cycles of the host clock 600.

The third flip-flop 628 provides the underflow indication 580 via a tri-state buffer 630, whereby the provision of the indication 580 may be selectively enabled or disabled according to an enable signal 632. Thus, for example, the underflow indication may be selectively suppressed in situations where the values of the counters 534 and 536 are within the threshold value of each other for reasons other than actual (or anticipated) underflow. One such situation is when the FIFO 516 is emptied at the end of a frame. Another is during startup of the FIFO 516, before any data has been obtained from the host bus 566. In this regard, the enable signal 632 may be provided by an RS flip-flop 640 which is set according to a FULL signal 642 from a FIFO flags component 643, and reset according to a Vertical End of Frame signal 644, wherein the signals 642 and 644 are derived from the input and output counters 534 and 536, respectively. For instance, the control logic system 538 may perform a subtraction of input and output counters 534 and 536, and the result may be compared with a threshold (not shown) to generate the signal 644. In this manner, the underflow indication may be suppressed until the FIFO 516 fills once after being initially empty, and thereafter once a frame boundary has been achieved. It will be appreciated that the enable signal 632 may be generated according to other appropriate signals and system conditions, in order to reduce or prevent false underflow indications, in accordance with the invention.

Figure 36:
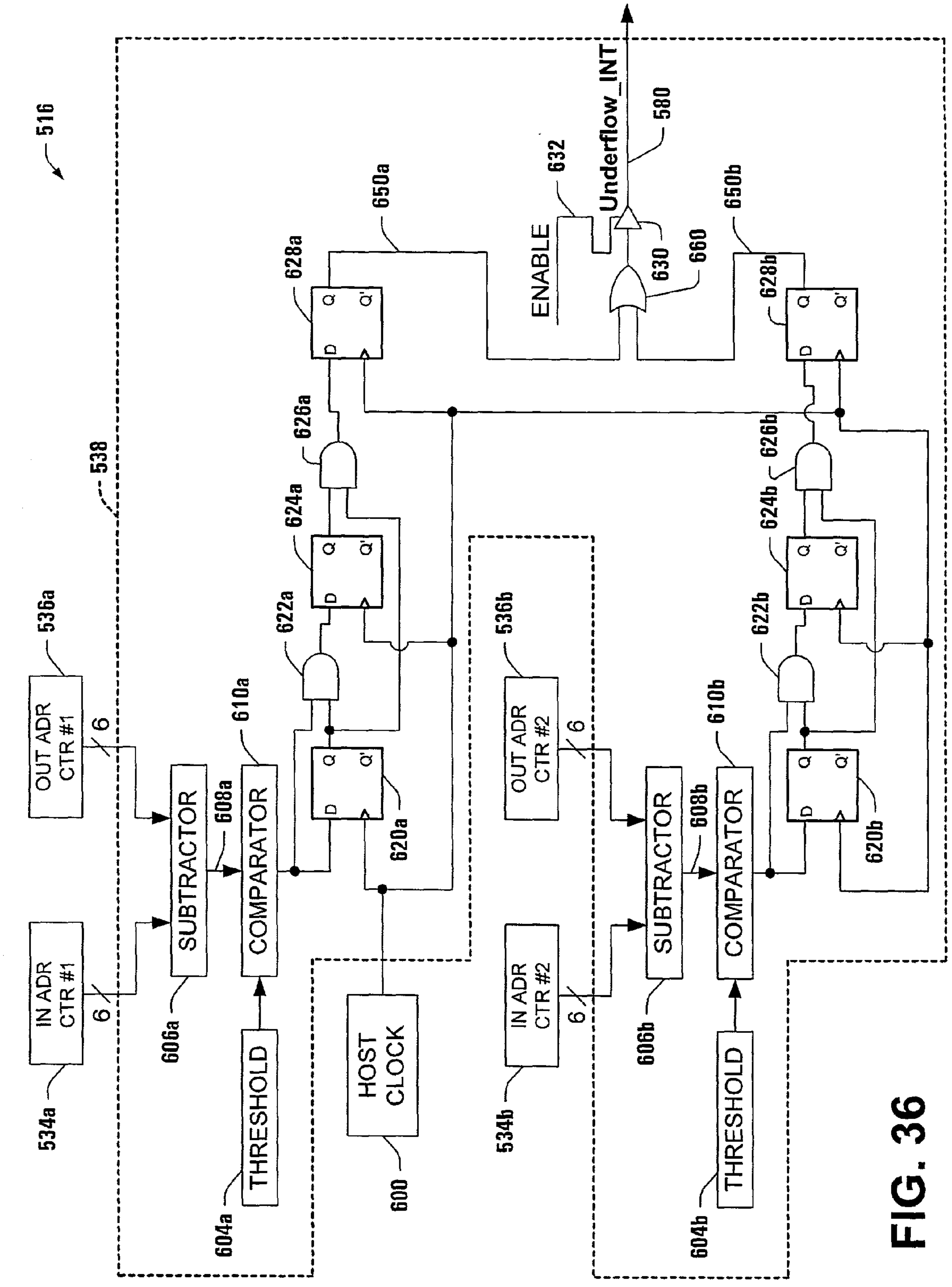
FIG. 36 is a schematic diagram illustrating another exemplary underflow detection system in accordance with the invention.

According to another aspect of the invention, the system 538 may further provide selective underflow indication when the FIFO 516 is operating in dual scan mode. Referring now to FIG. 36, another implementation of the exemplary control logic system 538 obtains counter values from first input and output counters 534*a* and 536*a*, respectively (e.g., counting for the upper display portion in dual scan mode), as well as from second input and output counters 534*b* and 536*b*, respectively (e.g., counting for the lower display portion in dual scan mode). It will be appreciated that the first and second input counters (e.g., counters 534*a* and 534*b*) may be separate counters, or be included within a single counter device, such as where a first set of counter output bits represents the first input counter 534*a*, and a second set of bits represents the second input counter 534*b*. Similarly, the first and second output counters 536*a* and 536*b* may be separate devices or portions of a single device.

A first subtractor 608*a* receives input and output counter values from first input and output counters 534*a* and 536*a*, respectively, and provides a difference value 608*a* to a comparator 610*a*. The comparator 610*a* compares the difference value 608*a* with a threshold value from a threshold register 604*a* to determine whether the values of the counters 534*a* and 536*a* are within the threshold value of each other. Logic components 620*a*, 622*a*, 624*a*, 626*a*, and 628*a* operate in similar fashion to the components 620, 622, 624, 626, and 628, respectively, of FIG. 35, in order to provide a first signal 650*a* according to whether the values of the counters 534*a* and 536*a* are within the threshold value of each other for at least two cycles of the host clock 600.

With respect to second input and output counters 534*b* and 536*b*, a second subtractor 608*b* receives input and output counter values from second input and output counters 534*b* and 536*b*, respectively, and provides a difference value 608*b* to a comparator 610*b*. The comparator 610*b* compares the difference value 608*b* with a threshold value from a threshold register 604*b* to determine whether the values of the counters 534*b* and 536*b* are within the threshold value of each other. It will be appreciated that the comparators 610*a* and 610*b* may alternatively obtain threshold values from a single threshold register, whereby the determinations of an anticipated underflow in the upper and lower dual scan memory portions of the FIFO 516 may be made according to the single threshold value. Logic components 620*b*, 622*b*, 624*b*, 626*b*, and 628*b* operate in similar fashion to the components 620, 622, 624, 626, and 628, respectively, of FIG. 35, in order to provide a second signal 650*b* according to whether the values of the counters 534*b* and 536*b* are within the threshold value of each other for at least two cycles of the host clock 600.

The first and second signals 650*a* and 650*b*, respectively, are provided as inputs to an OR gate 660, whose output is provided to the tri-state buffer 630, whereby the provision of the indication 580 may be selectively enabled or disabled according to the enable signal 632. As described above with respect to FIG. 35, the underflow indication may be selectively suppressed in situations where the values of the counters 534*a* and 536*a* (e.g., or the values of counters 534*b* and 536*b*) are within the threshold value of each other for reasons other than actual (or anticipated) underflow (e.g., such as where the FIFO 516 is emptied at the end of a frame or during startup of the FIFO 516, before any data has been obtained from the host bus 566).

Thus, the underflow indication 580 indicates an existing or anticipated underflow condition in the FIFO 516 when the first (e.g., upper) input and output counter values are within the threshold value of each other or when the second (e.g., lower) input and output counter values are within the threshold value of each other. The indication may be further refined by indicating an overflow when such conditions have been met for a number of consecutive cycles of the host clock 600 (e.g. two cycles). It will be appreciated that the underflow indication 580 may further indicate a lockup condition in the raster engine FIFO 516 in accordance with the invention.

The various aspects of the invention may be achieved by various forms and combinations of control logic components, all, some, or none of which may be programmable. For example, the threshold value may, but need not be programmable (e.g., via the threshold register 604). Also, the underflow indication may be based on two cycles of the host clock 600, or any number of such cycles (e.g., including zero). Furthermore, one or more of the values generated in the underflow determination may be stored in registers, for example, such as the difference value 608 provided by the subtractor 606. All such variations in form of the circuitry, programmability, and/or logic for implementing the aspects of the invention are deemed as falling within the scope of the invention, including the appended claims.

The underflow detection system of the invention (e.g., including the exemplary control logic system 538) thus provides an underflow indication, which may be provided to a system processor (e.g., CPU 562) for informational use, and/or for use in performing one or more remedial actions (e.g., to reduce bus loading, etc.). Such a host processor may selectively perform one or more such remedial actions based on various factors, including the nature of the underflow indication or indications. For example, where the underflow indication (e.g., indication 580) is provided as a processor interrupt, the host processor may take appropriate action according to the frequency of such underflow interrupts. In this regard, infrequent or spurious interrupts may mean that there is a long burst transaction, which is starving the raster engine (e.g., raster engine 502), which may be more likely in applications that demand high video bandwidth. On the other hand, frequent interrupts may indicate or be interpreted by the processor as meaning that the system bus is just out of bandwidth for the video mode that the raster engine is trying to support. Moreover, continuous interrupts may indicate that the video mode is unsupportable or that raster transfer on an isolated bus is locked up, and that the video and/or memory subsystem needs to be reset to a know state. If the interrupt occurs spuriously, depending on frequency, this may indicate that either the system is running out of bus bandwidth, that a master is holding the bus for too long, or both.

The underflow detection system, moreover, is adapted to interact between two clock domains (e.g., the host clock 600 and the video clock 602), as well as providing support for dual scan display operating modes. In addition, an underflow condition indication may be selectively suppressed when the FIFO is supposed to be empty. The invention provides for selective underflow indication when the FIFO has already been in use and is almost empty. This helps to indicate being on the verge of inadequate bandwidth. In normal operation, once the FIFO has started filling, the output counter (e.g., counter 536) should always stay behind the input counter (e.g., counter 534) until the end of the screen. At this point, they could be the same. At the end of the frame, both counters are cleared for the beginning of the next frame. Where the FIFO locations are a base 2 multiple, the rollover and detection logic may be implemented by a subtractor (e.g., subtractor 606) without any math adjustments.

Figure 37:
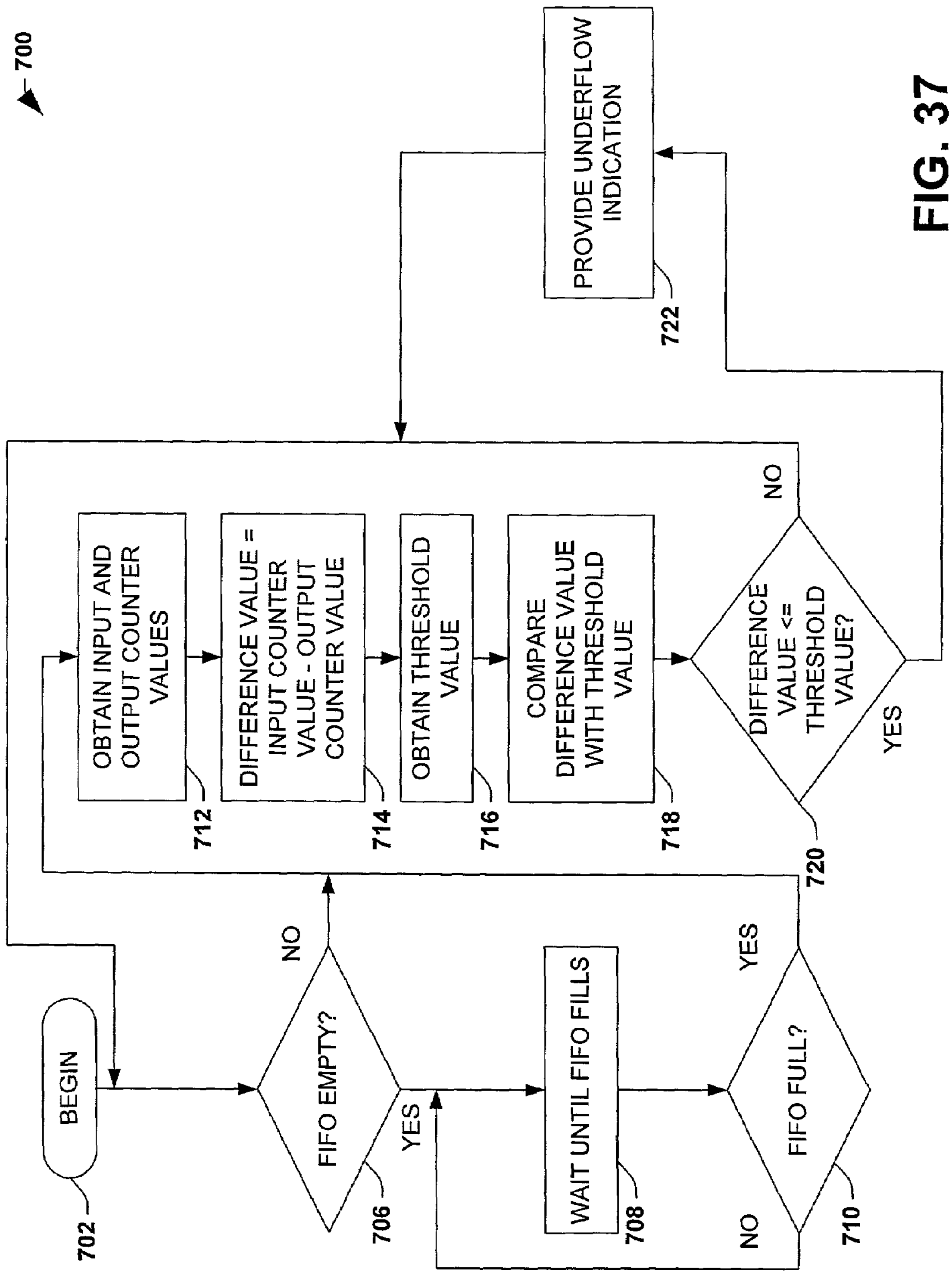
FIG. 37 is a flow diagram illustrating an exemplary method of detecting underflow conditions in accordance with another aspect of the invention.

Another aspect of the present invention provides a methodology for detecting and indicating an underflow condition in a raster engine. Referring now to FIG. 37, an exemplary method 700 for detecting underflow conditions in a raster engine is illustrated and described hereinafter. Although the method 700 is illustrated and described herein as a series of steps, it will be appreciated that the present invention is not limited by the illustrated ordering of steps, as some steps may occur in different orders and/or concurrently with other steps apart from that shown and described herein, in accordance with the invention. In addition, not all illustrated steps may be required to implement a methodology in accordance with the present invention. Moreover, it will be appreciated that the method 700 may be implemented in association with the apparatus and systems illustrated and described herein as well as in association with other systems not illustrated, whether hardware, software, or combinations thereof.

Beginning at step 702, a determination is made at step 706 as to whether the FIFO is empty (e.g., such as at startup, or at the end of a frame). If not, the method 700 proceeds to step 712 as described hereinafter. If the FIFO is empty at step 706, the raster engine waits at step 708 until the FIFO is full at step 710. It will be appreciated that no underflow indication is provided at steps 706–710 to avoid false underflow indications when the FIFO is emptied, such as during power up or at the end of a frame.

At step 712, input and output counter values are obtained (e.g., from input and output counters 534 and 536, respectively) and the difference therebetween is determined at step 714 (e.g., using a subtractor). A threshold value is then obtained at step 716 (e.g., from a programmable register), and at step 718 the difference value computed at step 714 is compared with the threshold value obtained at step 716. A determination is then made at step 720 as to whether the difference value is less than or equal to the threshold value. If not, the method 700 returns to step 706 described above. However, if the difference value is less than or equal to the threshold value (e.g., the input and output counter values are within the threshold value of each other), the method proceeds to step 722, whereat an underflow indication is provided. The indication may include, for example, providing an interrupt signal to a host processor (e.g., CPU 562). The method 700 then returns to 706 as described above.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A video controller raster engine that receives video data from a frame buffer and renders formatted data to a display in a computer system, the raster engine comprising:

a first in first out (FIFO) memory that interfaces a host bus in the computer system with the raster engine and obtains video data from the frame buffer via the host bus to provide video data to a video pipeline;

a first input counter that has a first input counter value indicative of video data obtained from the frame buffer;

a first output counter that has a first output counter value indicative of video data provided to the video pipeline; and a control logic system, associated with the FIFO memory, that provides an underflow indication according to the first input and output counter values;

wherein the underflow signal indicates an existing underflow condition when the first input and output counter values are equal for at least two cycles of a host clock.

2. The raster engine of claim 1, wherein the underflow indication comprises an underflow signal indicating at least one of an existing underflow condition, an anticipated underflow condition, and a raster engine lockup condition.

3. The raster engine of claim 2, wherein the control logic system provides the underflow signal to a host processor in the computer system.

4. The raster engine of claim 2, wherein the underflow signal indicates one of an existing underflow condition and an anticipated underflow condition when the first input and output counter values are within a threshold value of each other.

5. The raster engine of claim 4, wherein the raster engine comprises an underflow threshold value register programmable by a host processor in the computer system, and wherein the control logic system obtains the threshold value from the threshold value register, and compares the threshold value with the difference between the first input and output counter values.

6. The raster engine of claim 4, wherein the underflow signal indicates an existing underflow condition when the first input and output counter values are equal, and an anticipated underflow condition when the first input and output counter values are within a threshold value of each other.

7. The raster engine of claim 6, wherein the FIFO memory obtains video data from the frame buffer according to the host clock and provides video data to the video pipeline according to a video clock, and wherein the underflow signal indicates an anticipated underflow condition when the first input and output counter values are within a threshold value of each other for at least two cycles of the host clock.

8. The raster engine of claim 1, wherein the control logic system comprises a first logic circuit adapted to subtract the first output counter value from the first input counter value to obtain a difference value, and wherein the control logic system provides an underflow indication if the comparison is less than or equal to a threshold value.

9. The raster engine of claim 8, wherein the control logic system comprises a second logic circuit adapted to compare the difference value with the threshold value.

10. The raster engine of claim 8, wherein the FIFO memory obtains video data from the frame buffer according to a host clock and provides video data to the video pipeline according to a video clock, and wherein the control logic system provides an underflow indication if the comparison is less than or equal to a threshold value for at least two cycles of the host clock.

11. The raster engine of claim 1, wherein the FIFO memory obtains video data from the frame buffer according to a host clock and provides video data to the video pipeline according to a video clock and wherein the control logic system provides the underflow indication when the first input and output counter values are equal for at least two cycles of the host clock, and when the first input and output counter values are within a threshold value of each other for at least two cycles of the host clock.

12. The raster engine of claim 1, further comprising:

a second input counter having a second input counter value indicative of video data obtained from the frame buffer; and a second output counter having a second output counter value indicative of video data provided to the video pipeline;

wherein the raster engine selectively performs dual scan operation with the FIFO memory to provide interleaved first and second video data to the video pipeline represented by the first and second output counter values; and wherein the control logic system provides an underflow indication according to the first input and output counter values and second input and output counter values.

13. The raster engine of claim 12, wherein the underflow indication comprises an underflow signal indicating at least one of an existing underflow condition, an anticipated underflow condition, and a raster engine lockup condition.

14. The raster engine of claim 13, wherein the underflow signal indicates one of an existing underflow condition and an anticipated underflow condition when the first input and output counter values are within a threshold value of each other or when the second input and output counter values are within the threshold value of each other.

15. The raster engine of claim 12, wherein the raster engine comprises an underflow threshold value register programmable by a host processor in the computer system, and wherein the control logic system obtains a threshold value from the threshold value register, and compares the threshold value with the difference between the first input and output counter values and with the difference between the second input and output counter values.

16. The raster engine of claim 12, wherein the FIFO memory obtains video data from de frame buffer according to a host clock and provides video data to the video pipeline according to a video clock, and wherein the control logic system provides the underflow indication when the first input and output counter values are equal for at least two cycles of the host clock, when the first input and output counter values are within a threshold value of each other for at least two cycles of the host clock, when the second input and output counter values are equal for at least two cycles of the host clock, and when the second input and output counter values are within a threshold value of each other for at least two cycles of the host clock.

17. A video underflow detection system that indicates an underflow condition in a video controller raster engine with a first in first out (FIFO) memory that interfaces a host bus and adapted to obtain video data from a frame buffer via the host bus and to provide video data to a video pipeline, the underflow detection system comprising:

a control logic system associated with the FIFO memory, a first input counter having a first input counter value indicative of video data obtained from the frame buffer, and a first output counter having a first output counter value indicative of video data provided to the video pipeline;

wherein the control logic system provides an underflow indication according to the first input and output counter values, the underflow signal indicates an existing underflow condition when the first input and output counter values are equal for at least two cycles of a host clock.

18. The underflow detection system of claim 17, wherein the underflow indication comprises an underflow signal indicating at least one of an existing underflow condition, an anticipated underflow condition, and a raster engine lockup condition.

19. The underflow detection system of claim 18, wherein the underflow signal indicates one of an existing underflow condition and an anticipated underflow condition when the first input and output counter values are within a threshold value of each other.

20. The underflow detection system of claim 19, wherein the underflow signal indicates an existing underflow condition when the first input and output counter values are equal, and an anticipated underflow condition when the first input and output counter values are within a threshold value of each other.

21. The underflow detection system of claim 20, wherein the FIFO memory obtains video data from the frame buffer according to the host clock and provides video data to the video pipeline according to a video clock, and wherein the underflow signal indicates an anticipated underflow condition when the first input and output counter values are within a threshold value of each other for at least two cycles of the host clock.

22. The underflow detection system of claim 17, wherein the control logic system comprises a first logic circuit that subtracts the first output counter value from the first input counter value to obtain a difference value, and wherein the control logic system provides an underflow indication if the comparison is less than or equal to a threshold value.

23. The underflow detection system of claim 22, wherein the control logic system comprises a second logic circuit that compares the difference value with the threshold value.

24. The underflow detection system of claim 22, wherein the FIFO memory obtains video data from the frame buffer according to a host clock and provides video data to the video pipeline according to a video clock, and wherein the control logic system provides an underflow indication if the comparison is less than or equal to a threshold value for at least two cycles of the host clock.

25. A method of detecting underflow conditions ill a video controller raster engine, comprising:

obtaining an input counter value indicative of video data obtained from a frame buffer;

obtaining an output counter value indicative of video data provided from a memory to a video pipeline in the raster engine;

performing a comparison of the input and output counter values; and selectively providing an underflow indication according to the input and output counter value comparison, selectively providing an underflow indication comprises providing an underflow signal if the difference value is less than or equal to the threshold for at least two cycles of the host clock.

26. The method of claim 25, wherein selectively providing an underflow indication comprises providing an underflow signal if the input and output counter values are within a threshold value of each other.

27. The method of claim 25, wherein performing a comparison of the input and output counter values comprises:

subtracting the output counter value from the input counter value to obtain a difference value; and comparing the difference value with a threshold value.

28. The method of claim 27, wherein selectively providing an underflow indication comprises providing an underflow signal if the difference value is less than or equal to the threshold.

29. The method of claim 28, wherein the raster engine obtains video data from the frame buffer according to the host clock.

30. A system for detecting underflow conditions in a video controller raster engine, comprising:

means for obtaining an input counter value indicative of video data obtained from a frame buffer;

means for obtaining an output counter value indicative of video data provided from a memory to a video pipeline in the raster engine;

means for performing a comparison of the input and output counter values; and means for selectively providing an underflow indication according to the input and output counter value comparison, the underflow signal indicates at least one of an existing underflow condition when the first input and output counter values are equal for at least two cycles of the host clock, and an anticipated underflow condition when the first input and output counter values are within a threshold value of each other for at least two cycles of a host clock.

* * * * *